United States Patent
Hwang et al.

(10) Patent No.: US 6,317,170 B1
(45) Date of Patent: Nov. 13, 2001

(54) LARGE SCREEN COMPACT IMAGE PROJECTION APPARATUS USING A HYBRID VIDEO LASER COLOR MIXER

(75) Inventors: Young Mo Hwang, Seoul; Seung Nam Cha, Kyunggi-Do; Jin Ho Lee, Seoul, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/106,895

(22) Filed: Jun. 30, 1998

(30) Foreign Application Priority Data

Sep. 13, 1997 (KR) .................................................. 97-47282
Mar. 5, 1998 (KR) .................................................... 98-7207

(51) Int. Cl.[7] .............................. H04N 5/74; H04N 9/31; H04N 9/69
(52) U.S. Cl. ......................... 348/750; 348/756; 348/757; 348/776; 348/779; 348/780; 348/761; 353/31; 359/285; 359/305
(58) Field of Search .................................... 348/750, 751, 348/756, 757, 776, 777, 778, 779, 780, 761, 769; 349/61, 64; 353/31, 34; 359/285, 305, 583; H04N 5/74, 9/31, 9/69

(56) References Cited

U.S. PATENT DOCUMENTS

| | | | |
|---|---|---|---|
| 4,125,864 | 11/1978 | Aughton | 358/298 |
| 4,533,215 | 8/1985 | Trias et al. | 350/347 E |
| 4,720,747 | 1/1988 | Crowley | 358/231 |
| 5,071,225 | 12/1991 | Inoue | 359/634 |
| 5,097,480 | * 3/1992 | Pease | 358/302 |
| 5,253,073 | 10/1993 | Crowley | 358/231 |
| 5,311,321 | 5/1994 | Crowley | 348/760 |
| 5,317,348 | * 5/1994 | Knize | 353/31 |
| 5,517,263 | * 5/1996 | Minich et al. | 353/31 |
| 5,700,076 | * 12/1997 | Minich et al. | 353/31 |
| 5,704,700 | * 1/1998 | Kappel et al. | 353/31 |
| 5,822,021 | * 10/1998 | Johnson et al. | 348/742 |
| 5,877,886 | * 3/1999 | Ishii et al. | 359/212 |
| 5,920,361 | * 7/1999 | Gibeau et al. | 348/750 |

FOREIGN PATENT DOCUMENTS 0 211 596   2/1987  (EP) .
55-25045    2/1980  (JP) .

* cited by examiner

Primary Examiner—Reinhard J. Eisenzopf
Assistant Examiner—Brian P. Yenke
(74) Attorney, Agent, or Firm—Burns, Doane, Swecker & Mathis, L.L.P.

(57) ABSTRACT

A video image projection apparatus is disclosed. The apparatus uses a laser as a light source and modulates the light beam using a modulator according to an image signal. The apparatus projects the modulated light to a screen using a light scanning system. The laser display system includes three primary color laser light sources, an optical system needed for three-color light combining/separation, a light modulator loading the image signal into the three-color laser, and a driving circuit driving the system by processing the video signal electronically. A hybrid video laser color mixer has a structure that combines very small-sized hybrid light beam combining/separation optical elements and a 3-channel light modulator. It allows the size of the image projection apparatus to be about 6 by 5 by 3 centimeters. Additionally, the light alignment of the elements is close to self-alignment.

79 Claims, 11 Drawing Sheets

Fig.1 (THE PRIOR ART)

LARGE SCREEN COMPACT IMAGE PROJECTION APPARATUS USING A HYBRID VIDEO LASER COLOR MIXER

FIELD OF THE INVENTION

The present invention relates to a large area compact laser projection display using a hybrid video laser color mixer. In particular, the present invention for an apparatus projecting the information of a laser video image relates to a very small-sized and high-performance video image projection apparatus which uses a laser as a light source, modulates the light beam using an acousto-optic modulator or an electro-optic modulator according to the image signal and projects the modulated light beam to a screen using a light scanning system.

DESCRIPTION OF THE RELATED ART

The convenient phase of multimedia life in the 21st century may need a display screen of at least 60 inches or more. The prior typical means for displaying an image are flat plate elements such as cathode ray tubes (CRTs) of television receivers and liquid crystal devices (LCD). However, the larger the CRT or LCD is over a 40-inch screen, the more difficult manufacturing is and the resolution is decreased, so there are restrictions for commercialization. Therefore, the prior method of realizing a large area display has been to expand the image showed in a CRT or LCD and projecting it onto a screen. The method of projecting an image by expanding through the lens has a problem in that the image showed is only expanded, so the quality of the image projected to a screen is not clear. Additionally, the method has a problem in that the power of the light source is restricted because of the temperature characteristics of the means for displaying the image, so that the brightness is low.

Therefore, an apparatus for a laser projection display has been developed to solve these problems. Particularly, as the size of the laser display increases, the display improves. The advantages, when the laser is used for display, are as stated above. However, the difficult problems which now become urgent are manufacturing such displays in small sizes at low cost so that the laser display apparatus developed until now can be used for domestic use. U.S. Pat. No. 4,533,215, U.S. Pat. No. 4,720,747, U.S. Pat. No. 5,253,073 and U.S. Pat. No. 5,311,321 have disclosed fairly compact structures developed previously. However, these systems are under the restriction such that they have a large volume and high-price, that they are limited for domestic use.

FIG. 1 illustrates the structure of an exemplary prior art general laser display apparatus. Light source (10) may be a white-light laser or a gas laser for each of the red, green and blue wavelengths, as a laser light source. On the path of the light source (10), optical system (20) comprises high reflection mirror (21) changing the path of the laser beam generated by the light source, collimating lens (22) transforming the laser beam into parallel light beams and telescoping lens system (23, 24) for adjusting the magnitude of the parallel light beams.

Light beam separating subsystem (25) separates the laser beam of white-light admitted from the telescoping lens system (23, 24) of the optical system (20) into the monochromatic light beams of red, green and blue. Light beam separating subsystem (25) comprises two dichroic mirrors (67a, 68a) and a high reflection mirror (69a). The dichroic mirrors (67a, 68a) separate the white-light into the light beams of red, green and blue, and the high reflection mirror (69a) changes the light path of the monochromatic light beam. Here, the light beam separation optical system need not be used if a separate laser light source is used for each and of the red, green, and blue, light beams respectively.

The laser beam separated into the light beams of red, green and blue are focused on acousto-optic modulators (61, 62, 63) through focusing lenses (64a, 65a, 66a) and modulated by an image signal. The video signal processing speed of the light modulator is related to the diameter of the laser beam penetrating the light modulator, and the smaller the diameter of the light beam is, the faster is the processing speed. The focusing lens plays a role in focusing of the laser beam to get a sufficient speed of processing of the light signal in the light modulator.

The collimating lens (64b, 65b, 66b) is placed in the back-end of the light modulator (61, 62, 63) to restore the laser beam to a parallel light type before incidence on the focusing lenses (64a, 65a, 66a).

Light beam combining sub-system (65) combines the monochromatic light beams modulated into one light beam. This is for effective light scanning. Light beam combining sub-system (65) comprises two dichroic mirrors (67b, 68b) and a high reflection mirror (69b). The dichroic mirrors (67b, 68b) recombines the light beams of red, green and blue into white-light, and the high reflection mirror (69b) changes the path of the monochromatic light beam.

The combined light beam is vertically scanned by galvanometer (70), horizontally scanned by polygonal mirror (80) and then forms an image on a screen (90). The galvanometer (70) vibrates up and down at the speed synchronized by a vertical synchronous signal and the polygonal mirror (80) rotates at a high-speed synchronized by a horizontal synchronous signal. Namely, the scanning path of the modulated light beam changes direction to the vertical by the galvanometer (70), the scanning path changes direction to the horizontal by the polygonal mirror (80) and the image is formed on the screen (90). Relay lens system (31, 32) is placed between the galvanometer (70) and the polygonal mirror (80) and it concentrates the light beam so that the laser beam vertically scanned is made to enter the effective area of the surface of polygonal mirror (80), the surface of horizontal scanning. Relay lens system (31, 32) comprises two lenses having the same focal length such that they are placed with an interval between them being the sum of their focal lengths. The fθ lens system (34) may be placed in front of polygonal mirror (80), if necessary.

In the structure as described above, the size of the image is determined by the scanning angle and the scanning angle is determined by the horizontal scanning angle. The horizontal scanning angle is determined by the number of surfaces on the rotating polygonal mirror. In particular, the horizontal scanning angle (θ) is determined by the value of 720° divided by the number of surfaces of the mirror.

For example, the horizontal scanning angle is fixed as 30° in case of a 24-side polygonal mirror. On the other hand, the galvanometer only vibrates up and down, so the vertical scanning angle may be adjusted arbitrarily. In the structure as described above, the vertical scanning angle of the galvanometer should be adjusted according to the horizontal scanning angle of the polygonal mirror so as to make an image with a ratio of 4:3 of a picture ratio to the image signal.

To implement a moving picture according to an NTSC image signal, the 525 horizontal lines should make 30 scans of the screen per second. By the calculation described above, the horizontal scanning speed is 15.75 kHz. For a 24-side polygonal mirror, it should rotate at a speed of 39,375 rpm to process that scanning speed.

As described above, for the prior laser image projection apparatus, the sizes of almost all systems developed to date have been more than 2 by 2 by 1.5 miters and the price is over one hundred million yen.

The cause of the large-sized and high-priced system like the above is, first of all, that the red R, green G, and blue B laser light sources must have a capacity of power that is, at least, several watts or more so as to achieve brightness with a sufficient magnitude on the screen size demanded. Only gas lasers meet the requirements for the laser light source to date. Therefore, the light source in itself is high-priced and large. The next cause of large-sized and high-priced systems is that the light modulator and the related optical system, light separation and combining optical system, the optical system necessary for scanning light, etc., are each comprised of several optical components respectively, in the prior systems. A large size for the system results from the use of a large area and many components, and additionally, there are problems because a high price is caused by the use of many components.

SUMMARY

One object of the present invention for solving the problems described above is to provide a large area compact laser projection display using a hybrid video laser color mixer so as to make a video image projection apparatus which uses a laser as the light source and modulates the light beam according to an image signal using modulators such as, acousto-optic modulators or electro-optic modulators, and then projects it on a screen using a method of light scanning which is very small and provides high performance.

An image projection apparatus for a high-resolution compact laser display is disclosed. In particular, it allows the light beam processing part between the focusing part and the collimating lens to be very compact.

According to one embodiment, the image projection apparatus includes means for separating a light beam that has two mirrors and a medium. The means for separating a light beam separates the incident light beam that is mixed with three light beams having different wavelengths respectively into each of three light beams. The separated light beams have their own wavelengths. The two mirrors are parallel to one another respectively and the medium is positioned between the mirrors.

The image projection apparatus according to the present invention further includes a 3-channel modulator, such as a 3-channel acousto-optic modulator or electro-optic modulator, that modulates the light beams separated by the means for separating a light beam according to the image signal that is inputted from an external source. The separated light beams have their own wavelengths.

The image projection apparatus according to the present invention further includes means for combining light beams that has two mirrors and a medium. The means for combining light beams makes one combined light beam by combining the light beams modulated by the 3-channel modulator. The modulated light beams have their own wavelengths. The two mirrors are parallel to one another and the medium is positioned between the mirrors.

In another embodiment of the present invention, the image projection apparatus includes laser diodes of red, green and blue used for individual light sources for each of the three primary colors of red, green and blue that have different wavelengths respectively.

The image projection apparatus according to the present invention further includes a focusing lens that is positioned after each light source in the light path so as to focus the laser beam radiated by each light source on the modulator.

The image projection apparatus according to the present invention further includes a beam path expander that is positioned after each focusing lens in the light path for each beam to reduce the space and to adjust the light path for coincidence of the focusing points in the modulator in cases in which the focal length between the modulator and the focal lens is long.

The image projection apparatus according to the present invention further includes a total internal reflection mirror for adjusting the beam path. The total internal reflection mirror is positioned in front of the modulator in the light path so that each laser beam exactly enters each channel of the light modulator considering the gap between each channel of the light source and the modulator.

The image projection apparatus according to the present invention further includes a 3-channel modulator such as a 3-channel acousto-optic or a electro-optic modulator, for modulating the light beams generated by the light source according to the image signal that is inputted from the external source. The generated light beams have their own wavelengths.

The image projection apparatus according to the present invention further includes means for scanning to project the light beam to a screen. The light beam exits from the means for combining light beams.

The hybrid video laser color mixer according to the present invention has a structure that combines a very small hybrid light beam combining/separation optical element and a 3-channel light beam modulator.

The hybrid video laser color mixer according to the present invention has an effect of reducing significantly the size of the image projection apparatus compared to the prior art systems using the individual optical elements. Further, the present invention cuts down on the expenses of manufacturing and the manufacturing is simplified, particularly in the system according to the present invention, light alignment is close to self-alignment.

BRIEF DESCRIPTION OF THE DRAWINGS

Other objects and advantages of the invention will become apparent upon reading the detailed description and upon reference to the drawings.

Figure 1:
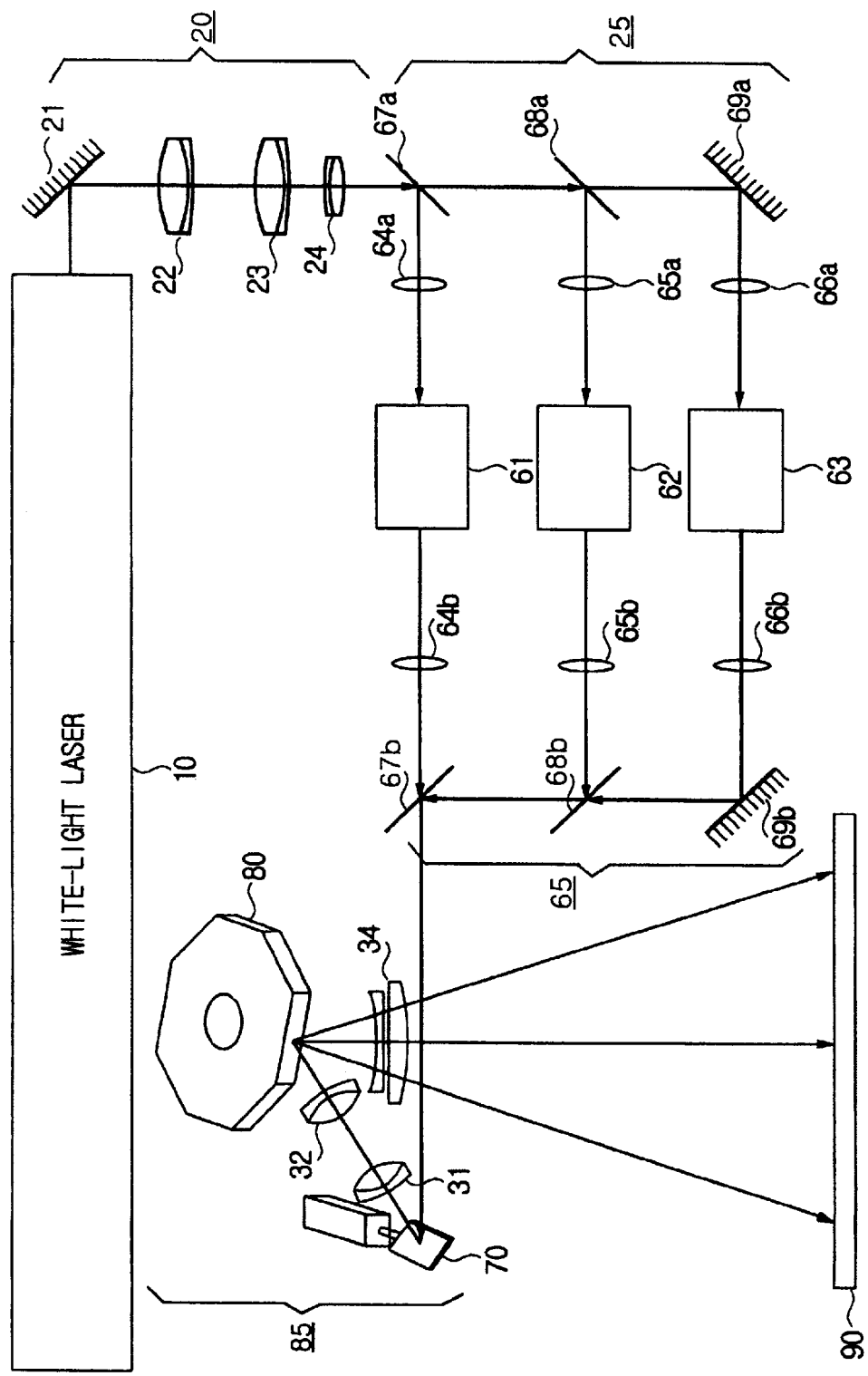
FIG. 1 illustrates a laser image projection apparatus in the prior art.

The descriptions of important symbols used in the figures are as follows:

404: reflection film
42, 405, 512, 612, 722, 803: first combining dichroic mirror
43, 406, 513, 613, 723, 804: second combining dichroic mirror
10: light source
11, 51, 120, 220, 301: incident light
12, 53, 122, 222, 302, 408, 515, 615, 725, 802: medium
13, 511: wide band high-reflection mirror
14, 54, 123, 223, 303: first separating dichroic mirror
15, 55, 124, 224, 304: second separating dichroic mirror
20: optical system
21, 69a, 69b, 300: high reflection mirror
22: collimating lens
23, 24: telescoping lens system
25: light beam separating sub-system
31, 32: relay lens system
34: fθ lens system
52, 121, 221,514, 614, 724: wide band anti-reflection coating film
56: wide band high-reflection coating film
57, 125, 225, 610, 720, 809: anti-reflection coating film
61, 62, 63: modulator
64a, 65a, 66a, 200: focusing lens
64b, 65b, 66b, 250: collimating lens
65: light beam combining sub-system
67a, 68a: dichroic mirror
67b, 68b: dichroic mirror
70: galvanometer
80: polygonal mirror
85: horizontal/vertical light beam scanning sub-system
90, 1000: screen
100: white-light laser
101, 308: incidence plane
102, 808: outlet plane
105: first total reflection plane
106: second total reflection plane
107, 107-1, . . . , 107-n: third total reflection planes
126, 226, 305, 401, 501, 601, 701, 805: light beam with a first wavelength
127, 227, 306, 402, 502, 602, 702, 806: light beam with a second wavelength
128, 228, 307, 403, 503, 603, 703, 807: light beam with a third wavelength
41, 129, 229, 611, 721: total reflection film
150: laser diode
210: white-light (R+G+B)
260: color combined light beam
309: penetration plane
310, 810: total reflection plane
350: total internal reflection mirror
400: beam path expander
401: medium forming the beam path expander
407: outgoing light beam
500: hybrid light beam separator
600: phase compensating crystal
700: 3-channel modulator
790: video signal processing circuit
800: hybrid light beam combiner
900: means for scanning
S0: video signal
S1: RF R, G, B video signal
S2: horizontal, vertical synchronous signal
$\lambda_1$: first wavelength
$\lambda_2$: second wavelength
$\lambda_3$: third wavelength

DETAILED DESCRIPTION

The invention will be explained in detail with reference to the accompanying drawings.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

Figure 2:
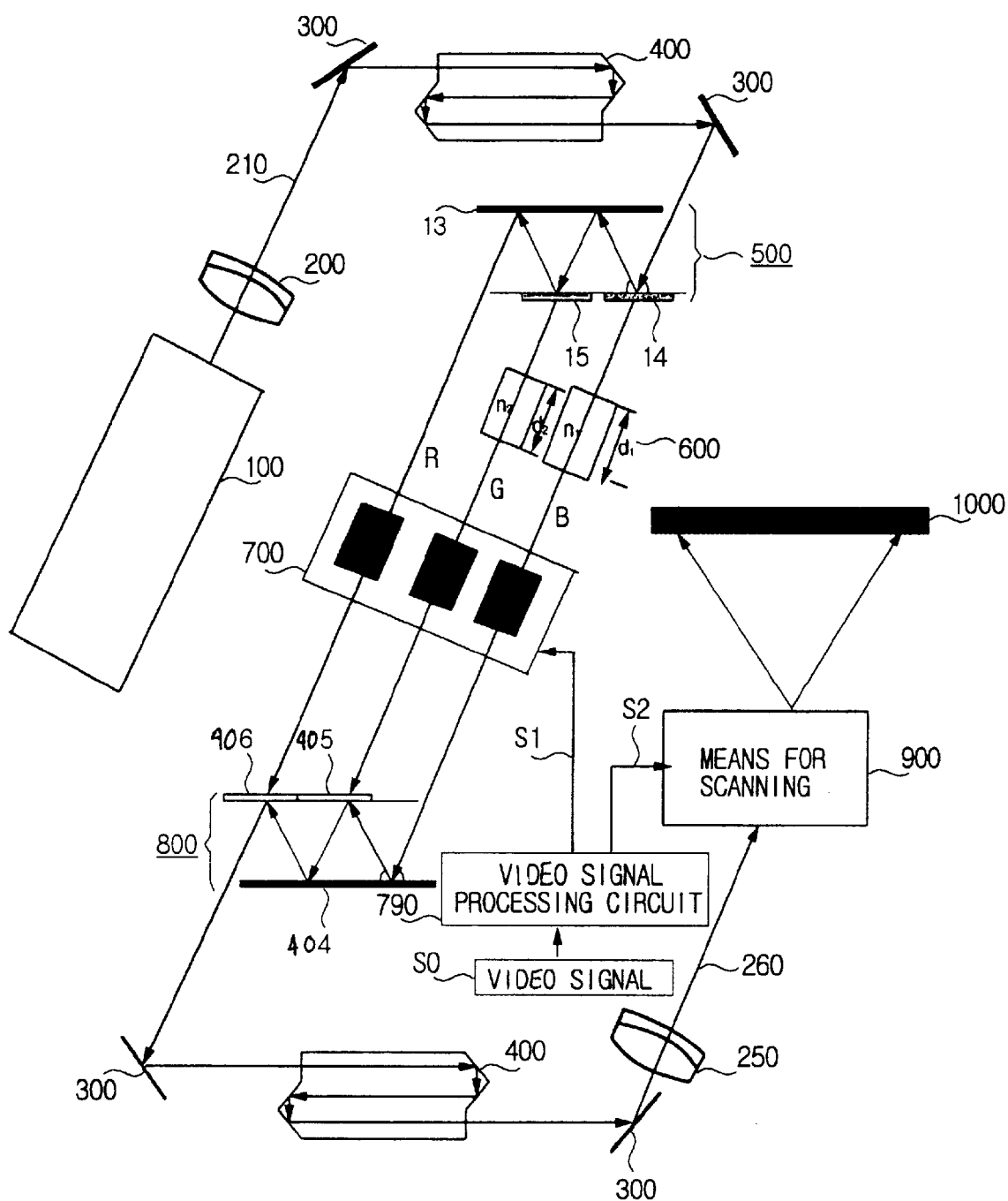
FIG. 2 illustrates one embodiment of the laser image projection system using a hybrid light beam separation apparatus and a hybrid light beam combining apparatus according to the present invention.

One embodiment of the present invention includes, as illustrated in FIG. 2, a white-light laser (100), a 3-channel modulator (700), a hybrid light beam separating apparatus (500), phase compensating crystals (600), a hybrid light beam combining apparatus (800), a number of high reflection mirrors (300), a beam path expander (400), a collimating lens (250), a means for scanning (900), a video signal processing circuit (790) and a screen (1000).

The white-light laser (100) generates a laser light beam of the three primary colors which light beam passes through the focusing lens (200). Focusing lens (200) focuses the laser light beam generated by the white light laser (100) to make the laser beam adequate as necessary to get a sufficient signal processing speed in the 3-channel modulator (700). The light beam (210) from the focusing lens (200) is reflected by a high-reflection mirror (300) toward a beam path expander (400). The beam path expander (400) is used in cases in which the light path between the focusing lens (200) and the 3-channel modulator (700) or between the modulator (700) and the collimating lens (250) is long (e.g., dozens of centimeters), for reducing the space that the long light path occupies down to only a few centimeters. The light beam exits the beam path expander (400) and is reflected by a high reflection mirror (300) toward the hybrid light beam separating apparatus (hybrid light beam separator) (500). The hybrid light beam separator (500) separates the light beam of three primary colors into its component colors in the form of three light beams having red, green and blue wavelengths, respectively. The separated light beams then enter a respective channel of the 3-channel modulator (700).

The 3-channel modulator (700) modulates the light beams to load an image signal S1 received from the video signal processing circuit (790) into the three color laser light beams. The modulated light beams enter the hybrid light beam combining apparatus (hybrid light beam combiner) (800) which combines the three color light beams light-modulated in each channel of the 3-channel modulator (700) into a combined light beam so that they are color-combined. The combined light beam is reflected by a high reflection mirror (300) toward a beam path expander (400). The light beam exiting from the beam path expander (400) is reflected by a high reflection mirror (300) toward a collimating lens (250). The means for scanning (900) scans the color-combined light beam (260) to form an image on the screen (1000). The image from the scanned light beam is then projected (or reflected) by the screen (1000). The collimating lens (250) positioned between the reflecting mirror (300) and the means for scanning (900), when the light beam that has passed through the hybrid light beam combining apparatus (800) makes an image through the means for scanning (900) and the screen (1000) makes the diameter of the laser light beam on the screen (1000) small enough not to overlap with the adjacent light beam being scanned. The video signal processing circuit (790) makes the system operate by electronic video signal processing and supplies the video signal S1 to the 3-channel modulator (700).

According to one embodiment of the present invention, the 3-channel modulator is an acousto-optic modulator. The 3-channel modulator may also be an electro-optic modulator, in which case, three polarizing apparatuses (not shown) are provided in front of the electro-optic modulators along the light path for linearly polarizing the light beams with each wavelength which is modulated by the electro-optic modulator.

One exemplary embodiment of a 3-channel modulator which can be used in the system according to the present invention is disclosed in a patent application entitled "A 3-Channel Light Modulator And A Modulation Method For A High Power* Laser", filed on Apr. 15, 1998, in the name of Yong Hoon Kim, Seung Nam Sha and Hang Woo Lee, now U.S. Pat. No. 6,088,150, issued Jul. 11, 2000, which application is incorporated herein by reference.

According to one embodiment of the present invention as shown in FIG. 2, phase compensating crystals (600) are disposed between the hybrid light beam separator (600) and the 3-channel modulator (700). The phase compensating crystals (600), when the focused laser light beam is separated into the three-color light beams by the hybrid three-color light beam separator (500) and each of the separated three-color light beams arrive at the 3-channel modulator (700), compensates for any difference in the light path of the corresponding channel of the modulator (700) for each color separated through the light separation of the hybrid light beam separator (500). The phase compensating crystals (600) may be omitted if the difference of the light paths for the three color light beams is not a serious problem.

The present invention relates to making the optical system, including light beam separation/combining and light beam modulation, very small-sized. Three light beam components (reflecting from mirrors 67a, 68a, 69a) of the three primary colors light beam separating subsystem (25), the focusing lenses (64a, 65a, 66a) for each of the three primary colors, each modulator (61, 62, 63) for the three primary colors, the collimating lenses (64b, 65b, 66b) for each of the three primary colors, and three light beam components (reflecting on mirrors 67b, 68b, 69b) of the three primary colors light beam combining subsystem (65) of the prior art general laser display system as illustrated in FIG. 1 are made, according to the present invention, as a hybrid component or are combined into one component. That is, the three light beam components (reflecting from mirrors 67a, 68a, 69a, hereinafter, these three light beams will be referred to by reference to mirrors 67a, 68a and 69a) of the light beam separating subsystem (25) in FIG. 1 are combined and simplified into one hybrid light beam separator (500) shown in FIG. 2. Instead of the three focusing lenses (64a, 65a, 66a) required in the prior art system shown in FIG. 1, according to the present invention, only a single focusing lens (200) is required as shown in FIG. 2. The three modulators (61, 62, 63) required in the prior art system shown in FIG. 1 are combined into a single 3-channel modulator (700) in the present invention as shown in FIG. 2. Instead of the three collimating lenses (64b, 65b, 66b) required in the prior art system shown in FIG. 1, only one collimating lens (250) is required according to the present invention as shown in FIG. 2. The three light beam components (67b, 68b, 69b) used in the prior art light beam combining subsystem (65) shown in FIG. 1 are provided as a hybrid light beam combining apparatus (800) according to the present invention as shown in FIG. 2. Additionally, use of the beam path expanders (400) according to the present invention as illustrated in FIG. 2 can reduce the space required by shortening the space that a long light path occupies. As stated above, if the structure of the system according to the present invention is used, the prior art size of about 60 cm by 50 cm by 20 cm or so can be reduced to the size of about 6 cm by 5 cm by 3 cm or so. Further, the construction of the system is simplified. By combining these features, the system according to the present invention has an advantage in that it is possible to make small-sized modules, therefore, it is possible to realize a simplified and small-sized system.

Figure 3:
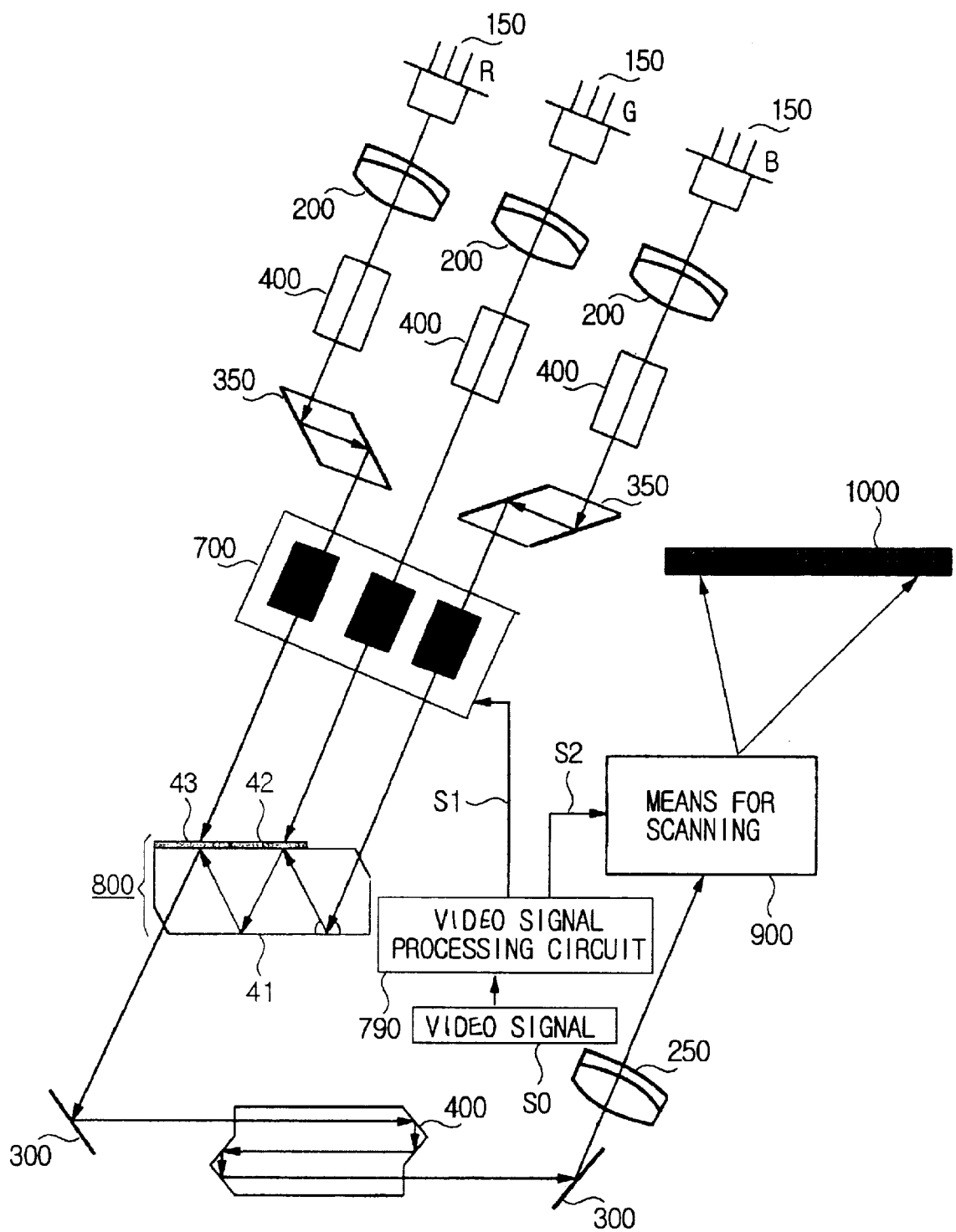
FIG. 3 illustrates one embodiment of the image projection apparatus according to the present invention that uses laser diodes of the three primary colors as light sources.

According to one embodiment of the present invention shown in FIG. 2, a white-light laser (100) is used as the laser light source for the three primary colors. Alternatively, three lasers (150) can be used, one for each of the three primary colors, as illustrated in the embodiment of FIG. 3. In the embodiment using three lasers (150) illustrated in FIG. 3, a total internal reflection mirror (350) is included between the beam path expanders (400) and the modulator (700) to adjust the optical path so that each laser beam is made to precisely enter each channel of the light modulator (700), depending on the gap between the light source (150) and each channel of the light modulator (700). In the embodiment shown in FIG. 3, only two total internal reflection mirrors (350) are required, one for each of the red and blue wavelength light beams. Here, the three primary color lasers are, if the laser is light modulated with the image signal in the light modulator (700) and then combined into a light beam in the light beam combining apparatus (800), used for the light source to make a color combined beam. In this embodiment, three focusing lenses (200) and three beam path expanders (400) are used, one of each element for each light beam. The operation of the other elements shown in FIG. 3 are the same as shown in FIG. 2 and will not be further described.

According to the present invention, the white-light beam (210) is focused through the focusing lens (200) to get the video signal processing speed needed in the 3-channel modulator (700). According to the present invention, either an electro-optic modulator or an acousto-optic modulator may be used for light modulation. In the following description, only the case of using an acousto-optic modulator is described. In the case of using an electro-optic modulator, the principle of light modulation is different compared to the acousto-optic modulator, but the function of light modulation in the image projection apparatus is the same as the acousto-optic modulator. Therefore the following discussion applies as well to an electro-optic modulator. In particular, the length of the light path between focal lens (200) and the modulator (700) should be selected so that the focusing point of the focused beam is focused in the modulator (700). The speed of signal processing in the modulator (700) increases in proportion to the diameter of the laser beam passing through the modulator (700). Thus, as to process a general video signal of 5 MHZ NTSC, it should be focused so that at the focusing point, the diameter of the laser beam is about 250μ (where the carrier frequency of the modulator is 150 MHZ). The focused beam is made to enter the incidence plane of the hybrid light separator (500) through several reflection mirrors (300) at the appropriate incidence angle.

The beam path expander (400) positioned between the focusing lens (200) and the hybrid light beam separator (500) (and/or between the light beam combiner (800) and the collimating lens (250)) is, where the focal distance is as long as dozens of centimeters, inserted to reduce the space occupied to a few centimeters. Where the focal distance is as short as 10 centimeters or less, the beam path expander(s) need not be used. The principle that the space reduction effect of the long focal distance is obtained by using the beam path expander is that folding of the distance on a straight line several times (as shown in FIG. 2 to FIG. 4, the case of folding the fight path three times is illustrated as an example) makes the space reduced and the distance of the light path is reduced.

Figure 4:
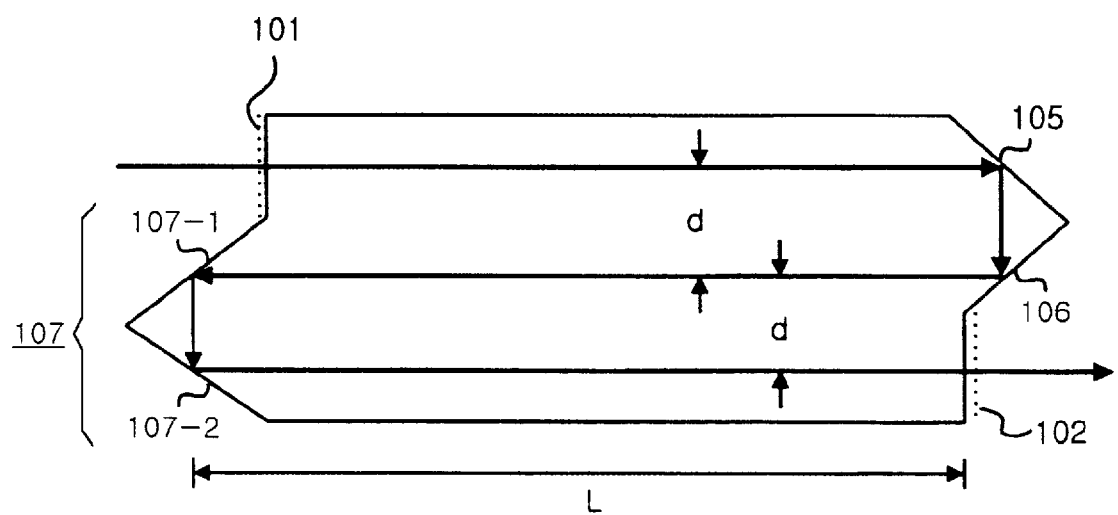
FIG. 4 illustrates a beam path expander according to the present invention.

FIG. 4 illustrates an exemplary beam path expander (400) according to the present invention. The beam path expander (400) includes an incidence plane (101), a first total reflection plane (105), a second total reflection plane (106), n third total reflection planes (n=0, 1, 2, . . . ) (107), and an outlet plane (102), all of which are formed in a medium (401). This embodiment of the beam path expander (400) is disclosed in a patent application entitled "A Compacted Beam Path Expander, A Method for Expanding Beam Path and A Large-Area Laser Projection Display System Having Small Compacted Optical System" filed on Jun. 4, 1998, in the name of Young Mo Whang, now U.S. Pat. 6,023,374, issued Feb. 8, 2000, which application is incorporated herein by reference.

In this embodiment, the incidence plane (101) forms a nonreflecting plane for admitting a light beam having an arbitrary wavelength into a medium (401) forming the beam path expander (400) having an arbitrary refractive index without reflection. The first total reflection plane (105) is cut in the medium (401) at an angle of total reflection decided by the refractive index of the medium for total-reflecting the fight beam entered from the incidence plane into the medium (401). The fight beam is reflected toward the second total reflection plane (106), which is cut at the same angle of total reflection for total-reflecting the light beam reflected from the first total reflection plane (105) at the angle of total reflection into the medium (401). The light beam is reflected by the second total reflection plane (106) toward n third total reflection planes (n=0, 1, 2, . . . ) (107-n) cut into the medium (401) at the angle of total reflection for reflecting the light beam along an predetermined length light path according to total-reflecting the light beam reflected from the second total reflection plane (106) into the medium (401). The number n of second total reflection planes (107-n) cut into the medium (401) shown in the embodiment illustrated in FIG. 4 is two (107-1, 107-2), however, the number of total reflection planes to be provided is dependent on the desired length of the light path, and can be determined by one of ordinary skill in the art. The outlet plane (102) forming a nonreflecting plane in order to make the light beam which is reflected from the third total reflections planes (107) exit the medium (401).

The white-light beam (consisting of its component parts of three primary color beams) enters the hybrid light beam separator (500) where it is separated into three separate light beams having wavelengths of the three primary colors, red, green and blue. FIG. 5 to FIG. 9 illustrate exemplary embodiments of the light beam separation apparatus that have different structures from each other. FIG. 2 illustrates, as examples of light beam separation and light beam combining, that the light beams are separated in the sequence of the blue, green and red wavelengths by the hybrid light beam separator (500) and that the light beams are combined by the hybrid light beam combiner (800) in the sequence of the blue, green and red wavelengths. However, the sequence of separation and/or combining of the light beams can be adjusted arbitrarily according to the design of coating of the dichroic mirrors coated on the hybrid light beam separator (500) and the light beam combiner (800).

The principle of light separation of the hybrid light beam separator used in the present invention is follows.

Figure 5:
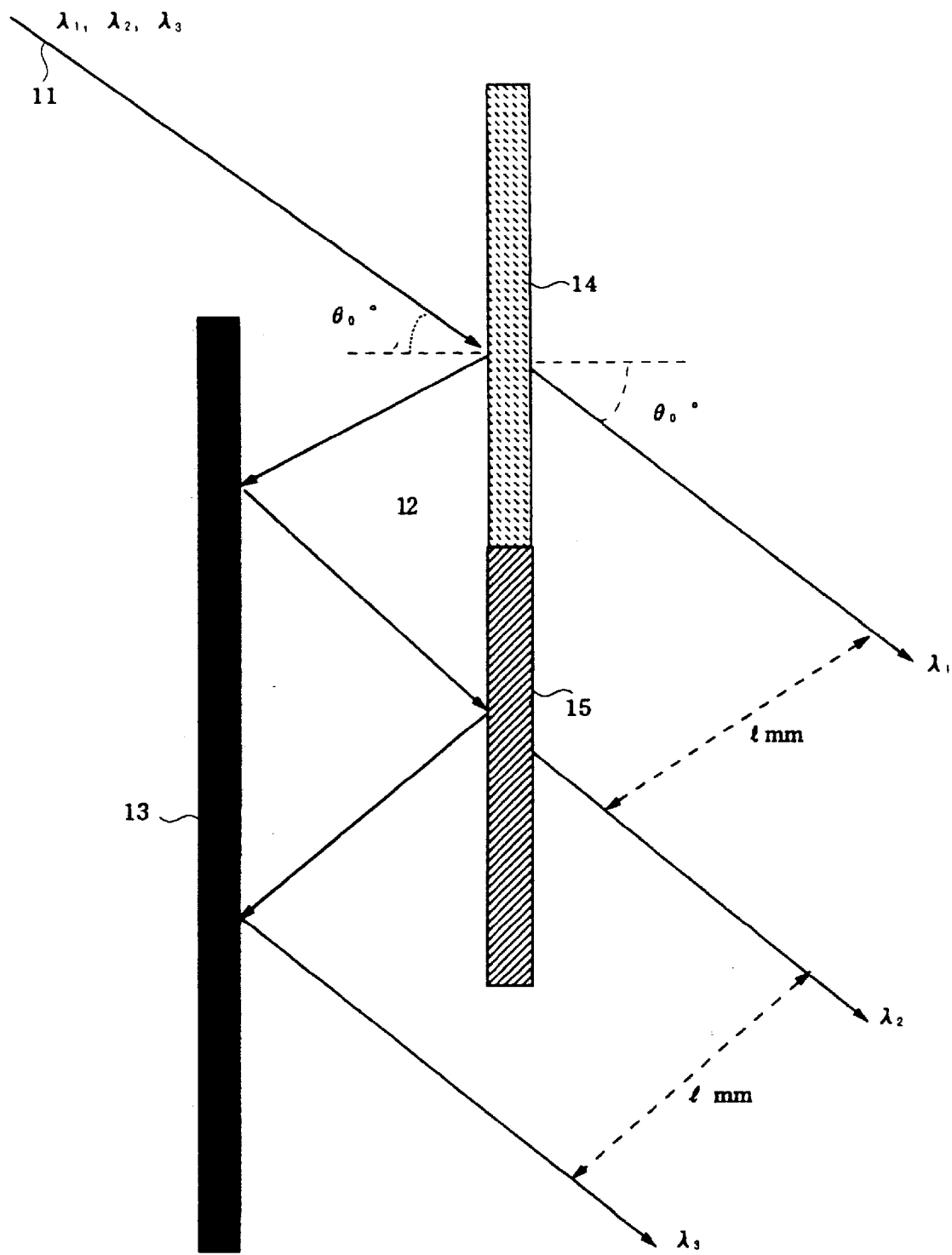
FIG. 5 illustrates a first embodiment of a light beam separation apparatus according to the present invention.

One embodiment of the light beam separation apparatus for separating an incident light beam into three light beams having different wavelengths, as illustrated in FIG. 5 and in FIG. 2 includes a first separating dichroic mirror (14), a wide band high-reflection mirror (13), second separating dichroic mirror (15), and a medium (12). This embodiment of the light beam separator (500) is disclosed in a patent application entitled "An Apparatus for Separating a Light Beam by Using Two Flat Plates With an Air Gap Therebetween and Hybrid Dichroic Mirrors and a Method Thereof" filed on Jun. 4, 1998, in the name of Jung Ho Park, Young Jun Park, Young M. Hwang, and Yong Hoon Kim, now U.S. Pat. No. 6,072,633 issued Jun. 6, 2000, which application is incorporated herein by reference.

In this embodiment, the first separating dichroic mirror (14) allows only a light beam with a first wavelength $\lambda_1$ to penetrate through the mirror (14), reflects light beams with other wavelengths ($\lambda_3$, $\lambda_3$) from the incident light beam (11). The wide band high-reflection mirror (13) reflects the light beam reflected from the first separating dichroic mirror (14). The second separating dichroic mirror (15) allows only a light beam with a second wavelength $\lambda_2$ different from the first wavelength $\lambda_1$ to penetrate in the direction that is parallel to the light beam with the first wavelength $\lambda_1$ that is penetrated through the first separating dichroic mirror (14) and reflecting a light beam with a third wavelength ($\lambda_3$), from the light beam reflected by the wide band high-reflection mirror (13). The wide band high-reflection mirror (13) reflects a light beam with the third wavelength $\lambda_3$ which is different from the first and second wavelengths ($\lambda_1$, $\lambda_3$) that is reflected from the second separating dichroic mirror (15). The reflected light beam with the third wavelength $\lambda_3$ then passes the second separating dichroic mirror (15) in a direction that is parallel to the light beam with the second wavelength $\lambda_2$ that has penetrated through the second separating dichroic mirror (15). The medium (12) is positioned between the first and second separating dichroic mirrors (14, 15) and the wide band high-reflection mirror (13) and the incident light beam and the reflected light beams pass through the medium (12). According to this embodiment, the medium (12) is air.

Figure 6:
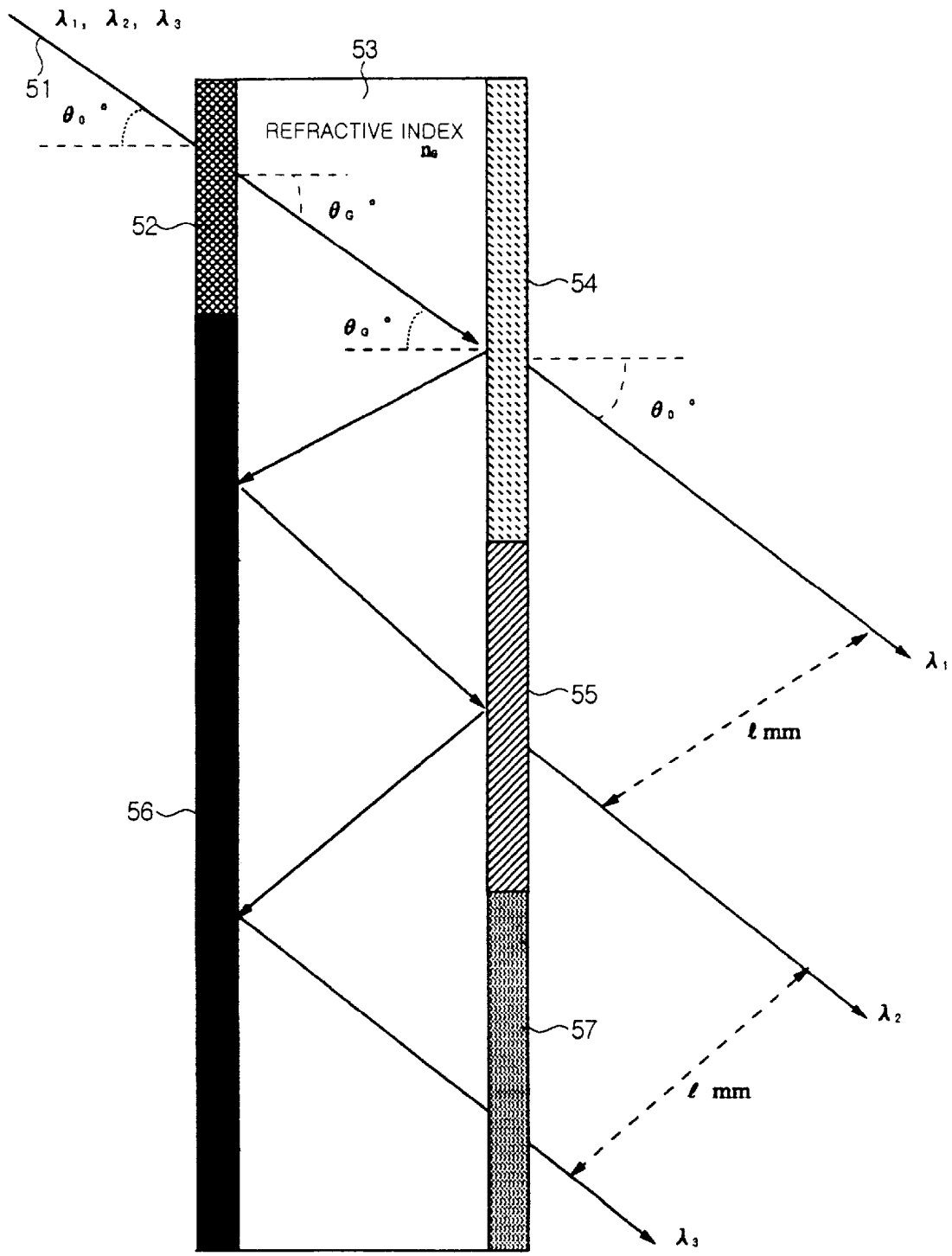
FIG. 6 illustrates a second embodiment of a light beam separation apparatus according to the present invention.

Another embodiment of the light beam separation apparatus (500) for separating for separating an incident light beam into three light beams having different wavelengths, as illustrated in FIG. 6 includes a wide band anti-reflection coating film (52), a first separating dichroic mirror (54), a wide band high-reflection coating film (56), a second separating dichroic mirror (55), an anti-reflection coating film (57) and a medium (53). This embodiment of the light beam separator (500) is disclosed in a patent application entitled "An Apparatus and a Method for Separating a Light Bean Using a Hybrid Dichroic Mirror and a Method for Manufacturing the Apparatus" filed on Jun. 4, 1998, in the name of Jung Ho Park, Young Jun Park, and Young Mo Hwang, now U.S. application Ser. No. 6,147,806 issued Nov. 14, 2000, which application is incorporated herein by reference.

In this embodiment, the wide band anti-reflection coating film (52) allows the incident light beam (51) to penetrate into the medium (53) without reflection. The incident light beam (51) enters the wide band anti-reflection coating film (52) at a first angle $\theta_0°$ with respect to the vertical direction of the incidence plane. The incident light beam strikes the first separating dichroic mirror (54), which allows only a light beam with a first wavelength $\lambda_1$ to penetrate through to the outside at the first angle $\theta_0°$ with respect to the vertical direction of the penetration plane, and which reflects a light beam with a third wavelength ($\lambda_3$) at a second angle $\theta_G°$ with respect to the vertical direction of the reflection plane, for the light beam penetrated through the wide band anti-reflection coating film (52). The light beams reflected by the first separating dichroic mirror (54) hit the wide band high-reflection coating film (56). The wide band high-reflection coating film (56) reflects the light beams reflected from the first separating dichroic mirror (54) at the second angle $\theta_G°$ with respect to the vertical direction of the reflection plane. The light beams reflected by the wide band high-reflection coating film (56) hit the second separating dichroic mirror (55). The second separating dichroic mirror (55) allows only a light beam with a second wavelength $\lambda_2$ different from the first wavelength $\lambda_1$ to penetrate through the second separating dichroic mirror (55) at the first angle $\theta_0°$, with respect to the vertical direction of the penetration plane and reflects light beams with other wavelengths ($\lambda_1$, $\lambda_3$) at the second angle $\theta_G°$ with respect to the vertical direction of the reflection plane from the light beams reflected by the wide band high-reflection coating film. The wide band high-reflection coating film (56) reflects the light beam reflected by the second separating dichroic mirror (55) at the second angle $\theta_G°$ with respect to the vertical direction of the reflection plane. The light beam reflected again by the wide band high-reflection coating film (56) hits the anti-reflection coating film (57). The anti-reflection coating film (57) allows a light beam with a third wavelength $\lambda_3$ which is different from the first and second wavelengths ($\lambda_1$, $\lambda_3$) to penetrate without reflection through the anti-reflection coating film (57) at the first angle $\theta_0°$ with respect to the vertical direction of the penetration plane from the light beams reflected through the wide band high-reflection coating film (56). The light beam penetrated through the wide band anti-reflection coating film (52) and the light beams reflected by the first separating dichroic mirror (54), the second separating dichroic mirror (55), and the wide band high-reflection coating film (56) pass through the medium 53. The light beams with the first, second and third wavelengths all penetrate outside the medium (53) through the first separating dichroic mirror (54), the second separating dichroic mirror (54) and the anti-reflection coating film (57) in directions which are parallel to one another.

Figure 7:
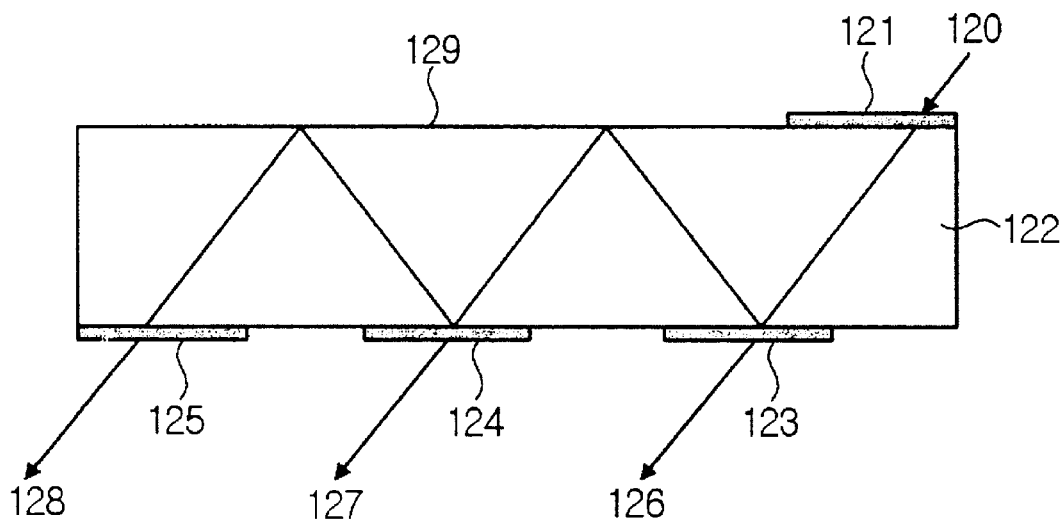
FIG. 7 illustrates a third embodiment of a light beam separation apparatus according to the present invention.

Another embodiment of the light beam separation apparatus (500) for separating for separating an incident light beam into three light beams having different wavelengths, as illustrated in FIG. 7 includes a wide band anti-reflection coating film (121), a first separating dichroic mirror (123), a total reflection film (129), a second separating dichroic mirror (124), an anti-reflection coating film (125) and a medium (122). The wide band anti-reflection coating film (121) allows the incident light beam (120) to penetrate into the medium (122) without reflection. The incident light beam (120) hits the wide band anti-reflection coating film (121) at a total reflection angle that is determined by the refractive index of the medium (122) and is transmitted through the medium (122) until it hits the first separating dichroic mirror (123). The first separating dichroic mirror (123) allows only the light beam (126) with a first wavelength ($\lambda_1$) to penetrate through the first separating dichroic mirror (123) at the total reflection angle and reflects the light beams with other wavelengths ($\lambda_2$, $\lambda_3$) at the total reflection angle, from the light beam penetrated through the wide band anti-reflection coating film (121). The light beam reflected by the first separating dichroic mirror (123) hits the total reflection film (129). The total reflection film (129) total-reflects the light beam reflected by the first separating dichroic mirror (123) at the total reflection angle toward the second separating dichroic mirror (124). The second separating dichroic mirror (124) allows only the light beam (127) with a second wavelength ($\lambda_2$) different from the first wavelength ($\lambda_1$) to penetrate through the second separating dichroic mirror (124) at the total reflection angle and reflects light beam with a third wavelength ($\lambda_3$) toward the total reflection film (129) at the total reflection angle, from the light beam reflected by the total reflection film (129). The light beam with the third wavelength reflected by the second separating dichroic mirror (124) hits the total reflection film (129) and is total-reflected again at the total reflection angle. The light beam reflected again by the total reflection film (129) hits the anti-reflection coating film (125). The anti-reflection coating film (125) allows the light beam (128) with the third wavelength ($\lambda 3$) which is different from the first and second wavelengths ($\lambda_1$, $\lambda_2$) to penetrate through the anti-reflection coating film (125) without reflection, from the light beam reflected by the total reflection film. The light beam penetrated through the wide band anti-reflection coating film (121) and the light beams reflected by the first separating dichroic mirror (123), the second separating dichroic mirror (124), and the total reflection film (125) pass through the medium (122). The light beams (126), (127), and (128) all penetrate outside the medium (122) through the first separating dichroic mirror (123), the second separating dichroic mirror (124) and the total reflection film (125) in directions which are parallel to one another.

Figure 8:
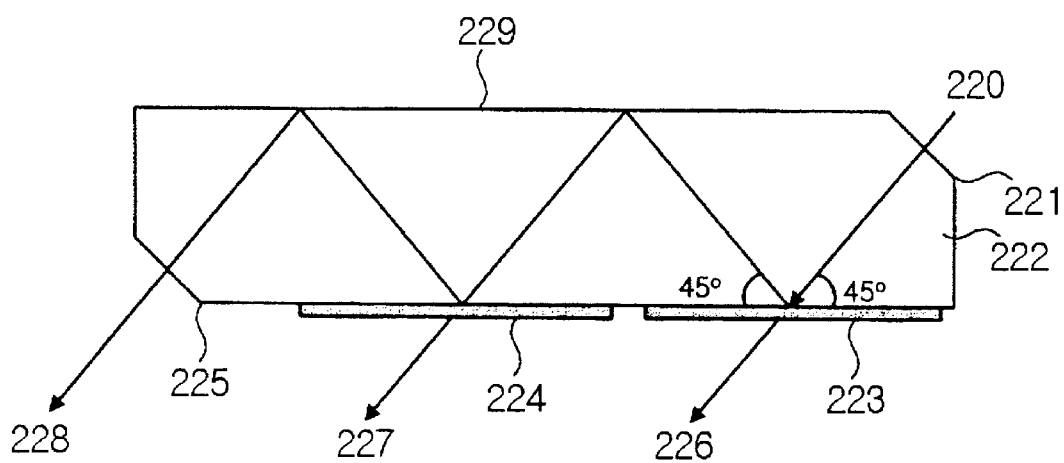
FIG. 8 illustrates a fourth embodiment of a light beam separation apparatus according to the present invention.

Another embodiment of the light beam separation apparatus (500) for separating for separating an incident light beam into three light beams having different wavelengths, as illustrated in FIG. 8 includes a wide band anti-reflection coating film (221), a first separating dichroic mirror (223), a total reflection film (229), a second separating dichroic mirror (224), an anti-reflection coating film (225) and a medium (222). The wide band anti-reflection coating film (221) is formed on a cutting plane cut in the medium (222) such that the total reflection angle is vertical to the cutting plane in order to allow the incident light beam (220) to penetrate into the medium (222) without reflection. The incident light beam (220) hits the wide band anti-reflection coating film (221) at a total reflection angle that is determined by the refractive index of the medium (222). The light beam admitted through the wide band anti-reflection coating film (221) hits the first separating dichroic mirror (223). The first separating dichroic mirror (223) allows only the light beam (226) with a first wavelength ($\lambda_1$) to penetrate through the mirror (223) at the total reflection angle and reflects the light beam with other wavelengths ($\lambda_2$, $\lambda_3$) toward the total reflection film (229) at the total reflection angle, for the light beam penetrated through the wide band anti-reflection coating film (220). The total reflection film (229) total-reflects the light beam reflected by the first separating dichroic mirror at the total reflection angle toward the second separating dichroic mirror (224). The second separating dichroic mirror (224) allows only the light beam (227) with a second wavelength ($\lambda_2$) different from the first wavelength ($\lambda_1$) to penetrate through the second separating dichroic mirror (224) at the total reflection angle and reflects the light beam with a third wavelength ($\lambda_3$) different from the first and second wavelengths ($\lambda_1$, $\lambda_2$) at the total reflection angle toward the total reflection film (229), from the light beam reflected by the total reflection film (229). The total reflection film (229) total-reflects again the light beam reflected by the second separating dichroic mirror (224) at the total reflection angle toward the anti-reflection coating film (225). The anti-reflection coating film (225) allows the light beam (228) with the third wavelength ($\lambda_3$) which is different from the first and second wavelengths ($\lambda_1$, $\lambda_2$) to penetrate through the anti-reflection coating film (225) without reflection, from the light beam reflected by the total reflection film (229). The light beam penetrated through the wide band anti-reflection coating film (220) and the light beams reflected by the first separating dichroic mirror (223), the second separating dichroic mirror (224), and the total reflection film (229) pass through the medium (222). The light beams (226), (227), and (228) all penetrate outside the medium (222) through the first separating dichroic mirror (223), the second separating dichroic mirror (224) and the anti-reflection coating film (225) in directions which are parallel to one another.

Figure 9:
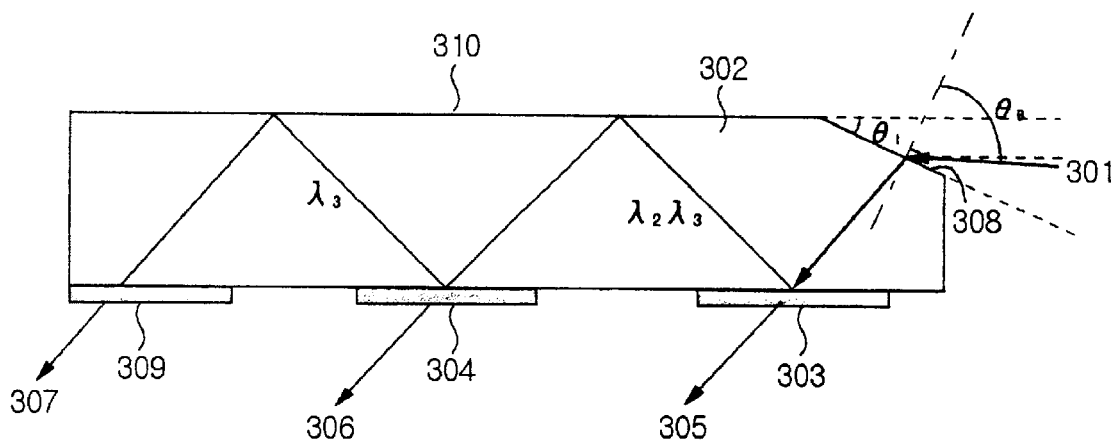
FIG. 9 illustrates a fifth embodiment of a light beam separation apparatus according to the present invention.

Another embodiment of the light beam separation apparatus (500) for separating for separating an incident light beam into three light beams having different wavelengths, as illustrated in FIG. 9 includes a incidence plane (308), a first separating dichroic mirror (303), a total reflection plane (310), a second separating dichroic mirror (304), a penetration plane (309) and a medium (302). The incidence plane (308) is cut in the medium (302) so that the incident light beam (301) enters the medium (302) at the brewster angle $\theta_B°$ from the vertical direction with respect to the incidence plane (308) and is refracted at the total reflection angle that is determined by the refractive index of the medium (302). The incident light beam (301) hits the first separating dichroic mirror (303). The first separating dichroic mirror (303) allows only the light beam (305) with a first wavelength ($\lambda_1$) and reflects the light beams with other wavelengths ($\lambda_2$, $\lambda_3$) toward the total reflection plane (310) at the total reflection angle for incident light beam (301). The total reflection plane (310) total-reflects the light beam reflected by the first separating dichroic mirror (303) toward the second separating dichroic mirror (304) at the total reflection angle The second separating dichroic mirror (304) allows only the light beam (306) with a second wavelength ($\lambda_2$) different from the first wavelength ($\lambda_1$) to penetrate through the second separating dichroic mirror (304) and reflects the light beams with other wavelengths toward the total reflection plane (310) at the total reflection angle, from the light beam reflected by the total reflection plane (310). The total reflection plane (310) total-reflects the light beam reflected by the second separating dichroic mirror (304) toward the penetration plane (309) at the total reflection angle. The penetration plane (309), made of an anti-reflection coating film, allows the light beam (307) with the third wavelength ($\lambda_3$) different from the first and second wavelengths ($\lambda_1$, $\lambda_2$) to penetrate through the penetration plane (309) without reflection, from the light beam reflected by the total reflection plane (310). The light beam penetrated through the incidence plane (308) and the light beams reflected by the first separating dichroic mirror (303), the second separating dichroic mirror (304) and the total reflection plane (310) pass through the medium (302). The light beams (305), (306), and (307) all penetrate outside the medium (302) through the first separating dichroic mirror (303), the second separating dichroic mirror (303) and the penetration plane (309) in directions which are parallel to one another.

The structure of a light beam combining apparatus and the principle of light beam combining according to the present invention are described below with reference to FIG. 10 to FIG. 14.

Figure 10:
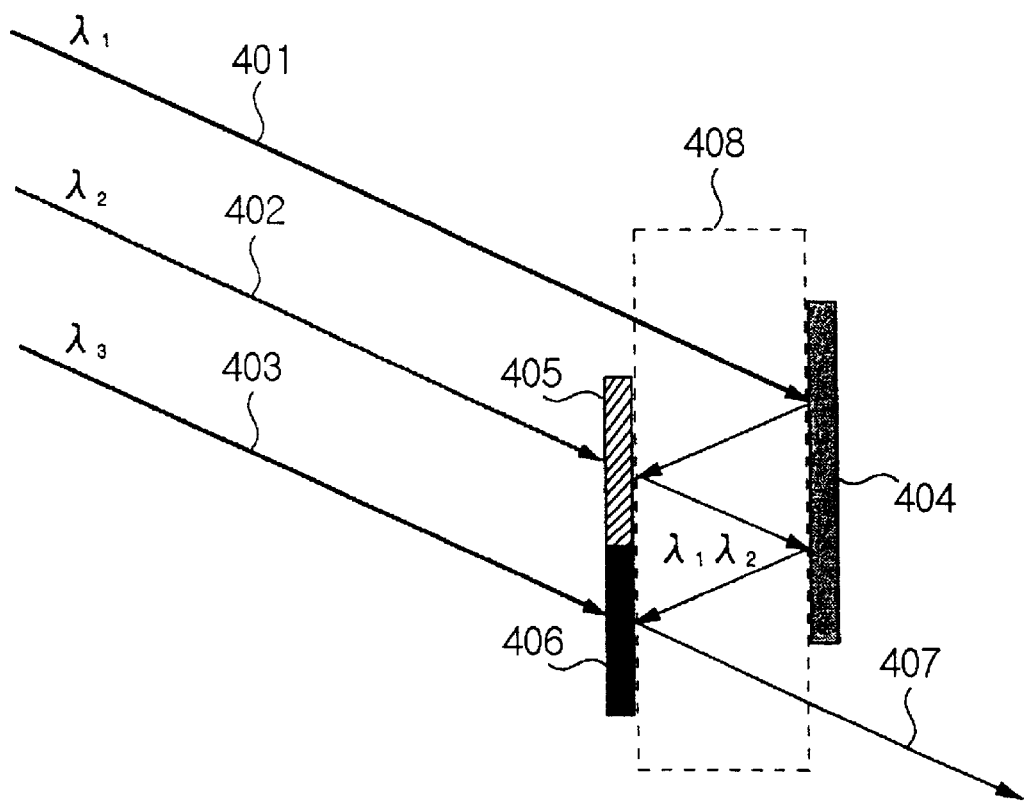
FIG. 10 illustrates a first embodiment of a light beam combining apparatus according to the present invention.

One embodiment of the light beam combining apparatus (800) for combining three incident light beams with different wavelengths into one light beam, as illustrated in FIG. 10 includes a reflection film (404), a first combining dichroic mirror (405), a second combining dichroic mirror (406), and a medium (408). This embodiment of the light beam combiner (800) is disclosed in a patent application entitled "An Apparatus and a Method for Combining Light Beams by Using two Flat Plates with an Air Gap Therebetween" filed on Jun. 4, 1998, in the name of Young-Jun Park, Jung-Ho Park, Young Mo Hwang, and Yong Hoon Kim, now U.S. Pat. No. 6,101,037 issued Aug. 8, 2000, which application is incorporated herein by reference.

In this embodiment, the reflection film (404) makes a light beam (401) with a first wavelength ($\lambda_1$), which enters the medium (408) from among the three light beams modulated by the modulator (700), first-reflect in the medium. According to this embodiment, the medium (408) is air. The first combining dichroic mirror (405) allows only a light beam (402) with a second wavelength ($\lambda_2$) which is different from the first wavelength ($\lambda_1$) to penetrate into the medium (408) and reflects the light beams with other wavelengths. The second combining dichroic mirror (406) allows only a light beam (403) with a third wavelength ($\lambda_3$) which is different from the first and second wavelengths ($\lambda_1$, $\lambda_2$) and reflects the light beams with other wavelengths. The first combining dichroic mirror (405) second-reflects, at a first reflection point, the light beam with the first wavelength ($\lambda_1$) that is first-reflected in the medium (408) by the reflection film (404). The reflection film (404) third-reflects a first combined light beam in the medium (408) toward the second combining dichroic mirror (406). The first combined light beam is formed by combining the light beam with the first wavelength that is second-reflected by the first combining dichroic mirror (405) and the light beam (402) with the second wavelength ($\lambda_2$) that is penetrated through the first combining dichroic mirror (405) at a second-reflection point of the light beam with the first wavelength into the medium (408) by the first combining dichroic mirror (405). The second combining dichroic mirror (406) fourth-reflects the first combined light beam that is third-reflected in the medium (408). The outgoing light beam (407) is a second combined light beam, which is formed when the first combined light beam that is fourth-reflected by the second combining dichroic mirror (406) and the light beam (403) with the third wavelength ($\lambda_3$) that is penetrated at a second-reflection point of the first combined light beam into the medium (408) by the second combining dichroic mirror (406). The second combined light beam exits the medium (408) past the reflection film (404).

Figure 11:
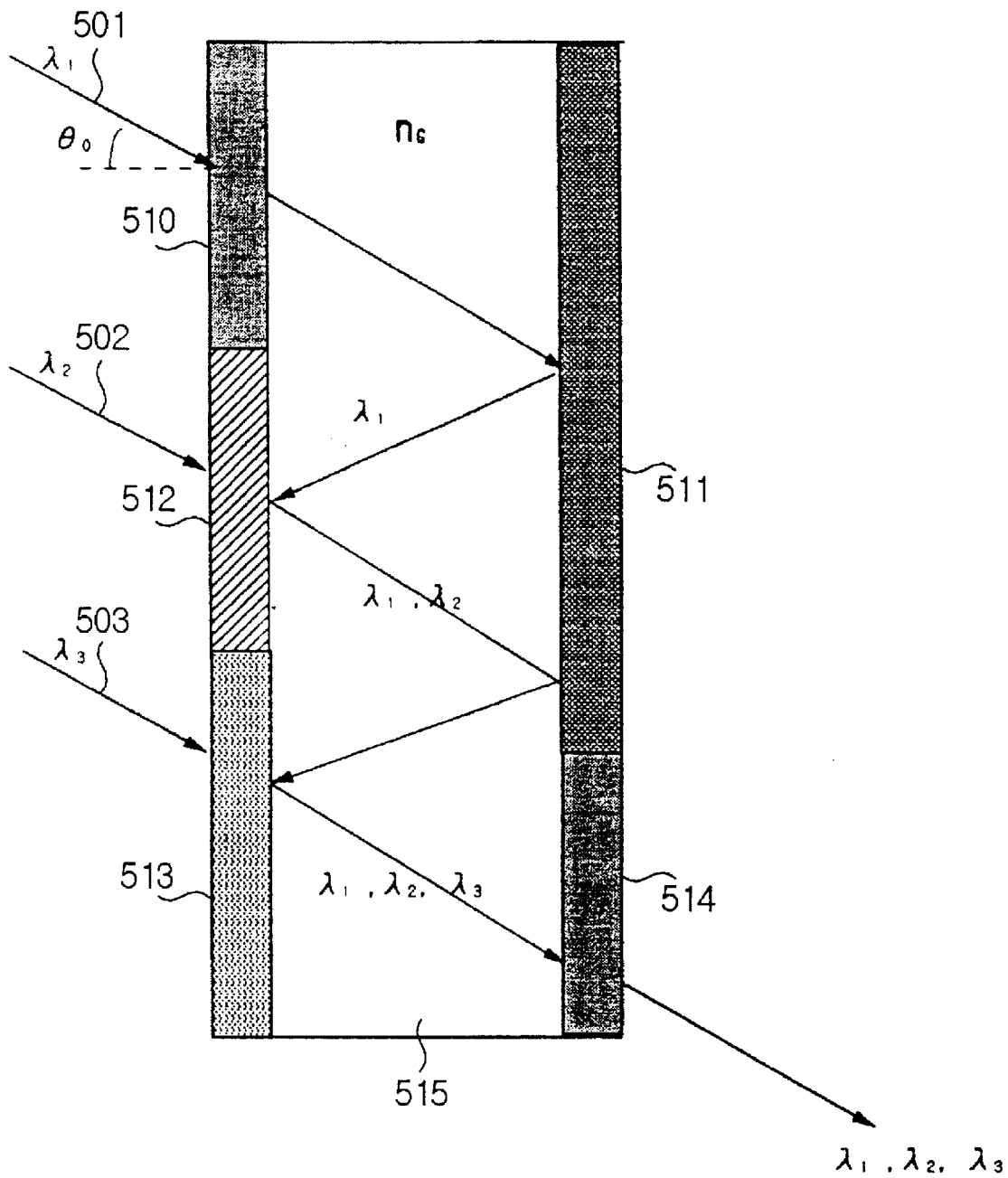
FIG. 11 illustrates a second embodiment of a light beam combining apparatus according to the present invention.

Another embodiment of the light beam combining apparatus (800) for combining three incident light beams with different wavelengths into one light beam, as illustrated in FIG. 11 includes an anti-reflection film (510), a wide band high-reflection mirror (511), a first combining dichroic mirror (512), a second combining dichroic mirror (513), a wide band anti-reflection coating film (514), and a medium (515). This embodiment of the light beam combiner (800) is disclosed in a patent application entitled "An Apparatus and a Method for Combining Light Using One Flat Plate and a Method for Manufacturing the Apparatus" filed on May 11, 1998, in the name of Jung Ho Park, Young Jun Park, and Young Mo Hwang, now U.S. Pat. No. 6,005,718, issued Dec. 21, 1999, which application is incorporated herein by reference.

In this embodiment, the anti-reflection coating film (510) allows only a light beam (501) with a first wavelength ($\lambda_1$) from among the three light beams modulated by the modulator (700) to penetrate into a medium (515) without reflection at a first angle $\theta_0$. The wide band high-reflection mirror (511) first-reflects the penetrated light beam with the first wavelength ($\lambda_1$) at a second angle which is different from the first angle in the medium (515). The first combining dichroic mirror (512) makes a first combined light beam by allowing only a light beam (502) with a second wavelength ($\lambda_2$) different from the first wavelength to penetrate into the medium (515) at the first angle and reflecting the light beams with other wavelengths and also by second-reflecting, at the second angle, the first-reflected light beam with the first wavelength ($\lambda_1$) at a point where the light beam with the second wavelength ($\lambda_2$) is penetrated through the first combining dichroic mirror (512). The wide band high-reflection mirror (511) third-reflects the first combined light beam at the second angle in the medium (515) toward the second combining dichroic mirror (513). The second combining dichroic mirror (513) forms a second combined light beam by allowing only the light beam (503) with the third wavelength ($\lambda_3$) different from the first and second wavelengths to penetrate into the medium (515) at the first angle and reflecting the light beams with other wavelengths and also by fourth-reflecting, at the second angle, the third-reflected first combined light beam at a point where the light beam with the third wavelength is penetrated through the second combining dichroic mirror (513). The wide band anti-reflection coating film (514) allows the second combined light beam to penetrate without reflection outside the medium (515). The light beam with the first wavelength which is penetrated through the first combining dichroic mirror (510), the first-reflected light beam, the first combined light beam and the second combined light beam proceed through the medium (515).

Figure 12:
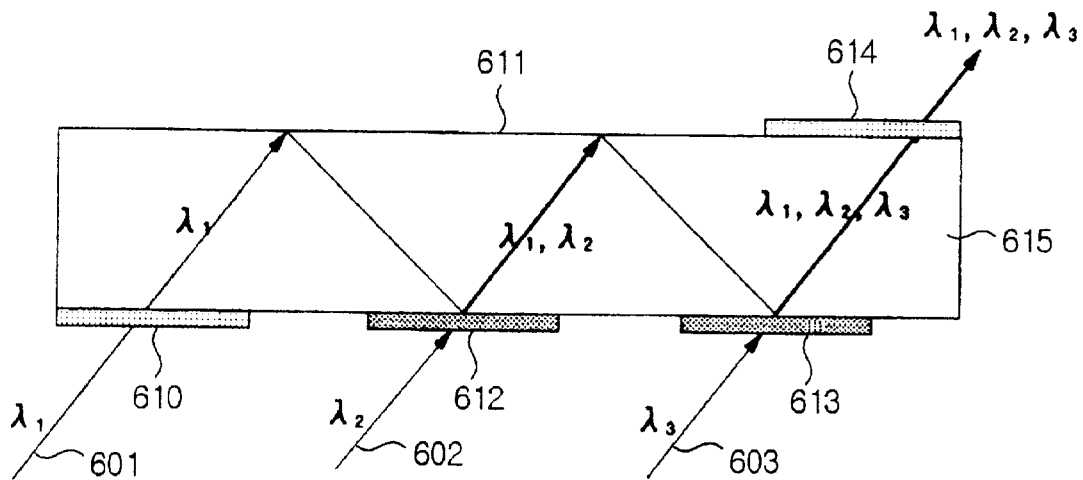
FIG. 12 illustrates a third embodiment of a light beam combining apparatus according to the present invention.

Another embodiment of the light beam combining apparatus (800) for combining three incident light beams with different wavelengths into one light beam, as illustrated in FIG. 12 includes an anti-reflection film (610), a total reflection film (611), a first combining dichroic mirror (612), a second combining dichroic mirror (613), a wide band anti-reflection coating film (614), and a medium (615). The anti-reflection coating film (610) allows only an incident light beam (601) with a first wavelength ($\lambda_1$) from among the three light beams modulated by the modulator (700) to penetrate into the medium (615) without reflection, the incident light beam (601) entering the medium (615) at a total reflection angle. The total reflection film (611) first-total-reflects the penetrated light beam with the first wavelength in the medium (615) toward the first combining dichroic mirror (612). The first combining dichroic mirror (612) generates a first combined light beam by allowing only a light beam (602) with a second wavelength ($\lambda_2$) different from the first wavelength $\lambda_1$ to penetrate through the mirror (612) and reflecting the light beams with other wavelengths and also by second-total-reflecting, at a penetration point of the light beam (602) with the second wavelength ($\lambda_2$), the first-total-reflected light beam with the first wavelength in the medium (615). The first combined light beam hits the total reflection film (611) third-total-reflecting, which third-total-reflects the first combined light beam in the medium (615) toward the second combining dichroic mirror (613). The second combining dichroic mirror (613) generates a second combined light beam by allowing only a light beam (603) with a third wavelength ($\lambda_3$) different from the first and second wavelengths ($\lambda_1$, $\lambda_2$) to penetrate into the medium (615) and reflecting the light beams with other wavelengths and also by fourth-total-reflecting, at a penetration point of the light beam (603) with the third wavelength ($\lambda_3$), the third-total-reflected first combined light beam in the medium (615) toward the wide band anti-reflection coating film (614). The wide band anti-reflection coating film (614) allows the second combined light beam to penetrate without reflection outside the medium (615).

Figure 13:
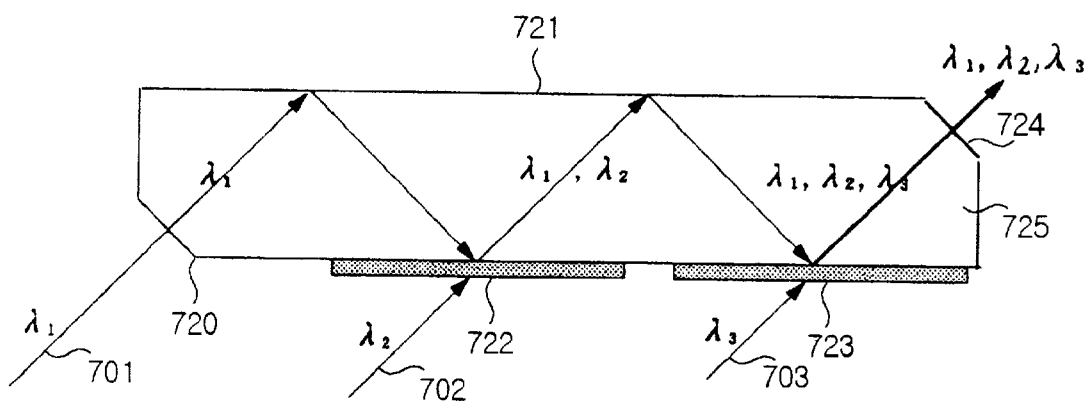
FIG. 13 illustrates a fourth embodiment of a light beam combining apparatus according to the present invention.

Another embodiment of the light beam combining apparatus (800) for combining three incident light beams with different wavelengths into one light beam, as illustrated in FIG. 13 includes an anti-reflection coating film (720), a total reflection film (721), a first combining dichroic mirror (722), a second combining dichroic mirror (723), a wide band anti-reflection coating film (724), and a medium (725). The first combining dichroic mirror (722), the second combining dichroic mirror (723), and the total reflection film (721) correspond to the elements labeled (42), (43) and (41), respectively, in FIG. 3. The anti-reflection coating film (720) is cut into the medium (725) such that it is vertical to the total reflection angle in order to allow penetration without reflection into the medium (725) of only an incident light beam (701) with a first wavelength ($\lambda_1$) from among the three light beams modulated by modulator (700), which enters the medium (725) at the total reflection angle that is determined by the refractive index of the medium (725). The total reflection film (721) first-total-reflects the penetrated light beam with the first wavelength $\lambda_3$ in the medium (725) toward the first combining dichroic mirror (722). The first combining dichroic mirror (722) generates a first combined light beam by allowing only a light beam (702) with a second wavelength ($\lambda_2$) different from the first wavelength to penetration into the medium (725) and reflecting the light beams with other wavelengths and also by second-total-reflecting, at a penetration point of the light beam with the second wavelength, the first-total-reflected light beam with the first wavelength in the medium (725) toward the total reflection film (721). The total reflection film (721) third-total-reflects the first combined light beam in the medium (725) toward the second combining dichroic mirror (723). The second combining dichroic mirror (723) generates a second combined light beam by allowing only a light beam (703) with a third wavelength ($\lambda_3$) different from the first and second wavelengths to penetrate into the medium (725) and reflecting the light beams with other wavelengths and also by fourth-total-reflecting, at a penetration point of the light beam with the third wavelength, the third-total-reflected first combined light beam in the medium (725) toward the wide band anti-reflection coating film (724). The wide band anti-reflection coating film (724) is cut into the medium (725) such that it is vertical with respect to the total reflection angle in order to allow the second combined light beam to penetrate without reflection outside the medium (725).

Figure 14:
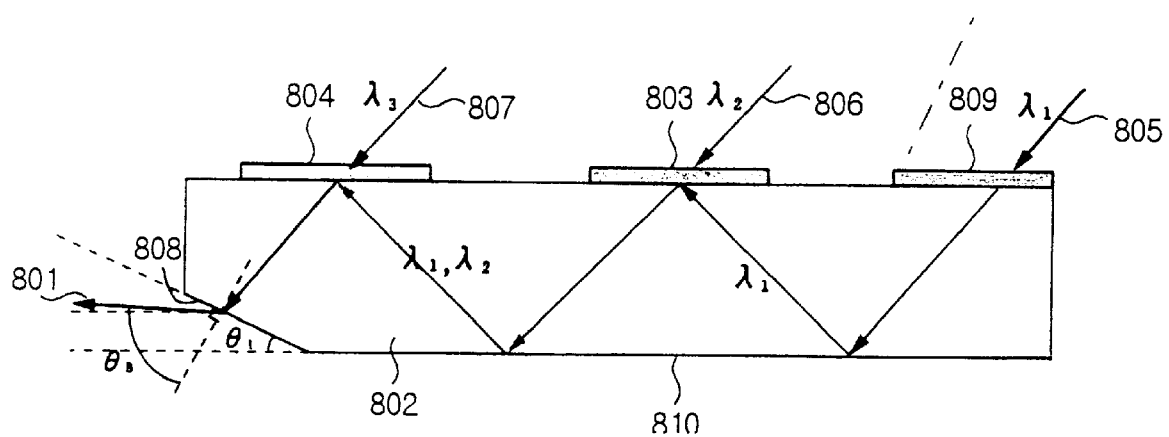
FIG. 14 illustrates a fifth embodiment of a light beam combining apparatus according to the present invention.

Another embodiment of the light beam combining apparatus (800) for combining three incident light beams with different wavelengths into one light beam, as illustrated in FIG. 14 includes an anti-reflection plane (809), a total reflection plane (810), a first combining dichroic mirror (803), a second combining dichroic mirror (804), an outlet plane (808), and a medium (802). The anti-reflection coating film (809) allows only a light beam (805) with a first wavelength ($\lambda_1$), from the three light beams which are modulated by the modulator (700), to enter the medium without reflection at the total reflection angle that is determined by the refractive index of the medium (802). The total reflection plane (810) first-reflects the light beam with first the wavelength which is penetrated into the medium (802) toward the first combining dichroic mirror (803). The first combining dichroic mirror (803) makes a first combined light beam by allowing only a light beam (806) with a second wavelength ($\lambda_2$) which is different from the first wavelength to penetrate into the medium (802) and reflecting the light beams with other wavelengths and also by second-total-reflecting the light beam with the first wavelength $\lambda_1$ that is first-total-reflected, at a point at which the light beam with the second wavelength penetrates, in the medium (802) toward the total reflection plane (810). The total reflection plane (810) third-reflects the first combined light beam in the medium (802) toward the second combining dichroic mirror (804). The second combining dichroic mirror (804) makes a second combined light beam by allowing only a light beam (807) with a third wavelength ($\lambda_3$) which is different from the first and second wavelengths to penetrate into the medium and reflecting the light beams with other wavelengths and also by fourth-total-reflecting the first combined light beam that is third-total-reflected at a point at which the light beam with the third wavelength penetrates, in the medium (802) toward the outlet plane (808). The outlet plane (808) is cut into the medium (802) at an angle of $\theta_r$ with respect to the total reflection plane (810) in order to allow the second combined light beam to penetrate outside the medium (802) without reflection. The second combined light beam exits from the medium (802) at the brewster angle with respect to the vertical component of the cutting plane.

The light beam combining apparatus is combined with the light beam separation apparatus to make the image projection apparatus of the present invention. FIG. 2 shows an exemplary combination with the light beam separation apparatus of FIG. 5 and the light beam combining apparatus of FIG. 10. In the light beam separation apparatus and the light beam combining apparatus, the flat plates that are arranged to face each other on the basis of the medium used are positioned such that they keep equal distance across the medium and are parallel with each other.

Therefore, in the case of the light beam separation apparatus, the incidence angle and the specific interval between the two flat plates in FIG. 5 or between the two sides of the single flat plate in FIGS. 6–9 (on which the various mirrors and coating films are applied in the above described embodiments) determines the gap between the outgoing light beams (that is, e.g., between the blue and green beams, and between the green and red beams). The beam interval between each channel of the modulator needs about 5 mm, considering the elimination of interaction crosstalk between the channels. Accordingly, the light beam incidence angle of the light beam separation apparatus and the arrangement interval between the two flat plates or the two sides is set considering that requirement. For understanding how large the hybrid light beam separation apparatus is, the separation interval between the two flat plates or the two sides of a single flat plate requires about 8.66 mm, so that in case of the incidence angle of the light beam of 30°, the beam interval is 5 mm, which is determined by multiplying 2 by 5 cos 60°. In this case, the hybrid light beam separation apparatus is very small such that the total size of the apparatus does not exceed the maximum length (separation distance of the three primary color light beams) of 2 cm, the width (separation interval between the two flat plates plus the sum of the thickness of the two plates) of 1.2 cm, and a width of 1 cm (2 cm by 1.2 cm by 1 cm). That is fairly small-sized compared with a light separation apparatus using individual elements of the prior art which is about 20 by 10 by 10 centimeters in size. In addition to the reduction in size, the light beam combining apparatus according to the present invention has effects in regard to light alignment in that the prior complicated method of alignment of each individual element is simplified so that the light beam combining apparatus according to the present invention is substantially self-aligning.

The focused light beams of blue, green and red wavelengths separated, in parallel with one another, and keeping the specific beam interval between one another as they exit from the hybrid light beam separation apparatus each enter the appropriate channel of the 3-channel modulator (700). The processing speed for the externally input video signal when the laser beam is modulated in the modulator is related to the diameter of the focused laser beam. Therefore, all of beams of blue, green and red wavelengths need to be focused on the same point of the respective channel of the 3-channel modulator so that the diameters of the three light beams are equal. If the diameters are not equal, the signal processing speed for each channel will be different.

From FIG. 3 to FIG. 5, the phase compensating crystal (600) is a light path compensator to ensure that the focusing point of the blue, green, and red wavelength light beams is on the same point of the respective channel of the modulator. When the light path difference is compared at the exit point for each beam from the hybrid light beam separation apparatus (500) in FIG. 2, in case of the red wavelength light beam, it takes the longest path compared to the exit point of the blue wavelength light beam. This is because the beam is reflected two times by the high-reflection mirror (13) until it reaches the exit point. In the case of the green wavelength light beam, it takes the next longer path compared to the exit point of the blue wavelength light beam because the green wavelength light beam is reflected once by the high-reflection mirror (13) and it then reaches the exit point. As a result, if the phase compensating crystal (600) is not inserted in the embodiment illustrated in FIG. 2, the red wavelength light beam is focused on the appropriate channel of the modulator and the green wavelength light beam is focused on a point which is farther than the focusing point of the red wavelength light beam and the blue wavelength light beam is focused on a point which is farther than the focusing point of the green wavelength light beam, so the signal processing speed for each channel of the modulator will be different.

The more serious problem is that it causes a drop off in efficiency of light modulation. The efficiency of light modulation in the modulator is at its maximum of modulation efficiency when parallel light beams are used, and in the focusing light of the laser beam, the condition that it is nearly parallel light is maintained around the focusing point. The light path compensation length L of the phase compensator is (n−1) times d, when the length of the phase compensator is d and the refractive index of the material of the phase compensator is n. In case where the red wavelength light beam is directly focused on the modulator, the green wavelength light beam and the blue wavelength light beam have a light path difference, which occurs at the exit point, compared to the exit point of the red wavelength light beam. Thus, the phase compensating crystals (600) as illustrated in FIG. 2 plays a role in that the blue, green and red wavelength light beams are focused on the same line by the insertion of the phase compensating crystal (600) with lengths of d1 and d2. In general, light-transparent glass allowed to be used as the phase compensating crystal (600).

In practice, the phase compensating crystal does not need to be inserted when the focal length of the focusing lens is long (dozens of centimeters). In this case where the focal length is long, if the length, which maintains the condition of parallel light at the focusing point, is far longer than the thickness of the crystal of the modulator (about 1 centimeter), the phase compensating crystal does not need to be inserted because the difference of the diameter of the beam in the phase compensating crystal is negligible, even though the focusing point is formed at each different point. In the technical terminology of physics, the length that maintains the condition of parallel light like that in the right and left sides of the focusing point on which the laser beam is focused is called the Rayleigh range, and it is defined such that the diameter of the beam at the focusing point is twice as long as the length that is 1.414 times as long as the diameter.

The blue, green and red wavelength light beams that are adjusted by the phase compensator such that the light paths are equal to one another respectively enter the 3-channel modulator (700). The intensity modulation of the beams are performed according to the video signal corresponding to each channel from the external input in the appropriate channel for each beam. As noted above, the modulator (700) may be an acousto-optic modulator. The principle of acousto-optic modulators is well explained in several textbooks. (Ref. 1: "Design and Fabrication of acousto-optic Devices", P. Goutzoulis/R.Pape, Marcel Decker, Inc., 1994, Ref. 2: "Acousto-Optic Devices: Principles, Design, and Application", Jieping Xu/Robert Straud, John Wiley & Sons, Inc., 1992). The 3-channel acousto-optic modulator is an apparatus in which three electrodes, which generate the acousto elastic wavelength according to the RF (Radio Frequency) signal modulated by the video signal that is added from an external source to the acousto-optic crystal (as representative ones, $TeO_2$, Quartz, Glass, $LiNbO_3$, $PbMoO_4$, GaP, Ge, $Hg_2Cl_2$, $Tl_3AsS_4$, $Tl_3AgSe_3$), are attached side by side. The general individual acousto-optic modulator has the structure which provides one acousto-optic modulator for one electrode. The gap between electrodes of the three channels is about 5 cm and the electrodes are attached separated from one another, with a separation distance between the electrodes sufficient for eliminating crosstalk between mutual channels. Thus, the total size of the 3-channel acousto-optic modulator becomes about 2 (the side parallel with the electrode) by 1 (thickness; the direction that laser beam passes through) by 1 (height; the direction that the acousto elastic wavelength proceed) centimeters, excluding the size of the driving circuit of the acousto-optic modulator. This has an effect in that it cuts down on expenses of manufacturing and cost. In addition, it can fairly reduce the size of the modulator compared to the space for installation which is needed in using individual elements for each channel of the three primary color light beams in the prior art, which was about 20 by 5 by 10 centimeters.

Each of the three primary color light beams which is light-modulated in the 3-channel modulator according to the video signal from the external source enters the hybrid light beam combining apparatus (800), keeping the specific interval between one another and in parallel at the specific incidence angle. The light beam combining apparatus plays a role in generating the color after each beam is modulated according to the video signal by combining each beam of the separated three primary color light beams into one beam, and plays a role in making it easy to scan the beam to a screen using a light beam scanning apparatus when making an image by scanning the beam in which the color is generated according to the external video signal to the screen.

The principle of movements of the hybrid light beam combining apparatus (800) in FIG. 2 is the inverse to the process of movements of the hybrid light beam separation apparatus (500) in FIG. 2. As illustrated in FIG. 2, the structure of the hybrid light beam combining apparatus (800) is such that two flat plates are positioned keeping the specific interval between them constant and in parallel with one another. One of the mirrors is made of a high reflection mirror and is coated on one of the flat plates. One dichroic mirror, the mirror that penetrates the green wavelength light beam and reflects the blue wavelength light beam) and another dichroic mirror, the mirror that penetrates the red wavelength light beam and reflects the remaining colors of the green and blue wavelength light beams are coated side by side on the other flat plate. The separation gap between the two flat plates should be determined so that the beam which is reflected by the high reflection mirror and the incident light beam are exactly consistent and meet with each other on the both dichroic mirrors.

The principle of movements is as follows. The blue wavelength light beam of the three primary colors is reflected once at the high reflection mirror and then arrives at the first dichroic mirror, and it is exactly consistent with the green wavelength light beam that is penetrates through the first dichroic mirror so that the blue wavelength light beam and the green wavelength light beam meet with each other and then are reflected by the H/R mirror. This combined light beam is reflected once more by the high reflection mirror and arrives at the second dichroic mirror, and it is exactly consistent with the red wavelength light beam that is penetrated through the second dichroic mirror. The three wavelength light beams are thus combined into one light beam and reflected so that it exits toward the collimating lens (250). At this time, the light beam combined as one beam becomes the beam in which the color is generated according to the video signal.

The light beam combined as one beam enters the collimating lens (250). As illustrated in FIG. 2, the beam path expander (400), which is inserted between the hybrid light beam combining apparatus (800) and the collimating lens (250), is for reducing the space between the hybrid light beam combining apparatus (800) and the collimating lens (250). The principle of movements of the beam path expander is the same as that of the beam path expander that is inserted between the focusing lens (200) and the modulator (700) to reduce the space required for the system while maintaining the length of the light path. The range between the hybrid light beam combining apparatus (800) and the collimating lens (250) is approximately the same as the range of the light path between the focusing lens (200) and the modulator (700). If the range of the light path between the hybrid light beam combining apparatus (800) and the collimating lens (250) is within 10 centimeters, the beam path expander does not need to be inserted.

The collimating lens (250) plays a role in spreading the beam again that was focused by the focusing lens (200) and then passed through the focusing point of the modulator, at the specific angle. The projection length from the means for scanning (900) and the vertical-scanning angle as well as the horizontal-scanning angle determines the size of screen (1000) which is implemented. If the screen to be implemented is determined, the adjacent scanning beam need not to be overlapped with each other in order to get the image quality with high resolution on the screen. In particular, the maximum diameter of the beam for the chosen screen exists, and if the collimating lens is not inserted, it is difficult to adjust the magnitude of the diameter of the specific beam that is needed on the screen due to the beam which is spread at the focusing point again. The collimating lens is inserted in order to achieve the diameter of the beam necessary to get the high resolution that is needed in the projection length for having the size that is used. The collimated beam is inputted to the means for scanning, and is scanned vertically as well as horizontally by the means for scanning, then that the beam is scanned vertically as well as horizontally to the screen to form an image on the screen. As a representative means of horizontal scanning, there is a polygon mirror (high-speed polygonal rotating mirror) and the galvanometer is used for vertical scanning. As a result of the recent rapid advancement of MEMS technology, a number of micro mirror arrays (for example, DMD) have been developed and the means for scanning can be highly small-sized if such elements are applied to the means of vertical scanning as well as horizontal scanning.

The signal processing speed of the modulator (700) and the scanning speed of the means of vertical scanning as well as horizontal scanning determine the implementation degree of image quality (for example, TV or general video, VGA (computer monitor) and HDTV (high definition television)) with which the image is implemented on the screen. For example, in case of processing the NTSC signal that is used for TV or general video, the modulator needs, at least, a signal processing speed of 5 MHZ, a horizontal scanning speed of 15.75 kHz and a vertical scanning speed of 60 Hz. If the target system has the degree of HDTV, the appropriate speed of light modulation and the speed of vertical scanning as well as horizontal scanning are needed.

As stated above, the present invention is for realizing a high-resolution compact laser display system. More specifically, this invention can make the light beam processing sub-system between the focusing sub-system of the light beam and the collimating lens highly small-sized compared to the prior art system. The hybrid light beam separation apparatus (500), the phase compensating apparatus (600), 3-channel modulator (700) and the hybrid light beam combining apparatus (800) are integrated in one module and the size of that module is about 6 by 5 by 3 centimeters. In the present invention, that is called the hybrid video laser color mixer (HVLCM). The HVLCM has an effect of reducing the size by dozens compared to the case of using the prior individual optical elements. It also cut down on the expense of manufacturing and simplifies the manufacturing, especially since the light alignment is close to self-alignment, so it is also far more advantageous in the light alignment respect compared to the prior art system.

As stated above, the present invention is to realize the image projection apparatus for high-resolution compact laser display.

Moreover, the simplification and small size of the system can be realized in such a way that the collimating lens optical system as well as the focusing lens optical system that are positioned in front and rear of the prior art light modulation apparatus are arranged outside the hybrid light beam separation apparatus and combining apparatus, only one lens is made used and the light path of dozens of centimeters is reduced to a few of centimeters by using the beam path expander.

According to embodiments of the present invention, a laser light source of red, green and blue colors or a white-light laser light source is used for a light source and the mechanical polygonal mirror, the very small micro mirror array etc. are adopted for the means of light scanning. By doing as stated above, the system can be simplified and small-sized maintaining the high efficiency characteristic that can be obtained from the prior art laser video projection system.

Furthermore, in case of realizing the image projection apparatus of the present invention by using the laser diode (150) of three primary colors as a light source, it can be applied to domestic use by reducing the size of apparatus sharply.

We claim:

1. An image projection apparatus comprising:
   light beam separator which separates an incident light beam comprising three light beams having different wavelengths into three separate light beams, each having one of a first, second and third wavelength which are parallel with respect to each other, comprising at least two first mirrors and a first medium which is positioned between two of said at least two first mirrors,
   a 3-channel modulator which modulates said light beams separated by said light beam separator according to an image signal which is inputted from an external source; and
   light beam combiner which modulates one combined light beam by combining the three light beams with said first, second and third wavelengths modulated by said 3-channel modulator, comprising at least two second mirrors which are parallel to one another and a second medium which is positioned between two of said at least two second mirrors.

2. An image projection apparatus as set forth in claim 1, wherein 3-channel modulator is selected from a group of modulators comprising:
   a 3-channel electro-optic modulator and a 3-channel acousto-optic modulator, and further comprising three polarizing apparatuses for the purpose of linearly polarizing the light with each wavelength modulated from said electro-optic modulator.

3. An image projection apparatus as set forth in claim 1, further comprising phase compensators for adjusting a light path corresponding to at least two of the light beams with different wavelengths, said phase compensators being disposed in front of said light beam separator to focus the light beams with different wavelengths separated by said light beam separator on said modulator with light paths which are equal in length to one another.

4. An image projection apparatus as set forth in claim 1, further comprising:
   a light source such as a white-light laser for generating said incident light beam;
   a first beam path expander for reducing length of a light path of said light beam generated by said light source;
   a first high reflection mirror to make said light beam generated by said light source enter said first beam path expander;

a second high reflection mirror to make said light beam from said first beam path expander enter said light beam separator, said second high reflection mirror being positioned at an input side of said light beam separator;

a second beam path expander to reduce length of a light path of said combined light beam output by said light beam combiner;

a third high reflection mirror to make the light beam output by said light beam combiner enter said second beam path expander;

scanner to scan the light beam output by said second beam path expander to a screen; and a fourth high reflection mirror to make the light beam output by said second beam path expander enter said scanner.

5. An image projection apparatus as set forth in claim 3, further comprising:

a light source such as a white-light laser for generating said incident light beam;

a first beam path expander for reducing length of a light path of said light beam generated by said light source;

a first high reflection mirror to make said light beam generated by said light source enter said first beam path expander;

a second high reflection mirror to make said light beam from said first beam path expander enter said light beam separator, said second high reflection mirror being positioned at an input side of said light beam separator;

a second beam path expander to reduce length of a light path of said combined light beam output by said light beam combiner;

a third high reflection mirror to make the light beam output by said light beam combiner enter said second beam path expander;

scanner to scan the light beam output by said second beam path expander to a screen; and a fourth high reflection mirror to make the light beam output by said second beam path expander enter said scanner.

6. An image projection apparatus as set forth in claim 4, wherein at least one of said first and second beam path expanders comprise:

a beam path expander medium;

an incidence plane on which an anti-reflection film is formed so as to make an input light beam enter said beam path expander medium, said medium having a specific refractive index without reflection, said incidence plane being vertical to said input light beam;

a first total reflection plane, which is cut into said beam path expander medium at a total reflection angle that is determined by the refractive index of said beam path expander medium so as to make the light beam which is entered from said incidence plane total-reflect in said beam path expander medium;

a second total reflection plane, which is cut into said beam path expander medium at said total reflection angle so as to make the light beam which is reflected from said first total reflection plane total-reflect in said beam path expander medium at said total reflection angle; and an outlet plane on which an anti-reflection film is formed so as to make the light beam which is reflected by said second total reflection planes exit the beam path expander medium, said outlet plane being vertical to the exiting light beam.

7. An image projection apparatus as set forth in claim 5, wherein at least one of said first and second beam path expanders comprise:

a beam path expander medium;

an incidence plane on which an anti-reflection film is formed so as to make an input light beam enter said beam path expander medium, said medium having a specific refractive index without reflection, said incidence plane being vertical to said input light beam;

a first total reflection plane, which is cut into said beam path expander medium at a total reflection angle that is determined by the refractive index of said beam path expander medium so as to make the light beam which is entered from said incidence plane total-reflect in said beam path expander medium;

a second total reflection plane, which is cut into said beam path expander medium at said total reflection angle so as to make the light beam which is reflected from said first total reflection plane total-reflect in said beam path expander medium at said total reflection angle; and an outlet plane on which an anti-reflection film is formed so as to make the light beam which is reflected by said second total reflection planes exit the beam path expander medium, said outlet plane being vertical to the exiting light beam.

8. An image projection apparatus as set forth in claim 6, wherein said light beam separator comprises:

a first separating dichroic mirror allowing only the light beam with said first wavelength to penetrate through said first separating dichroic mirror and reflecting the light beams with other wavelengths;

a wide band high-reflection mirror reflecting said light beams reflected by said first separating dichroic mirror;

a second separating dichroic mirror allowing only the light beam with said second wavelength different from said first wavelength to penetrate through said second separating dichroic mirror in a direction that is parallel to said light beam with said first wavelength that is penetrated through said first separating dichroic mirror and reflecting the light beams with other wavelengths, for the light beam reflected by said wide band high-reflection mirror;

said wide band high-reflection mirror reflecting the light beam with said third wavelength, which is different from said first and second wavelengths that is reflected by said second separating dichroic mirror past said second separating dichroic mirror in a direction that is parallel to said light beam with said second wavelength that is penetrated through said second separating dichroic mirror; and wherein said first medium is positioned between said first and second separating dichroic mirrors and said wide band high-reflection mirror, and said incident light beam and said reflected light beams pass through said first medium, and wherein said light beam combiner comprises:

a reflection film that makes the light beam with said first wavelength, which enters said second medium from among the three light beams modulated by said modulator, first-reflect in said second medium;

a first combiner dichroic mirror allowing only the light beam with said second wavelength which is different from said first wavelength to penetrate through said first combiner dichroic mirror and reflecting the light beams with other wavelengths;

a second combiner dichroic mirror allowing only the light beam with said third wavelength which is different from said first and second wavelengths to penetrate through said second combiner dichroic mirror and reflecting the light beams with other wavelengths;

said first combiner dichroic mirror second-reflecting said light beam with said first wavelength that is first-reflected in said second medium;

said reflection film third-reflecting a first combined light beam in said second medium, said first combined light beam being formed by combining said light beam with said first said wavelength that is second-reflected by said first combiner dichroic mirror and said light beam with said second wavelength that is penetrated through said second combiner dichroic mirror, at a point at which said light beam with said first wavelength is reflected into said second medium by said first combiner dichroic mirror;

said second combiner dichroic mirror fourth-reflecting said first combined light beam that is third-reflected in said second medium; and wherein a second combined light beam, which is formed by combining said first combined light beam that is fourth-reflected and said light beam with said third wavelength that is penetrated through said second combiner dichroic mirror at a point at which said first combined light beam is reflected into said second medium by said second combiner dichroic mirror, exits said second medium.

9. An image projection apparatus as set forth in claim 7, wherein said light beam separator comprises:

a first separating dichroic mirror allowing only the light beam with said first wavelength to penetrate through said first separating dichroic mirror and reflecting the light beams with other wavelengths;

a wide band high-reflection mirror reflecting said light beams reflected by said first separating dichroic mirror;

a second separating dichroic mirror allowing only the light beam with said second wavelength different from said first wavelength to penetrate through said second separating dichroic mirror in a direction that is parallel to said light beam with said first wavelength that is penetrated through said first separating dichroic mirror and reflecting the light beams with other wavelengths, for the light beam reflected by said wide band high-reflection mirror;

said wide band high-reflection mirror reflecting the light beam with said third wavelength, which is different from said first and second wavelengths that is reflected by said second separating dichroic mirror, past said second separating mirror in a direction that is parallel to said light beam with said second wavelength that is penetrated through said second separating dichroic mirror; and wherein said first medium is positioned between said first and second separating dichroic mirrors and said wide band high-reflection mirror, and said incident light beam and said reflected light beams pass through said first medium, and wherein said light beam combiner comprises:

a reflection film that makes the light beam with said first wavelength, from among the three light beams modulated by said modulator which enters said second medium, first-reflect in said second medium;

a first combiner dichroic mirror allowing only the light beam with said second wavelength which is different from said first wavelength to penetrate through said first combiner dichroic mirror and reflecting the light beams with other wavelengths;

a second combiner dichroic mirror allowing only the light beam with said third wavelength which is different from said first and second wavelengths to penetrate through said second combiner dichroic mirror and reflecting the light beams with other wavelengths;

said first combiner dichroic mirror second-reflecting said light beam with said first wavelength that is first-reflected in said second medium;

said reflection film third-reflecting a first combined light beam in said second medium, said first combined light beam being formed by combining said light beam with said first wavelength that is second-reflected by said first combiner dichroic mirror and said light beam with said second wavelength that is penetrated through said second combiner dichroic mirror, at a point at which said light beam with said first wavelength is reflected into said second medium by said first combiner dichroic mirror;

said second combiner dichroic mirror fourth-reflecting said first combined light beam that is third-reflected in said second medium; and wherein a second combined light beam, which is formed by combining said first combined light beam that is fourth-reflected and said light beam with said third wavelength that is penetrated through said second combiner dichroic mirror at a point at which said first combined light beam is reflected into said second medium by said second combiner dichroic mirror, exits said second medium.

10. An image projection apparatus as set forth in claim 6, wherein said light beam separator comprises:

a first separating dichroic mirror allowing only the light beam with said first wavelength to penetrate through said first separating dichroic mirror and reflecting the light beams with other wavelengths;

a first wide band high-reflection mirror reflecting said light beams reflected by said first separating dichroic mirror;

a second separating dichroic mirror allowing only the light beam with said second wavelength different from said first wavelength to penetrate through said second separating dichroic mirror in a direction that is parallel to said light beam with said first wavelength that is penetrated through said first separating dichroic mirror and reflecting the light beams with other wavelengths, for the light beam reflected by said wide band high-reflection mirror;

said first wide band high-reflection mirror reflecting the light beam with said third wavelength, which is different from said first and second wavelengths that is reflected by said second separating dichroic mirror past said second separating dichroic mirror in a direction that is parallel to said light beam with said second wavelength that is penetrated through said second separating dichroic mirror; and wherein said first medium is positioned between said first and second separating dichroic mirrors and said wide band high-reflection mirror, and said incident light beam and said reflected light beams pass through said first medium, and said light beam combiner comprises:
an anti-reflection coating film allowing the light beam with said first wavelength from among the three light beams modulated by said modulator to penetrate without reflection at a first angle through said anti-reflection coating film into said second medium;
a second wide band high-reflection mirror first-reflecting said penetrated light beam with said first wavelength at a second angle which is different from said first angle in said second medium;
a first combiner dichroic mirror forming a first combined light beam by allowing only the light beam with said second wavelength different from said first wavelength to penetrate through said first combiner dichroic mirror into said second medium at said first angle and reflecting the light beams with other wavelengths and also by second-reflecting said first-reflected light beam with said first wavelength at said second angle at a point at which said light beam with said second wavelength is penetrated through said first combiner dichroic mirror;
said second wide band high-reflection mirror third-reflecting said first combined light beam at said second angle in said second medium;
a second combiner dichroic mirror forming a second combined light beam by allowing only the light beam with said third wavelength different from said first and second wavelengths to penetrate through said second combiner dichroic mirror into said second medium at said first angle and reflecting the light beams with other wavelengths and also by fourth-reflecting said third-reflected first combined light beam at said second angle at a point at which said light beam with said third wavelength is penetrated through said second combiner dichroic mirror;
a wide band anti-reflection coating film allowing said second combined light beam to penetrate without reflection outside said second medium; and
wherein the light beam with said first wavelength which is penetrated through said first combiner dichroic mirror, the first-reflected light beam, the first combined light beam and the second combined light beam pass through said second medium.

11. An image projection apparatus as set forth in claim 7, wherein said light beam separator comprises:
a first separating dichroic mirror allowing only the light beam with said first wavelength to penetrate through said first separating dichroic mirror and reflecting the light beams with other wavelengths;
a first wide band high-reflection mirror reflecting said light beams reflected by said first separating dichroic mirror;
a second separating dichroic mirror allowing only the light beam with said second wavelength different from said first wavelength to penetrate through said second separating dichroic mirror in a direction that is parallel to said light beam with said first wavelength that is penetrated through said first separating dichroic mirror and reflecting the light beams with other wavelengths, for the light beam reflected from said wide band high-reflection mirror;
said first wide band high-reflection mirror reflecting the light beam with said third wavelength, which is different from said first and second wavelengths that is reflected by said second separating dichroic mirror, past said second separating dichroic mirror in a direction that is parallel to said light beam with said second wavelength that is penetrated through said second separating dichroic mirror; and wherein said first medium is positioned between said first and second separating dichroic mirrors and said wide band high-reflection mirror, and said incident light beam and said reflected light beams pass through said first medium, and said light beam combiner comprises:
an anti-reflection coating film allowing the light beam with said first wavelength from among the three light beams modulated by said modulator to penetrate without reflection at a first angle through said anti-reflection coating film into said second medium;
a second wide band high-reflection mirror first-reflecting said penetrated light beam with said first wavelength at a second angle which is different from said first angle in said second medium;
a first combiner dichroic mirror forming a first combined light beam by allowing only the light beam with said second wavelength different from said first wavelength to penetrate through said first combiner dichroic mirror into said second medium at said first angle and reflecting the light beams with other wavelengths and also by second-reflecting said first-reflected light beam with said first wavelength at a point at which said light beam with said second wavelength is penetrated through said first combiner dichroic mirror at said second angle;
said second wide band high-reflection mirror third-reflecting said first combined light beam at said second angle in said second medium;
a second combining dichroic mirror forming a second combined light beam by allowing only the light beam with said third wavelength different from said first and second wavelengths to penetrate into said second medium at said first angle and reflecting the light beams with other wavelengths and also by fourth-reflecting said third-reflected first combined light beam at said second angle at a point at which said light beam with said third wavelength is penetrated through said second combining dichroic mirror;
a wide band anti-reflection coating film allowing said second combined light beam to penetrate without reflection outside said second medium; and
wherein the light beam with said first wavelength which is penetrated through said first combining dichroic mirror, the first-reflected light beam the first combined light beam and the second combined light beam pass through said second medium.

12. An image projection apparatus as set forth in claim 6, wherein said light separator comprises:
first dichroic mirror penetrating only the light with first wavelength and reflecting the lights with other wavelengths;
wide band high-reflection mirror reflecting the light reflected from said first dichroic mirror;
third dichroic mirror penetrating only the light with second wavelength different from the first wavelength to the direction that it is parallel to said light with first wavelength and reflecting the lights with other wavelengths, for the light reflected from said wide band high-reflection mirror;

wide band high-reflection mirror reflecting the light with third wavelength which is different from said first and second wavelengths that is reflected from said third dichroic mirror and then penetrating it to the direction that it is parallel to said light with second wavelength which is penetrated; and material of air, which is positioned between said first, second dichroic mirrors and said wide band high-reflection mirror, where said incidence light and said reflected light proceed, and said light combiner comprises:

anti-reflection coating film penetrating without reflection only the incidence light with first wavelength among the three lights modulated by said modulator, which enters at the total reflection angle;

total reflection film first-total-reflecting said penetrated light with first wavelength in material;

second dichroic mirror generating first combined light by penetrating the only light with second wavelength different from said first wavelength and reflecting the lights with other wavelengths and also by second-total-reflecting, at the penetration point of said light with second wavelength, said first-total-reflected light with first wavelength in material;

total reflection film third-total-reflecting said first combined light in material;

fourth dichroic mirror generating second combined light by penetrating the only light with third wavelength different from said first and second wavelengths in material and reflecting the lights with other wavelengths and also by fourth-total-reflecting, at the penetration point of said light with third wavelength, said third-total-reflected first combined light in material; and wide band anti-reflection coating film for penetrating said second combined light without reflection outside the material.

13. An image projection apparatus as set forth in claim 7, wherein said light separator comprises:

first dichroic mirror penetrating only the light with first wavelength and reflecting the lights with other wavelengths;

wide band high-reflection mirror reflecting the light reflected from said first dichroic mirror;

third dichroic mirror penetrating only the light with second wavelength different from the first wavelength to the direction that it is parallel to said light with first wavelength and reflecting the lights with other wavelengths, for the light reflected from said wide band high-reflection mirror;

wide band high-reflection mirror reflecting the light with third wavelength which is different from said first and second wavelengths that is reflected from said third dichroic mirror and then penetrating it to the direction that it is parallel to said light with second wavelength which is penetrated; and material of air, which is positioned between said first, second dichroic mirrors and said wide band high-reflection mirror, where said incidence light and said reflected light proceed, and said light combiner comprises:

anti-reflection coating film penetrating without reflection only the incidence light with first wavelength among the three lights modulated by said modulator, which enters at the total reflection angle;

total reflection film first-total-reflecting said penetrated light with first wavelength in material;

second dichroic mirror generating first combined light by penetrating the only light with second wavelength different from said first wavelength and reflecting the lights with other wavelengths and also by second-total-reflecting, at the penetration point of said light with second wavelength, said first-total-reflected light with first wavelength in material;

total reflection film third-total-reflecting said first combined light in material;

fourth dichroic mirror generating second combined light by penetrating the only light with third wavelength different from said first and second wavelengths in material and reflecting the lights with other wavelengths and also by fourth-total-reflecting, at the penetration point of said light with third wavelength, said third-total-reflected first combined light in material; and wide band anti-reflection coating film for penetrating said second combined light without reflection outside the material.

14. An image projection apparatus as set forth in claim 6, wherein said light beam separator comprises:

a first separating dichroic mirror allowing only the light beam with said first wavelength to penetrate through said first separating dichroic mirror and reflecting the light beams with other wavelengths;

a wide band high-reflection mirror reflecting said light beams reflected by said first separating dichroic mirror;

a second separating dichroic mirror allowing only the light beam with said second wavelength different from said first wavelength to penetrate through said second separating dichroic mirror in a direction that is parallel to said light beam with said first wavelength that is penetrated through said first separating dichroic mirror and reflecting the light beams with other wavelengths, for the light beam reflected by said wide band high-reflection mirror;

said wide band high-reflection mirror reflecting the light beam with said third wavelength, which is different from said first and second wavelengths that is reflected by said second separating dichroic mirror, past said second separating dichroic mirror in a direction that is parallel to said light beam with said second wavelength that is penetrated through said second separating dichroic mirror; and wherein said first medium is positioned between said first and second separating dichroic mirrors and said wide band high-reflection mirror, and said incident light beam and said reflected light beam pass through said first medium, and said light beam combiner comprises:

an anti-reflection coating film, which is cut into said second medium such that it is vertical with respect to a total reflection angle in order to allow only the light beam with said first wavelength from among the three light beams modulated by said modulator, which enters at the total reflection angle that is determined by a refractive index of said second medium, to penetrate without reflection through said anti-reflection coating film into said second medium;

a total reflection film first-total-reflecting said penetrated light beam with said first wavelength in said second medium;

a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength, said first-total-reflected light beam with said first wavelength in said second medium;

said total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength, said third-total-reflected first combined light beam in said second medium; and a wide band anti-reflection coating film, which is cut into said second medium such that it is vertical to a total reflection angle in order to allow said second combined light beam to penetrate without reflection outside the said second medium.

15. An image projection apparatus as set forth in claim 7, wherein said light beam separator comprises:

a first separating dichroic mirror allowing only the light beam with said first wavelength to penetrate through said first separating dichroic mirror and reflecting the light beams with other wavelengths;

a wide band high-reflection mirror reflecting said light beams reflected by said first separating dichroic mirror;

a second separating dichroic mirror allowing only the light beam with said second wavelength different from said first wavelength to penetrate through said second separating dichroic mirror in a direction that is parallel to said light beam with said first wavelength that is penetrated through said first separating dichroic mirror and reflecting the light beams with other wavelengths, for the light beam reflected by said wide band high-reflection mirror;

said wide band high-reflection mirror reflecting the light beam with said third wavelength which is different from said first and second wavelengths that is reflected by said second separating dichroic mirror, past said second separating dichroic mirror in a direction that is parallel to said light beam with said second wavelength that is penetrated through said second separating dichroic mirror; and wherein said first medium is positioned between said first and second separating dichroic mirrors and said wide band high-reflection mirror, and said incident light beam and said reflected light beam pass through said first medium, and said light beam combiner comprises:

an anti-reflection coating film, which is cut into said second medium such that it is vertical with respect to a total reflection angle in order to allow only the light beam with said first wavelength from among the three light beams modulated by said modulator to penetrate without reflection through said anti-reflection coating film into said second medium, which enters at the total reflection angle that is determined by a refractive index of said second medium;

said total reflection film first-total-reflecting said penetrated light beam with said first wavelength in said second medium;

a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength, said first-total-reflected light beam with said first wavelength in said second medium;

a total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength, said third-total-reflected first combined light beam in said second medium; and a wide band anti-reflection coating film, which is cut into said second medium such that it is vertical to a total reflection angle in order to allow said second combined light beam to penetrate without reflection outside the said second medium.

16. An image projection apparatus as set forth in claim 6, wherein said light beam separator comprises:

a wide band anti-reflection coating film for allowing an incident light beam entered at a first angle with respect to the vertical direction of an incidence plane to penetrate through said wide band anti-reflection coating film into said first medium;

a first separating dichroic mirror allowing only the light beam with said first wavelength to penetrate through said first separating dichroic mirror at said first angle with respect to the vertical direction of a penetration plane and reflecting the light beams with other wavelengths at a second angle with respect to the vertical direction of a reflection plane, for the light beam penetrated through said wide band anti-reflection coating film;

a wide band high-reflection coating film reflecting the light beam reflected by said first separating dichroic mirror at said second angle with respect to the vertical direction of the reflection plane;

a second separating dichroic mirror allowing only the light beam with said second wavelength different from said first wavelength to penetrate through said second separating dichroic mirror into said first medium at said first angle with respect to the vertical direction of the penetration plane and reflecting the light beams with other wavelengths at said second angle with respect to the vertical direction of the reflection plane, for the light beam reflected by said wide band high-reflection coating film;

said wide band high-reflection coating film reflecting the light beam reflected by said second separating dichroic mirror at said second angle with respect to the vertical direction of the reflection plane;

an anti-reflection coating film allowing the light beam with said third wavelength which is different from said first and second wavelengths to penetrate through said anti-reflection coating film without reflection at said first angle with respect to the vertical direction of the penetration plane, for the light beam reflected by said wide band high-reflection coating film; and wherein the light beam penetrated through said wide band anti-reflection coating film and the light beams reflected by said first separating dichroic mirror, said second separating dichroic mirror, and said wide band high-reflection coating film pass through said first medium, and said light beam combiner comprises
- a reflection film that makes the light beam with said first wavelength, which enters said second medium from among the three light beams modulated by said modulator, first-reflect in said second medium;
- a first combiner dichroic mirror allowing only the light beam with said second wavelength which is different from said first wavelength to penetrate through said first combiner dichroic mirror and reflecting the light beams with other wavelengths;
- a second combiner dichroic mirror allowing only the light beam with said third wavelength which is different from said first and second wavelengths to penetrate through said second combiner dichroic mirror and reflecting the light beams with other wavelengths;
  - said first combiner dichroic mirror second-reflecting said light beam with said first wavelength that is first-reflected in said second medium;
  - said reflection film third-reflecting first combined light beam in said second medium, said first combined light beam being formed by combining said light beam with said first wavelength that is second-reflected by said first combiner dichroic mirror and said light beam with said second wavelength that is penetrated through said second combiner dichroic mirror at a second-reflection point at which said light beam with said first wavelength is reflected into said second medium by said first combiner dichroic mirror, in said second medium;
  - said second combiner dichroic mirror fourth-reflecting said first combined light beam that is third-reflected in said second medium; and
    - wherein a second combined light beam, which is formed by combining said first combined light beam that is fourth-reflected and said light beam with said third wavelength that is penetrated through said second combiner dichroic mirror at a point at which said first combined light beam is reflected into said second medium by said second combiner dichroic mirror, exits from said second medium.

17. An image projection apparatus as set forth in claim 7, wherein said light beam separator comprises:
- a wide band anti-reflection coating film for allowing an incident light beam entered at a first angle with respect to the vertical direction of an incidence plane to penetrate through said wide band anti-reflection coating film into said first medium;
- a first separating dichroic mirror allowing only the light beam with said first wavelength to penetrate into said first medium at a first angle with respect to the vertical direction of a penetration plane and reflecting the light beams with other wavelengths at a second angle with respect to the vertical direction of a reflection plane, for the light beam penetrated through said wide band anti-reflection coating film;
- a wide band high-reflection coating film reflecting the light beam reflected by said first separating dichroic mirror at said second angle with respect to the vertical direction of the reflection plane;
- a second separating dichroic mirror allowing only the light beam with said second wavelength different from said first wavelength to penetrate through said second separating dichroic mirror into said first medium at said first angle with respect to the vertical direction of the penetration plane and reflecting the light beams with other wavelengths at said second angle with respect to the vertical direction of the reflection plane, for the light beam reflected by said wide band high-reflection coating film;
  - said wide band high-reflection coating film reflecting the light beam reflected by said second separating dichroic mirror at said second angle with respect to the vertical direction of the reflection plane;
- an anti-reflection coating film allowing the light beam with said third wavelength which is different from said first and second wavelength to penetrate without reflection at said first angle with respect to the vertical direction of the penetration plane, for the light beam reflected by said wide band high-reflection coating film; and wherein the light beam penetrated through said wide band anti-reflection coating film and the light beams reflected by said first separating dichroic mirror, said second separating dichroic mirror, and said wide band high-reflection coating film pass through said first medium, and said light beam combiner comprises:
- a reflection film that makes the light beam with said first wavelength, which enters said second medium from among the three light beams modulated by said modulator, first-reflect in said second medium;
- a first combiner dichroic mirror allowing only the light beam with said second wavelength which is different from said first wavelength to penetrate through said first combiner dichroic mirror and reflecting the light beams with other wavelengths;
- a second combiner dichroic mirror allowing only the light beam with said third wavelength which is different from said first and second wavelength to penetrate through said second combiner dichroic mirror and reflecting the light beams with other wavelengths;
  - said first combiner dichroic mirror second-reflecting said light beam with said first wavelength that is first-reflected in said second medium;
  - said reflection film third-reflecting first combined light beam in said second medium, said first combined light beam being formed by combining said light beam with said first wavelength that is second-reflected by said first combiner dichroic mirror and said light beam with said second wavelength that is penetrated through said second combiner dichroic mirror at a point at which said light beam with said first wavelength is reflected into said second medium by said first combiner dichroic mirror, in said second medium;
  - said second combiner dichroic mirror fourth-reflecting said first combined light beam that is third-reflected in said second medium; and
    - wherein a second combined light beam, which is formed by combining said first combined light beam that is fourth-reflected and said light beam with said third wavelength that is penetrated through said second combiner dichroic mirror at a point at which said first combined light beam is reflected into said second medium by said second combiner dichroic mirror, exits from said second medium.

18. An image projection apparatus as set forth in claim 6, wherein said light beam separator comprises:

a first wide band anti-reflection coating film for allowing an incident light beam entered at a first angle with respect to the vertical direction of an incidence plane to penetrate through said first wide band anti-reflection film into said first medium;

a first separating dichroic mirror allowing only the light beam with said first wavelength to penetrate through said first separating dichroic mirror at said first angle with respect to the vertical direction of a penetration plane and reflecting the light beam with other wavelengths at a second angle with respect to the vertical direction of a reflection plane, for the light beam penetrated through said wide band non-reflection coating film;

a first wide band high-reflection coating film reflecting the light beam reflected by said first separating dichroic mirror at said second angle with respect to the vertical direction of the reflection plane;

a second separating dichroic mirror allowing only the light beam with said second wavelength different from said first wavelength to penetrate through said second separating dichroic mirror into said first medium at said first angle with respect to the vertical direction of the penetration plane and reflecting the light beam with other wavelengths at said second angle with respect to the vertical direction of the reflection plane, for the light beam reflected by said wide band high-reflection coating film;

said first wide band high-reflection coating film reflecting the light beam reflected by said second separating dichroic mirror at said second angle with respect to the vertical direction of the reflection plane;

a first anti-reflection coating film allowing the light beam with said third wavelength which is different from said first and second wavelengths to penetrate through said first anti-reflection coating film without reflection at said first angle with respect to the vertical direction of the penetration plane, for the light beam reflected by said wide band high-reflection coating film; and wherein the light beam penetrated through said wide band anti-reflection coating film and the light beams reflected from said first separating dichroic mirror, said second separating dichroic mirror, and said first wide band high-reflection coating film pass through said first medium, and said light beam combiner comprises:

a first anti-reflection coating film allowing the light beam with said first wavelength from among the three light beams modulated by said modulator to penetrate without reflection at a first angle through said second anti-reflection coating film into said second medium;

a second wide band high-reflection mirror first-reflecting said penetrated light beam with said first wavelength at a second angle which is different from said first angle in said second medium;

a first combiner dichroic mirror forming a first combined light beam by allowing only the light beam with said second wavelength different from said first wavelength to penetrate through said first combiner dichroic mirror into said second medium at said first angle and reflecting the light beams with other wavelengths and also by second-reflecting said first-reflected light beam with said first wavelength at said second angle at a point at which said light beam with said second wavelength is penetrated through said first combiner dichroic mirror;

said second wide band high-reflection mirror third-reflecting said first combined light beam at said second angle in said second medium;

a second combiner dichroic mirror forming a second combined light beam by allowing only the light beam with said third wavelength different from said first and second wavelengths to penetrate through said second combiner dichroic mirror into said second medium at said first angle and reflecting the light beams with other wavelengths and also by fourth-reflecting said third-reflected first combined light beam at said second angle at a point at which said light beam with said third wavelength is penetrated through said second combiner dichroic mirror;

a second wide band anti-reflection coating film allowing said second combined light beam to penetrate without reflection outside said second medium; and wherein the light beam with said first wavelength which is penetrated through said first combiner dichroic mirror, the first-reflected light beam, the first combined light beam and the second combined light beam pass through said second medium.

19. An image projection apparatus as set forth in claim 7, wherein said light beam separator comprises:

a first wide band anti-reflection coating film for allowing an incident light beam entered at a first angle with respect to the vertical direction of an incidence plane to penetrate through said first wide band anti-reflection film into said first medium;

a first separating dichroic mirror allowing only the light beam with said first wavelength to penetrate through said first separating dichroic mirror at said first angle with respect to the vertical direction of a penetration plane and reflecting the light beam with other wavelengths at a second angle with respect to the vertical direction of a reflection plane, for the light beam penetrated through said wide band non-reflection coating film;

a first wide band high-reflection coating film reflecting the light beam reflected by said first separating dichroic mirror at said second angle with respect to the vertical direction of the reflection plane;

a second separating dichroic mirror allowing only the light beam with said second wavelength different from said first wavelength to penetrate through said second separating dichroic mirror into said first medium at said first angle with respect to the vertical direction of the penetration plane and reflecting the light beam with other wavelengths at said second angle with respect to the vertical direction of the reflection plane, for the light beam reflected by said wide band high-reflection coating film;

said first wide band high-reflection coating film reflecting the light beam reflected by said second separating dichroic mirror at said second angle with respect to the vertical direction of the reflection plane;

a first anti-reflection coating film allowing the light beam with said third wavelength which is different from said first and second wavelengths to penetrate through said first anti-reflection coating film without reflection at said first angle with respect to the vertical direction of the penetration plane, for the light beam reflected by said wide band high-reflection coating film; and wherein the light beam penetrated through said wide band anti-reflection coating film and the light beams reflected from said first separating dichroic mirror, said second separating dichroic mirror, and said first wide band high-reflection coating film pass through said first medium, and said light beam combiner comprises:

a second anti-reflection coating film allowing the light beam with said first wavelength from among the three light beams modulated by said modulator to penetrate without reflection at a first angle through said second anti-reflection coating film into said first medium;

a second wide band high-reflection mirror first-reflecting said penetrated light beam with said first wavelength at a second angle which is different from said first angle in said second medium;

a first combiner dichroic mirror forming a first combined light beam by allowing only the light beam with said second wavelength different from said first wavelength to penetrate through said first combiner dichroic mirror into said second medium at said first angle and reflecting the light beams with other wavelengths and also by second-reflecting said first-reflected light beam with said first wavelength at said second angle at a point at which said light beam with said second wavelength is penetrated through said first combiner dichroic mirror;

said second wide band high-reflection mirror third-reflecting said first combined light beam at said second angle in said second medium;

a second combiner dichroic mirror forming a second combined light beam by allowing only the light beam with said third wavelength different from said first and second wavelengths to penetrate through said second combiner dichroic mirror into said second medium at said first angle and reflecting the light beams with other wavelengths and also by fourth-reflecting said third-reflected first combined light beam at said second angle at a point at which said light beam with said third wavelength is penetrated through said second combiner dichroic mirror;

a second wide band anti-reflection coating film allowing said second combined light beam to penetrate without reflection outside said second medium; and wherein the light beam with said first wavelength which is penetrated through said first combiner dichroic mirror, the first-reflected light beam, the first combined light beam and the second combined light beam pass through said second medium.

20. An image projection apparatus as set forth in claim 6, wherein said light beam separator comprises:

a first wide band anti-reflection coating film for allowing an incident light beam entered at a first angle with respect to the vertical direction of an incidence plane to penetrate through said wide band anti-reflection coating film into said first medium;

a first separating dichroic mirror allowing only the light beam with said first wavelength to penetrate through said first separating dichroic mirror at said first angle with respect to the vertical direction of a penetration plane and reflecting the light beams with other wavelengths at a second angle with respect to the vertical direction of a reflection plane, for the light beam penetrated through said wide band non-reflection coating film;

a wide band high-reflection coating film reflecting the light beam reflected by said first separating dichroic mirror at said second angle with respect to the vertical direction of the reflection plane;

a second separating dichroic mirror allowing only the light beam with said second wavelength different from said first wavelength to penetrate through said second separating mirror into said first medium at said first angle with respect to the vertical direction of the penetration plane and reflecting the light beams with other wavelengths at said second angle with respect to the vertical direction of the reflection plane, for the light beam reflected by said wide band high-reflection coating film;

said wide band high-reflection coating film reflecting the light beam reflected by said second separating dichroic mirror at said second angle with respect to the vertical direction of the reflection plane;

a first anti-reflection coating film allowing the light beam with said third wavelength which is different from said first and second wavelength to penetrate through said first anti-reflection coating film without reflection at said first angle with respect to the vertical direction of the penetration plane, for the light beam reflected by said wide band high-reflection coating film; and wherein the light beam penetrated through said first wide band anti-reflection coating film and the light beams reflected by said first separating dichroic mirror, said second separating dichroic mirror, and said wide band high-reflection coating film pass through said first medium, and said light beam combiner comprises:

a second anti-reflection coating film allowing only the incident light beam with said first wavelength from among the three light beams modulated by said modulator, to penetrate through said anti-reflection coating film into said second medium, which enters at a total reflection angle;

a total reflection film first-total-reflecting said penetrated light beam with said first wavelength in said second medium;

a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength through said first combiner dichroic mirror, said first-total-reflected light beam with said first wavelength in said second medium;

said total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-totalreflecting, at a penetration point of said light beam with said third wavelength through said second combiner dichroic mirror, said third-total-reflected first combined light beam in said second medium; and a second wide band anti-reflection coating film for allowing said second combined light beam to penetrate without reflection outside said second medium.

21. An image projection apparatus as set forth in claim 7, wherein said light beam separator comprises:

a first wide band anti-reflection coating film for allowing an incident light beam entered at a first angle with respect to the vertical direction of an incidence plane to penetrate through said wide band anti-reflection coating film into said first medium;

a first separating dichroic mirror allowing only the light beam with said first wavelength to penetrate through said first separating dichroic mirror at said first angle with respect to the vertical direction of a penetration plane and reflecting the light beams with other wavelengths at a second angle with respect to the vertical direction of a reflection plane, for the light beam penetrated through said wide band non-reflection coating film;

a wide band high-reflection coating film reflecting the light beam reflected by said first separating dichroic mirror at said second angle with respect to the vertical direction of the reflection plane;

a second separating dichroic mirror allowing only the light beam with said second wavelength different from said first wavelength to penetrate through said second separating mirror into said first medium at said first angle with respect to the vertical direction of the penetration plane and reflecting the light beams with other wavelengths at said second angle with respect to the vertical direction of the reflection plane, for the light beam reflected by said wide band high-reflection coating film;

said wide band high-reflection coating film reflecting the light beam reflected by said second separating dichroic mirror at said second angle with respect to the vertical direction of the reflection plane;

a first anti-reflection coating film allowing the light beam with said third wavelength anti-reflection coating film without reflection at said first angle with respect to the vertical direction of the penetration plane, for the light beam reflected by said wide band high-reflection coating film; and wherein the light beam penetrated through said first wide band anti-reflection coating film and the light beams reflected by said first separating dichroic mirror, said second separating dichroic mirror, and said wide band high-reflection coating film pass through said first medium, and said light beam combiner comprises:

a second anti-reflection coating film allowing only the incident light beam with said first wavelength from among the three light beams modulated by said modulator to penetrate through said second anti-reflection coating film into said second medium, which enters at the total reflection angle;

a total reflection film first-total-reflecting said penetrated light beam with said first wavelength in said second medium;

a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength, said first-total-reflected light beam with said first wavelength in said second medium;

said total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength, said third-total-reflected first combined light beam in said second medium; and a second wide band anti-reflection coating film for allowing said second combined light beam to penetrate without reflection outside said second medium.

22. An image projection apparatus as set forth in claim 6, wherein said light beam separator comprises:

a first wide band anti-reflection coating film for allowing an incident light beam entered at a first angle with respect to the vertical direction of an incidence plane to penetrate through said first wide band anti-reflection coating film into said first medium;

a first separating dichroic mirror allowing only the light beam with said first wavelength to penetrate through said first separating dichroic mirror at said first angle with respect to the vertical direction of a penetration plane and reflecting the light beams with other wavelengths at a second angle with respect to the vertical direction of a reflection plane, for the light beam penetrated through said wide band non-reflection coating film;

a wide band high-reflection coating film reflecting the light beam reflected by said first separating dichroic mirror at said second angle with respect to the vertical direction of the reflection plane;

a second separating dichroic mirror allowing only the light beam with said second wavelength different from said first wavelength to penetrate through said second separating mirror into said first medium at said first angle with respect to the vertical direction of the penetration plane and reflecting the light beams with other wavelengths at said second angle with respect to the vertical direction of the reflection plane, for the light beam reflected by said wide band high-reflection coating film;

said wide band high-reflection coating film reflecting the light beam reflected by said second separating dichroic mirror at said second angle with respect to the vertical direction of the reflection plane;

a first anti-reflection coating film allowing the light beam with said third wavelength which is different from said first and second wavelengths to penetrate through said first anti-reflection coating film without reflection at said first angle with respect to the vertical direction of the penetration plane, for the light beam reflected by said wide band high-reflection coating film; and wherein the light beam penetrated through said first wide band anti-reflection coating film and the light beams reflected by said first separating dichroic mirror, said second separating dichroic mirror, and said wide band high-reflection coating film pass through said first medium, and said light beam combiner comprises:
- a second anti-reflection coating film, which is cut into said second medium such that it is vertical with respect to a total reflection angle in order to allow only the light beam with said first wavelength from among the three light beams modulated by said modulator, which enters at the total reflection angle that is determined by the refractive index of said second medium, to penetrate through said second anti-reflection coating film;
- a total reflection film first-total-reflecting said penetrated light beam with said first wavelength in said second medium;
- a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength, said first-total-reflected light beam with said first wavelength in said second medium;
    - said total reflection film third-total-reflecting said first combined light beam in said second medium;
- a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength, said third-total-reflected first combined light beam in said second medium; and
- a second wide band anti-reflection coating film, which is cut in said second medium such that it is vertical to said total reflection angle in order to allow said second combined light beam to penetrate without reflection outside said second medium.

23. An image projection apparatus as set forth in claim 7, wherein said light beam separator comprises:
- a first wide band anti-reflection coating film for allowing an incident light beam entered at a first angle with respect to the vertical direction of an incidence plane to penetrate through said first wide band anti-reflection coating film into said first medium;
- a first separating dichroic mirror allowing only the light beam with said first wavelength to penetrate through said first separating dichroic mirror at said first angle with respect to the vertical direction of a penetration plane and reflecting the light beams with other wavelengths at a second angle with respect to the vertical direction of a reflection plane, for the light beam penetrated through said wide band non-reflection coating film;
- a wide band high-reflection coating film reflecting the light beam reflected by said first separating dichroic mirror at said second angle with respect to the vertical direction of the reflection plane;
- a second separating dichroic mirror allowing only the light beam with said second wavelength different from said first wavelength to penetrate through said second separating mirror into said first medium at said first angle with respect to the vertical direction of the penetration plane and reflecting the light beams with other wavelengths at said second angle with respect to the vertical direction of the reflection plane, for the light beam reflected by said wide band high-reflection coating film;
    - said wide band high-reflection coating film reflecting the light beam reflected by said second separating dichroic mirror at said second angle with respect to the vertical direction of the reflection plane;
- a first anti-reflection coating film allowing the light beam with said third wavelength which is different from said first and second wavelengths to penetrate through said first anti-reflection coating film without reflection at said first angle with respect to the vertical direction of the penetration plane, for the light beam reflected by said wide band high-reflection coating film; and wherein the light beam penetrated through said first wide band anti-reflection coating film and the light beams reflected by said first separating dichroic mirror, said second separating dichroic mirror, and said wide band high-reflection coating film pass through said first medium, and said light beam combiner comprises:
- a second anti-reflection coating film, which is cut into said second medium such that it is vertical with respect to a total reflection angle in order to allow only the light beam with said first wavelength from among the three light beams modulated by said modulator, which enters at the total reflection angle that is determined by the refractive index of said second medium, to penetrate through said second anti-reflection coating film;
- a total reflection film first-total-reflecting said penetrated light beam with said first wavelength in said second medium;
- a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength, said first-total-reflected light beam with said first wavelength in said second medium;
    - said total reflection film third-total-reflecting said first combined light beam in said second medium;
- a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength, said third-total-reflected first combined light beam in said second medium; and
- a second wide band anti-reflection coating film, which is cut in said second medium such that it is vertical to said total reflection angle in order to allow said second combined light beam to penetrate without reflection outside said second medium.

24. An image projection apparatus as set forth in claim 6, wherein said light beam separator comprises:
- a wide band anti-reflection coating film for allowing said incident light beam which is entered at a total reflection angle that is determined by the refractive index of said first medium to penetrate through said wide band anti-reflection coating film without reflection;
- a first separating dichroic mirror allowing only the light beam with said first wavelength to penetrate through said first separating dichroic mirror at said total reflection angle and reflecting the light beams with other wavelengths at said total reflection angle, for the light beam penetrated by said wide band anti-reflection coating film;
- a total reflection film total-reflecting the light beam reflected by said first separating dichroic mirror at said total reflection angle;
- a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;
  - said total reflection film total-reflecting the light beam reflected by said second separating dichroic mirror at said total reflection angle;
- an anti-reflection coating film allowing the light beam with said third wavelength which is different from said first and second wavelengths to penetrate through said anti-reflection coating film without reflection, for the light beam reflected by said total reflection film; and
- wherein the light beam penetrated through said wide band anti-reflection coating film and the light beams reflected by said first separating dichroic mirror, said second separating dichroic mirror, and said total reflection film pass through said first medium, and
- said light beam combiner comprises:
  - a reflection film that makes the light beam with said first wavelength, which is entered through said second medium from among the three light beams modulated by said modulator, first-reflect in said second medium;
  - a first combiner dichroic mirror allowing only the light beam with said second wavelength which is different from said first wavelength to penetrate through said first combiner dichroic mirror and reflecting the light beams with other wavelengths;
  - a second combiner dichroic mirror allowing only the light beam with said third wavelength which is different from said first and second wavelengths to penetrate through said second combiner dichroic mirror and reflecting the light beams with other wavelengths;
    - said first combiner dichroic mirror second-reflecting said light beam with said first wavelength that is first-reflected in said second medium;
    - said reflection film third-reflecting a first combined light beam in said second medium, said first combined light beam being formed by combining said light beam with said first wavelength that is second-reflected by said first combiner dichroic mirror and the light beam with said second wavelength that is penetrated through said second combiner dichroic mirror at a point at which said light beam with said first wavelength is reflected into said second medium by said first combiner dichroic mirror, in said second medium;
    - said second combiner dichroic mirror fourth-reflecting said first combined light beam that is third-reflected in said second medium; and film;
    - said total reflection film total-reflecting the light beam reflected by said second separating dichroic mirror at said total reflection angle;
  - an anti-reflection coating film allowing the light beam with said third wavelength which is different from said first and second wavelengths to penetrate through said anti-reflection coating film without reflection, for the light beam reflected by said total reflection film; and
- wherein the light beam penetrated through said wide band anti-reflection coating film and the light beams reflected by said first separating dichroic mirror, said second separating dichroic mirror, and said total reflection film pass through said first medium, and
- said light beam combiner comprises:
  - a reflection film that makes the light beam with said first wavelength, which is entered through said second medium from among the three light beams modulated by said modulator, first-reflect in said second medium;
  - a first combiner dichroic mirror allowing only the light beam with said second wavelength which is different from said first wavelength to penetrate through said first combiner dichroic mirror and reflecting the light beams with other wavelengths;
  - a second combiner dichroic mirror allowing only the light beam with said third wavelength which is different from said first and second wavelengths to penetrate through said second combiner dichroic mirror and reflecting the light beams with other wavelengths;
    - said first combiner dichroic mirror second-reflecting said light beam with said first wavelength that is first-reflected in said second medium;
    - said reflection film third-reflecting a first combined light beam in said second medium, said first combined light beam being formed by combining said light beam with said first wavelength that is second-reflected by said first combiner dichroic mirror and the light beam with said second wavelength that is penetrated through said second combiner dichroic mirror at a point at which said first combined light beam with said first wavelength is reflected into said second medium by said first combiner dichroic mirror, in said second medium;
    - said second combiner dichroic mirror fourth-reflecting said first combined light beam that is third-reflected in said second medium; and
    - wherein a second combined light beam, which is formed by combining said first combined light beam that is fourth-reflected and said light beam with said third wavelength that is penetrated through said second combiner dichroic mirror at a point at which said first combined light beam is reflected into said second medium by said second combiner dichroic mirror, exits said second medium.

25. An image projection apparatus as set forth in claim 7, wherein said means of light beam separation comprises:
- a wide band anti-refection coating film for allowing said incident light beam which is entered at a total reflection angle that is determined by the refractive index of said first medium to penetrate through said wide band anti-reflection coating film without reflection;

a first separating dichroic mirror allowing only the light beam with said first wavelength to penetrate through said first separating dichroic mirror at said total reflection angle and reflecting the light beams with other wavelengths at said total reflection angle, for the light beam penetrated by said wide band anti-reflection coating film;

a total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said total reflection film total-reflecting the light beam reflected by said second separating dichroic mirror at said total reflection angle;

an anti-reflection coating film allowing the light beam with said third wavelength which is different from said first and second wavelengths to penetrate through said anti-reflection coating film without reflection, for the light beam reflected by said total reflection film; and wherein the light beam penetrated through said wide band anti-reflection coating film and the light beams reflected by said first separating dichroic mirror, said second separating dichroic mirror, and said total reflection film pass through said first medium, and said means of light beam combining comprises:

a reflection film that makes the light beam with said first wavelength, which is entered through said second medium from among the three light beams modulated by said modulator, first-reflect in said second medium;

a first combining dichroic mirror allowing only the light beam with said second wavelength which is different from said first wavelength to penetrate through said first combining dichroic mirror and reflecting the light beams with other wavelengths;

a second combining dichroic mirror allowing only the light beam with said third wavelength which is different from said first and second wavelengths to penetrate through said second combining dichroic mirror and reflecting the light beams with other wavelengths;

said first combining dichroic mirror second-reflecting said light beam with said first wavelength that is first-reflected in said second medium;

said reflection film third-reflecting a first combined light beam in said second medium, said first combined light beam being formed by combining said light beam with said first wavelength that is second-reflected by said first combining dichroic mirror and the light beam with said second wavelength that is penetrated through said second combining dichroic mirror at a point at which said light beam with said first wavelength is reflected into said second medium by said first combining dichroic mirror, in said second medium;

said second combining dichroic mirror fourth-reflecting said first combined light beam that is third-reflected in said second medium; and wherein a second combined light beam, which is formed by combining said first combined light beam that is fourth-reflected and said light beam with said third wavelength that is penetrated through said second combining dichroic mirror at a point at which said first combined light beam is reflected into said second medium by said second combining dichroic mirror, exits said second medium.

26. An image projection apparatus as set forth in claim 6, wherein said light beam separator comprises:

a first wide band anti-reflection coating film for allowing said incident light beam which is entered at a total reflection angle that is determined by the refractive index of said first medium to penetrate through said first wide band anti-reflection coating film without reflection;

a first separating dichroic mirror allowing only the light beam with said first wavelength to penetrate through said first separating dichroic mirror at said total reflection angle and reflecting the light beams with other wavelengths at said total reflection angle, for the light beam penetrated by said wide band anti-reflection coating film;

a total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said total reflection film total-reflecting the light beam reflected by said second separating dichroic mirror at said total reflection angle;

a first anti-reflection coating film allowing the light beam with said third wavelength which is different from said first and second wavelengths to penetrate through said first anti-reflection coating film without reflection, for the light beam reflected by said total reflection film; and wherein the light beam penetrated through said first wide band anti-reflection coating film and the light beams reflected by said first separating dichroic mirror, said second separating dichroic mirror, and said total reflection film pass through said first medium, and said light beam combiner comprises:

a second anti-reflection coating film allowing the light beam with said first wavelength from among the three light beams modulated by said modulator to penetrate without reflection at a first angle through said second anti-reflection coating film into said second medium;

a wide band high-reflection mirror first-reflecting said penetrated light beam with said first wavelength at a second angle which is different from said first angle in said second medium;

a first combiner dichroic mirror making a first combined light beam by allowing only the light beam with said second wavelength different from said first wavelength to penetrate through said first combiner dichroic mirror into said second medium at said first angle and reflecting the light beams with other wavelengths and also by second-reflecting said first-reflected light beam with said first wavelength at said second angle at a point at which said light beam with said second wavelength is penetrated through said first combiner dichroic mirror;

said wide band high-reflection mirror third-reflecting said first combined light beam at said second angle in said second medium;

a second combiner dichroic mirror making a second combined light beam by allowing only the light beam with said third wavelength different from said first and second wavelengths to penetrate through said second combiner dichroic mirror into said second medium at said first angle and reflecting the light beams with other wavelengths and also by fourth-reflecting said third-reflected first combined light beam at said second angle at a point at which said light beam with said third wavelength is penetrated through said second combiner dichroic mirror;

a second wide band anti-reflection coating film allowing said second combined light beam to penetrate without reflection outside said second medium; and wherein the light beam with said first wavelength which is penetrated through said first combiner dichroic mirror, the first-reflected light beam, the first combined light beam and the second combined light beam pass through said second medium.

27. An image projection apparatus as set forth in claim 7, wherein said light beam separator comprises:

a first wide band anti-reflection coating film for allowing said incident light beam which is entered at a total reflection angle that is determined by the refractive index of said first medium to penetrate through said first wide band anti-reflection coating film without reflection;

a first separating dichroic mirror allowing only the light beam with said first wavelength to penetrate through said first separating dichroic mirror at said total reflection angle and reflecting the light beams with other wavelengths at said total reflection angle, for the light beam penetrated by said wide band anti-reflection coating film;

a total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said total reflection film total-reflecting the light beam reflected by said second separating dichroic mirror at said total reflection angle;

a first anti-reflection coating film allowing the light beam with said third wavelength which is different from said first and second wavelengths to penetrate through said first anti-reflection coating film without reflection, for the light beam reflected by said total reflection film; and wherein the light beam penetrated through said first wide band anti-reflection coating film and the light beams reflected by said first separating dichroic mirror, said second separating dichroic mirror, and said total reflection film pass through said first medium, and said light beam combiner comprises:

a second anti-reflection coating film allowing the light beam with said first wavelength from among the three light beams modulated by said modulator to penetrate without reflection at a first angle through said second anti-reflection coating film into said second medium;

a wide band high-reflection mirror first-reflecting said penetrated light beam with said first wavelength at a second angle which is different from said first angle in said second medium;

a first combiner dichroic mirror making a first combined light beam by allowing only the light beam with said second wavelength different from said first wavelength to penetrate through said first combiner dichroic mirror into said second medium at said first angle and reflecting the light beams with other wavelengths and also by second-reflecting said first-reflected light beam with said first wavelength at said second angle at a point at which said light beam with said second wavelength is penetrated through said first combiner dichroic mirror;

said wide band high-reflection mirror third-reflecting said first combined light beam at said second angle in said second medium;

a second combiner dichroic mirror making a second combined light beam by allowing only the light beam with said third wavelength different from said first and second wavelengths to penetrate through said second combiner dichroic mirror into said second medium at said first angle and reflecting the light beams with other wavelengths and also by fourth-reflecting said third-reflected first combined light beam at said second angle at a point at which said light beam with said third wavelength is penetrated through said second combiner dichroic mirror at said second angle;

a second wide band anti-reflection coating film allowing said second combined light beam to penetrate without reflection outside said second medium- and wherein the light beam with said first wavelength which is penetrated through said first combiner dichroic mirror, the first-reflected light beam, the first combined light beam and the second combined light beam pass through said second medium.

28. An image projection apparatus as set forth in claim 6, wherein said light beam separator comprises:

a first wide band anti-reflection coating film for allowing said incident light beam which is entered at a total reflection angle that is determined by the refractive index of said first medium to penetrate through said first wide band anti-reflection coating film without reflection;

a first separating dichroic mirror allowing only the light beam with said first wavelength to penetrate through said first separating dichroic mirror at said total reflection angle and reflecting the light beams with other wavelengths at said total reflection angle, for the light beam penetrated by said wide band anti-reflection coating film;

a first total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said first total reflection film;

said first total reflection film total-reflecting the light beam reflected by said second separating dichroic mirror at said total reflection angle;

a first anti-reflection coating film allowing the light beam with said third wavelength which is different from said first and second wavelengths to penetrate through said first anti-reflection coating film without reflection, for the light beam reflected by said total reflection film; and wherein the light beam penetrated through said first wide band anti-reflection coating film and the light beams reflected by said first separating dichroic mirror, said second separating dichroic mirror, and said first total reflection film pass through said first medium, and said light beam combiner comprises:

a second anti-reflection coating film allowing only the light beam with said first wavelength from among the three light beams modulated by said modulator to penetrate through said anti-reflection coating into said second medium, which enters at a total reflection angle;

a second total reflection film first-total-reflecting said penetrated light beam with said first wavelength in said second medium;

a first combiner dichroic mirror generating a first combined light beam by only the light beam with said second wavelength different from said first wavelength to penetrate through said first combiner dichroic mirror and reflecting the light beams with other wavelengths and also by second-total-reflecting, at a penetration point of said light beam with said second wavelength through said first combiner dichroic mirror, said first-total-reflected light beam with said first wavelength in said second medium;

said second total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength through said second combiner dichroic mirror, said third-total-reflected first combined light beam in said second medium; and a second wide band anti-reflection coating film for allowing said second combined light beam to penetrate without reflection outside said second medium.

29. An image projection apparatus as set forth in claim 7, wherein said light beam separator comprises:

a first wide band anti-reflection coating film for allowing said incident light beam which is entered at a total reflection angle that is determined by the refractive index of said first medium to penetrate through said first wide band anti-reflection coating film without reflection;

a first separating dichroic mirror allowing only the light beam with said first wavelength to penetrate through said first separating dichroic mirror at said total reflection angle and reflecting the light beams with other wavelengths at said total reflection angle, for the light beam penetrated by said wide band anti-reflection coating film;

a first total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said first total reflection film;

said first total reflection film total-reflecting the light beam reflected by said second separating dichroic mirror at said total reflection angle;

a first anti-reflection coating film allowing the light beam with said third wavelength which is different from said first and second wavelengths to penetrate through said first anti-reflection coating film without reflection, for the light beam reflected by said total reflection film; and wherein the light beam penetrated through said first wide band anti-reflection coating film and the light beams reflected by said first separating dichroic mirror, said second separating dichroic mirror, and said first total reflection film pass through said first medium, and said light beam combiner comprises:

a second anti-reflection coating film allowing only the light beam with said first wavelength from among the three light beams modulated by said modulator to penetrate through said second anti-reflection coating into said second medium, which enters at a total reflection angle;

a second total reflection film first-total-reflecting said penetrated light beam with said first wavelength in said second medium;

a first combiner dichroic mirror generating a first combined light beam by only the light beam with said second wavelength different from said first wavelength to penetrate through said first combiner dichroic mirror and reflecting the light beams with other wavelengths and also by second-total-reflecting, at a penetration point of said light beam with said second wavelength through said first combiner dichroic mirror, said first-total-reflected light beam with said first wavelength in said second medium, said second total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength through said second combiner dichroic mirror, said third-total-reflected first combined light beam in said second medium; and a second wide band anti-reflection coating film for allowing said second combined light beam to penetrate without reflection outside said second medium.

30. An image projection apparatus as set forth in claim 6, wherein said light beam separator comprises:

a first wide band anti-reflection coating film for allowing said incident light beam which is entered at a total reflection angle that is determined by the refractive index of said first medium to penetrate through said first wide band anti-reflection coating film without reflection;

a first separating dichroic mirror allowing only the light beam with said first wavelength to penetrate through said first separating dichroic mirror at said total reflection angle and reflecting the light beams with other wavelengths at said total reflection angle, for the light beam penetrated by said wide band anti-reflection coating film;

a first total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said first total reflection film total-reflecting the light beam reflected by said second separating dichroic mirror at said total reflection angle;

a first anti-reflection coating film allowing the light beam with said third wavelength which is different from said first and second wavelengths to penetrate through said first anti-reflection coating film without reflection, for the light beam reflected by said total reflection film; and wherein the light beam penetrated through said first wide band anti-reflection coating film and the light beams reflected by said first separating dichroic mirror, said second separating dichroic mirror, and said first total reflection film pass through said first medium, and said light beam combiner comprises:

a second anti-reflection coating film, which is cut into said second medium such that it is vertical with respect to a total reflection angle in order to allow only the light beam with said first wavelength from among the three light beams modulated by said modulator, which enters at the total reflection angle that is determined by the refractive index of said second medium, to penetrate through said second anti-reflection coating film;

a second total reflection film first-total-reflecting said penetrated light beam with said first wavelength in said second medium;

a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength, said first-total-reflected light beam with said first wavelength in said second medium;

said second total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength, said third-total-reflected first combined light beam in said second medium; and a second wide band anti-reflection coating film, which is cut in said second medium such that it is vertical to said total reflection angle in order to allow said second combined light beam to penetrate without reflection outside said second medium.

31. An image projection apparatus as set forth in claim 7, wherein said light beam separator comprises:

a first wide band anti-reflection coating film for allowing said incident light beam which is entered at a total reflection angle that is determined by the refractive index of said first medium to penetrate through said first wide band anti-reflection coating film without reflection, a first separating dichroic mirror allowing only the light beam with said first wavelength to penetrate through said first separating dichroic mirror at said total reflection angle and reflecting the light beams with other wavelengths at said total reflection angle, for the light beam penetrated by said wide band anti-reflection coating film;

a first total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said first total reflection film total-reflecting the light beam reflected by said second separating dichroic mirror at said total reflection angle;

a first anti-reflection coating film allowing the light beam with said third wavelength which is different from said first and second wavelengths to penetrate through said first anti-reflection coating film without reflection, for the light beam reflected by said total reflection film; and wherein the light beam penetrated through said first wide band anti-reflection coating film and the light beams reflected by said first separating dichroic mirror, said second separating dichroic mirror, and said first total reflection film pass through said first medium, and said light beam combiner comprises:

a second anti-reflection coating film, which is cut into said second medium such that it is vertical with respect to a total reflection angle in order to allow only the light beam with said first wavelength from among the three light beams modulated by said modulator, which enters at the total reflection angle that is determined by the refractive index of said second medium, to penetrate through said second anti-reflection coating film;

a second total reflection film first-total-reflecting said penetrated light beam with said first wavelength in said second medium;

a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength, said first-total-reflected light beam with said first wavelength in said second medium;

said second total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength, said third-total-reflected first combined light beam in said second medium; and a second wide band anti-reflection coating film, which is cut in said second medium such that it is vertical to said total reflection angle in order to allow said second combined light beam to penetrate without reflection outside said second medium.

32. An image projection apparatus as set forth in claim 6, wherein said light beam separator comprises:

a wide band anti-reflection coating film that is formed on a cutting plane cut into said first medium such that a total reflection angle is vertical with respect to the cutting plane in order allow to penetrate without reflection the incident light beam which is entered at said total reflection angle that is determined by the refractive index of said first medium;

a first separating dichroic mirror allowing only the light beam with said first wavelength to penetrate through said first separating dichroic mirror at said total reflection angle and reflecting the light beams with other wavelengths at said total reflection angle, for the light beam penetrated through said wide band anti-reflection coating film;

a total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said total reflection film total-reflecting the light beam reflected from said second separating dichroic mirror at said total reflection angle;

an anti-reflection coating film allowing the light beam with said third wavelength which is different from said first and second wavelengths to penetrate through said anti-reflection coating film without reflection, for the light beam reflected by said total reflection film; and wherein the light beam penetrated through said wide band anti-reflection coating film and the light beams reflected from said first separating dichroic mirror, said second separating dichroic mirror, and said total reflection film pass through said first medium, and said light beam combiner comprises:

a reflection film that makes the light beam with said first wavelength, which enters said second medium from among the three light beams modulated by said modulator, first-reflect in said second medium;

a first combiner dichroic mirror allowing only the light beam with said second wavelength which is different from said first wavelength to penetrate through said first combiner dichroic mirror and reflecting the light beams with other wavelengths;

a second combiner dichroic mirror allowing only the light beam with said third wavelength which is different from said first and second wavelength to penetrate through said second combiner mirror and reflecting the light beams with other wavelengths;

said first combiner dichroic mirror second-reflecting said light beam with said first wavelength that is first-reflected in said second medium;

said reflection film third-reflecting first combined light beam in said second medium, said first combined light beam being formed by combining said light beam with said first wavelength that is second-reflected by said first combiner dichroic mirror and said light beam with said second wavelength that is penetrated through said second combiner dichroic mirror at a point at which said light beam with said first wavelength is reflected into said second medium by said first combiner dichroic mirror, in said second medium;

said second combiner dichroic mirror fourth-reflecting said first combined light beam that is third-reflected in said second medium; and wherein a second combined light beam, which is formed by combining said first combined light beam that is fourth-reflected and said light beam with said third wavelength that is penetrated through said second combiner dichroic mirror at a point at which said first combined light beam is reflected into said second medium by said second combiner dichroic mirror, exits from said second medium.

33. An image projection apparatus as set forth in claim 7, wherein said light beam separator comprises:

a wide band anti-reflection coating film that is formed on a cutting plane cut into said first medium such that a total reflection angle is vertical with respect to the cutting plane in order allow to penetrate without reflection the incident light beam which is entered at said total reflection angle that is determined by the refractive index of said first medium;

a first separating dichroic mirror allowing only the light beam with said first wavelength to penetrate through said first separating dichroic mirror at said total reflection angle and reflecting the light beams with other wavelengths at said total reflection angle, for the light beam penetrated through said wide band anti-reflection coating film;

a total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said total reflection film total-reflecting the light beam reflected from said second separating dichroic mirror at said total reflection angle;

an anti-reflection coating film allowing the light beam with said third wavelength which is different from said first and second wavelengths to penetrate through said anti-reflection coating film without reflection, for the light beam reflected by said total reflection film; and wherein the light beam penetrated through said wide band anti-reflection coating film and the light beams reflected from said first separating dichroic mirror, said second separating dichroic mirror, and said total reflection film pass through said first medium, and said light beam combiner comprises:
  a reflection film that makes the light beam with said first wavelength, which enters said second medium from among the three light beams modulated by said modulator, first-reflect in said second medium;
  a first combiner dichroic mirror allowing only the light beam with said second wavelength which is different from said first wavelength to penetrate through said first combiner dichroic mirror and reflecting the light beams with other wavelengths;
  a second combiner dichroic mirror allowing only the light beam with said third wavelength which is different from said first and second wavelengths to penetrate through said second combiner mirror and reflecting the light beams with other wavelengths;
    said first combiner dichroic mirror second-reflecting said light beam with said first wavelength that is first-reflected in said second medium;
    said reflection film third-reflecting first combined light beam into said second medium, said first combined light beam being formed by combining said light beam with said first said wavelength that is second-reflected by said first combiner dichroic mirror and said light beam with said second wavelength that is penetrated through said second combiner dichroic mirror at a point at which said light beam with said first wavelength is reflected into said second medium by said first combiner dichroic mirror, in said second medium;
    said second combiner dichroic mirror fourth-reflecting said first combined light beam that is third-reflected in said second medium; and
      wherein a second combined light beam, which is formed by combining said first combined light beam that is fourth-reflected and said light beam with said third wavelength that is penetrated through said second combiner dichroic mirror at a point at which said first combined light beam is reflected into said second medium by said second combiner dichroic mirror, exits from said second medium.

34. An image projection apparatus as set forth in claim 6, wherein said light beam separator comprises:
  a first wide band anti-reflection coating film that is formed on a cutting plane cut into said first medium such that a total reflection angle is vertical with respect to the cutting plane in order allow to penetrate without reflection the incident light beam which is entered at said total reflection angle that is determined by the refractive index of said first medium;
  a first separating dichroic mirror allowing only the light beam with said first wavelength to penetrate through said first separating dichroic mirror at said total reflection angle and reflecting the light beams with other wavelengths at said total reflection angle, for the light beam penetrated through said wide band anti-reflection coating film;

a total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;
  said total reflection film total-reflecting the light beam reflected from said second separating dichroic mirror at said total reflection angle;

a first anti-reflection coating film allowing the light beam with said third wavelength which is different from said first and second wavelengths to penetrate through said first anti-reflection coating film without reflection, for the light beam reflected by said total reflection film; and wherein the light beam penetrated through said first wide band anti-reflection coating film and the light beams reflected from said first separating dichroic mirror, said second separating dichroic mirror, and said total reflection film pass through said first medium, and said light beam combiner comprises:
  a second anti-reflection coating film allowing the light beam with said first wavelength from among the three light beams modulated by said modulator to penetrate without reflection at a first angle through said second anti-reflection coating film into said second medium;
  a wide band high-reflection mirror first-reflecting said penetrated light beam with said a first wavelength at a second angle which is different from said first angle in said second medium;
  a first combiner dichroic mirror making a first combined light beam by allowing only the light beam with said second wavelength different from said first wavelength to penetrate through said first combiner dichroic mirror into said second medium at said first angle and reflecting the light beams with other wavelengths and also by second-reflecting said first-reflected light beam with said first wavelength at said second angle at a point at which said light beam with said second wavelength is penetrated through said first combiner dichroic mirror;
    said wide band high-reflection mirror third-reflecting said first combined light beam at said second angle in said second medium;
  a second combiner dichroic mirror making a second combined light beam by allowing only the light beam with said third wavelength different from said first and second wavelengths to penetrate through said second combiner dichroic mirror into said second medium at said first angle and reflecting the light beams with other wavelengths and also by fourth-reflecting said third-reflected first combined light beam at said second angle at a point at which said light beam with said third wavelength is penetrated through said second combiner dichroic mirror;
  a second wide band anti-reflection coating film allowing said second combined light beam to penetrate without reflection outside said second medium; and
    wherein the light beam with said first wavelength which is penetrated through said first combiner dichroic mirror, the first-reflected light beam, the first combined light beam and the second combined light beam pass through said second medium.

35. An image projection apparatus as set forth in claim 7, wherein said light beam separator comprises:
- a first wide band anti-reflection coating film that is formed on a cutting plane cut into said first medium such that a total reflection angle is vertical with respect to the cutting plane said in order allow to penetrate without reflection the incident light beam which is entered at said total reflection angle that is determined by the refractive index of said first medium;
- a first separating dichroic mirror allowing only the light beam with said first wavelength to penetrate through said first separating dichroic mirror at said total reflection angle and reflecting the light beams with other wavelengths at said total reflection angle, for the light beam penetrated through said wide band anti-reflection coating film;
- a total reflection film total-reflecting the light beam reflected by said first separating dichroic mirror at said total reflection angle;
- a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;
  - said total reflection film total-reflecting the light beam reflected from said second separating dichroic mirror at said total reflection angle;
- a first anti-reflection coating film allowing the light beam with said third wavelength which is different from said first and second wavelengths to penetrate through said first anti-reflection coating film without reflection, for the light beam reflected by said total reflection film; and wherein the light beam penetrated through said first wide band anti-reflection coating film and the light beams reflected from said first separating dichroic mirror, said second separating dichroic mirror, and said total reflection film pass through said first medium, and said light beam combiner comprises:
  - a second anti-reflection coating film allowing the light beam with said first wavelength from among the three light beams modulated by said modulator to penetrate without reflection at a first angle through said second anti-reflection coating film into said second medium;
  - a wide band high-reflection mirror first-reflecting said penetrated light beam with said first wavelength at a second angle which is different from said first angle in said second medium;
  - a first combiner dichroic mirror making a first combined light beam by allowing only the light beam with said second wavelength different from said first wavelength to penetrate through said first combiner dichroic mirror into said second medium at said first angle and reflecting the light beams with other wavelengths and also by second-reflecting said first-reflected light beam with said first wavelength at said second angle at a point at which said light beam with said second wavelength is penetrated through said first combiner dichroic mirror;
  - said wide band high-reflection mirror third-reflecting said first combined light beam at said second angle in said second medium;
  - a second combiner dichroic mirror forming a second combined light beam by allowing only the light beam with said third wavelength different from said first and second wavelengths to penetrate through said second combiner dichroic mirror into said second medium at said first angle and reflecting the light beams with other wavelengths and also by fourth-reflecting said third-reflected first combined light beam at said second angle at a point at which said light beam with said third wavelength is penetrated through said second combiner dichroic mirror;
  - a second wide band anti-reflection coating film allowing said second combined light beam to penetrate without reflection outside said second medium; and
  - wherein the light beam with said first wavelength which is penetrated through said first combiner dichroic mirror, the first-reflected light beam, the first combined light beam and the second combined light beam pass through said second medium.

36. An image projection apparatus as set forth in claim 6, wherein said light beam separator comprises:
- a first wide band anti-reflection coating film that is formed on a cutting plane cut into said first medium such that a total reflection angle is vertical with respect to the cutting plane in order allow to penetrate without reflection the incident light beam which is entered at said total reflection angle that is determined by the refractive index of said first medium;
- a first separating dichroic mirror allowing only the light beam with said first wavelength to penetrate through said first separating dichroic mirror at said total reflection angle and reflecting the light beams with other wavelengths at said total reflection angle, for the light beam penetrated through said wide band anti-reflection coating film;
- a first total reflection film total-reflecting the light beam reflected by said first separating dichroic mirror at said total reflection angle;
- a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;
  - said first total reflection film total-reflecting the light beam reflected from said second separating dichroic mirror at said total reflection angle;
- a first anti-reflection coating film allowing the light beam with said third wavelength which is different from said first and second wavelengths to penetrate through said first anti-reflection coating film without reflection, for the light beam reflected by said total reflection film; and wherein the light beam penetrated through said first wide band anti-reflection coating film and the light beams reflected from said first separating dichroic mirror, said second separating dichroic mirror, and said first total reflection film pass through said first medium, and said light beam combiner comprises:
  - a second anti-reflection coating film allowing only the incident light beam with said first wavelength from among the three light beams modulated by said modulator to penetrate through said second anti-reflection coating film into said second medium, which enters at the total reflection angle;
  - a second total reflection film first-total-reflecting said penetrated light beam with said first wavelength in said second medium;

a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength through said first combiner dichroic mirror, said first-total-reflected light beam with said first wavelength in said second medium;

said second total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength through said second combiner dichroic mirror, said third-total-reflected first combined light beam in said second medium; and a second wide band anti-reflection coating film for allowing said second combined light beam to penetrate without reflection outside said second medium.

37. An image projection apparatus as set forth in claim 7, wherein said light beam separator comprises:

a first wide band anti-reflection coating film that is formed on a cutting plane cut into said first medium such that a total reflection angle is vertical with respect to the cutting plane in order allow to penetrate without reflection the incident light beam which is entered at said total reflection angle that is determined by the refractive index of said first medium;

a first separating dichroic mirror allowing only the light beam with said first wavelength to penetrate through said first separating dichroic mirror at said total reflection angle and reflecting the light beams with other wavelengths at said total reflection angle, for the light beam penetrated through said first wide band anti-reflection coating film;

a first total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said first total reflection film total-reflecting the light beam reflected from said second separating dichroic mirror at said total reflection angle;

a first anti-reflection coating film allowing the light beam with said third wavelength which is different from said first and second wavelengths to penetrate through said first anti-reflection coating film without reflection, for the light beam reflected by said total reflection film; and wherein the light beam penetrated through said first wide band anti-reflection coating film and the light beams reflected from said first separating dichroic mirror, said second separating dichroic mirror, and said first total reflection film pass through said first medium, and said light beam combiner comprises:

a second anti-reflection coating film allowing only the incident light beam with said first wavelength from among the three light beams modulated by said modulator to penetrate through said second anti-reflection coating film into said second medium, which enters at the total reflection angle;

a second total reflection film first-total-reflecting said penetrated light beam with said first wavelength in said second medium;

a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength through said first combiner dichroic mirror, said first-total-reflected light beam with said first wavelength in said second medium;

said second total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength through said second combiner dichroic mirror, said third-total-reflected first combined light beam in said second medium; and a second wide band anti-reflection coating film for allowing said second combined light beam to penetrate without reflection outside said second medium.

38. An image projection apparatus as set forth in claim 6, wherein said light beam separator comprises:

a first wide band anti-reflection coating film that is formed on a cutting plane cut into said first medium such that a total reflection angle is vertical with respect to the cutting plane in order allow to penetrate without reflection the incident light beam which is entered at said total reflection angle that is determined by the refractive index of said first medium;

a first separating dichroic mirror allowing only the light beam with said first wavelength to penetrate through said first separating dichroic mirror at said total reflection angle and reflecting the light beams with other wavelengths at said total reflection angle, for the light beam penetrated through said wide band anti-reflection coating film;

a first total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said first total reflection film total-reflecting the light beam reflected from said second separating dichroic mirror at said total reflection angle;

a first anti-reflection coating film allowing the light beam with said third wavelength which is different from said first and second wavelengths to penetrate through said first anti-reflection coating film without reflection, for the light beam reflected by said total reflection film; and wherein the light beam penetrated through said first wide band anti-reflection coating film and the light beams reflected from said first separating dichroic mirror, said second separating dichroic mirror, and said first total reflection film pass through said first medium, and said light beam combiner comprises:

a second anti-reflection coating film, which is cut into said second medium such that it is vertical with respect to a total reflection angle in order to allow only the light beam with said first wavelength from among the three light beams modulated by said modulator, which enters at the total reflection angle that is determined by the refractive index of said second medium, to penetrate through said second anti-reflection coating film;

a second total reflection film first-total-reflecting said penetrated light beam with said first wavelength in said second medium;

a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength, said first-total-reflected light beam with said first wavelength in said second medium;

said second total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength, said third-total-reflected first combined light beam in said second medium; and a second wide band anti-reflection coating film, which is cut in said second medium such that it is vertical to said total reflection angle in order to allow said second combined light beam to penetrate without reflection outside said second medium.

39. An image projection apparatus as set forth in claim 7, wherein said light beam separator comprises:

a first wide band anti-reflection coating film that is formed on a cutting plane cut into said first medium such that a total reflection angle is vertical with respect to the cutting plane in order allow to penetrate without reflection the incident light beam which is entered at said total reflection angle that is determined by the refractive index of said first medium;

a first separating dichroic mirror allowing only the light beam with said first wavelength to penetrate through said first separating dichroic mirror at said total reflection angle and reflecting the light beams with other wavelengths at said total reflection angle, for the light beam penetrated through said wide band anti-reflection coating film;

a first total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said first total reflection film total-reflecting the light beam reflected from said second separating dichroic mirror at said total reflection angle;

a first anti-reflection coating film allowing the light beam with said third wavelength which is different from said first and second wavelengths to penetrate through said first anti-reflection coating film without reflection, for the light beam reflected by said total reflection film; and wherein the light beam penetrated through said first wide band anti-reflection coating film and the light beams reflected from said first separating dichroic mirror, said second separating dichroic mirror, and said first total reflection film pass through said first medium, and said light beam combiner comprises:

a first anti-reflection coating film, which is cut into said second medium such that it is vertical with respect to a total reflection angle in order to allow only the light beam with said first wavelength from among the three light beams modulated by said modulator, which enters at the total reflection angle that is determined by the refractive index of said second medium, to penetrate through said second anti-reflection coating film;

a second total reflection film first-total-reflecting said penetrated light beam with said first wavelength in said second medium;

a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength, said first-total-reflected light beam with said first wavelength in said second medium;

said second total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength, said third-total-reflected first combined light beam in said second medium; and a second wide band anti-reflection coating film, which is cut in said second medium such that it is vertical to said total reflection angle in order to allow said second combined light beam to penetrate without reflection outside said second medium.

40. An image projection apparatus as set forth in claim 6, wherein said light beam separator comprises:
- an incidence plane cut in said first medium so that the incident light beam enters at a brewster angle with respect to the vertical direction of said incidence plane and the incident light beam is refracted at a total reflection angle that is determined by the refractive index of said first medium;
- a first separating dichroic mirror allowing only the light beam with said first wavelength to penetrate through said first separating dichroic mirror and reflecting the light beams with other wavelengths at said total reflection angle for said incident light beam;
- a total reflection plane total-reflecting the light beam reflected by said first separating dichroic mirror at said total reflection angle;
- a second separating dichroic mirror allowing only the light beam with said second wavelength different from said first wavelength to penetrate through said second separating dichroic mirror and reflecting the light beams with other wavelengths at said total reflection angle for the light beam reflected by said total reflection plane;
  - said total reflection plane total-reflection the light beam reflected by said second separating dichroic mirror at said total reflection angle;
- a penetration plane made of an anti-reflection coating film allowing the light beam with said third wavelength different from said first and second wavelengths to penetrate through said penetration plane without reflection for the light beam reflected by said total reflection film; and
- wherein the light beam penetrated through said incidence plane and the light beam reflected by said first separating dichroic mirror, said second separating dichroic mirror and said total reflection film pass through said first medium, and
- said light beam combiner comprises:
  - a reflection film that makes the light beam with said first wavelength, which enters said second medium from among the three light beams modulated by said modulator, first-reflect in said second medium;
  - a first combiner dichroic mirror allowing only the light beam with said second wavelength which is different from said first wavelength to penetrate through said first combiner dichroic mirror and reflecting the light beams with other wavelengths;
  - a second combiner dichroic mirror allowing only the light beam with said third wavelength which is different from said first and second wavelength to penetrate through said second combiner mirror and reflecting the light beams with other wavelengths;
  - said first combiner dichroic mirror second-reflecting said light beam with said first wavelength that is first-reflected in said second medium;
  - said reflection film third-reflecting first combined light beam in said second medium, said first combined light beam being formed by combining said light beam with said first wavelength that is second-reflected by said first combiner dichroic mirror and said light beam with said second wavelength that is penetrated through said second combiner dichroic mirror at a point at which said light beam with said first wavelength is reflected into said second medium by said first combiner dichroic mirror, in said second medium;
  - said second combiner dichroic mirror fourth-reflecting said first combined light beam that is third-reflected in said second medium; and
  - wherein a second combined light beam, which is formed by combining said first combined light beam that is fourth-reflected and said light beam with said third wavelength that is penetrated through said second combiner dichroic mirror at a point at which said first combined light beam is reflected into said second medium by said second combiner dichroic mirror, exits from said second medium.

41. An image projection apparatus as set forth in claim 7, wherein said light beam separator comprises:
- an incidence plane cut in said first medium so that the incident light beam enters at a brewster angle with respect to the vertical direction of an incidence plane and the incident light beam is refracted at a total reflection angle that is determined by the refractive index of said first medium;
- a first separating dichroic mirror allowing only the light beam with said first wavelength to penetrate through said first separating dichroic mirror and reflecting the light beams with other wavelengths at said total reflection angle for said incident light beam;
- a total reflection plane total-reflecting the light beam reflected by said first separating dichroic mirror at said total reflection angle;
- a second separating dichroic mirror allowing only the light beam with said second wavelength different from said first wavelength to penetrate through said second separating dichroic mirror and reflecting the light beams with other wavelengths at said total reflection angle for the light beam reflected by said total reflection plane;
  - said total reflection plane total-reflecting the light beam reflected by said second separating dichroic mirror at said total reflection angle;
- a penetration plane made of an anti-reflection coating film allowing the light beam with said third wavelength different from said first and second wavelengths to penetrate through said penetration plane, without reflection for the light beam reflected by said total reflection film; and
- wherein the light beam penetrated through said incidence plane and the light beam reflected by said first separating dichroic mirror, said second separating dichroic mirror and said total reflection film pass through said first medium, and
- said light beam combiner comprises:
  - a reflection film that makes the light beam with said first wavelength, which enters said second medium from among the three light beams modulated by said modulator, first-reflect in said second medium;
  - a first combiner dichroic mirror allowing only the light beam with said second wavelength which is different from said first wavelength to penetrate through said first combiner dichroic mirror and reflecting the light beams with other wavelengths;
  - a second combiner dichroic mirror allowing only the light beam with said third wavelength which is different from said first and second wavelength to penetrate through said second combiner mirror and reflecting the light beams with other wavelengths;

said first combiner dichroic mirror second-reflecting said light beam with said first wavelength that is first-reflected in said second medium;

said reflection film third-reflecting first combined light beam in said second medium, said first combined light beam being formed by combining said light beam with said first wavelength that is second-reflected by said first combiner dichroic mirror and said light beam with said second wavelength that is penetrated through said second combiner dichroic mirror at a point at which said light beam with said first wavelength is reflected into said second medium by said first combiner dichroic mirror, in said second medium;

said second combiner dichroic mirror fourth-reflecting said first combined light beam that is third-reflected in said second medium; and wherein a second combined light beam, which is formed by combining said first combined light beam that is fourth-reflected and said light beam with said third wavelength that is penetrated through said second combiner dichroic mirror at a point at which said first combined light beam is reflected into said second medium by said second combiner dichroic mirror, exits from said second medium.

42. An image projection apparatus as set forth in claim 6, wherein said light beam separator comprises:

a first separating dichroic mirror allowing only the light beam with said first wavelength to penetrate through said first separating dichroic mirror and reflecting the light beams with other wavelengths, a wide band high-reflection mirror reflecting said light beams reflected by said first separating dichroic mirror;

a second separating dichroic mirror allowing only the light beam with said second wavelength different from said first wavelength to penetrate through said second separating dichroic mirror in a direction that is parallel to said light beam with said first wavelength that is penetrated through said first separating dichroic mirror and reflecting the light beams with other wavelengths, for the light beam reflected by said wide band high-reflection mirror;

said wide band high-reflection mirror reflecting the light beam with said third wavelength which is different from said first and second wavelengths that is reflected by said second separating dichroic mirror past said second separating dichroic mirror in a direction that is parallel to said light beam with said second wavelength that is penetrated through said second separating dichroic mirror; and wherein said first medium is positioned between said first and second separating dichroic mirrors and said wide band high-reflection mirror, and said incident light beam and said reflected light beams pass through said first medium, and wherein said light beam combiner comprises:

an anti-reflection coating film allowing only the light beam with said first wavelength entering at the total reflection angle that is determined by the refractive index of said second medium from among the three light beams which are modulated by said modulator to penetrate through said anti-reflection coating film without reflection in said second medium;

a total reflection plane first-reflecting said light beam with said first wavelength which is penetrated in said second medium;

a first combiner dichroic mirror forming a first combined light beam by allowing only the light beam with said second wavelength which is different from said first wavelength to penetrate through said first combiner dichroic mirror into said second medium and reflecting the light beams with other wavelengths and also by second-total-reflecting said light beam with said first wavelength, that is first-total-reflected at a point at which said light beam with said second wavelength is penetrated, in said second medium;

said total reflection plane third-reflecting said first combined light beam in said second medium;

a second combiner dichroic mirror forming a second combined light beam by allowing only the light beam with said third wavelength which is different from said first and second wavelengths to penetrate through said second combiner dichroic mirror into said second medium and reflecting the light beams with other wavelengths and also by fourth-total-reflecting the first combined light beam, that is third-total-reflected at a point at which said light beam with said third wavelength is penetrated through said second combiner dichroic mirror, in said second medium; and an outlet plane that is cut in said second medium at an angle of θt with respect to said total reflection plane in order to allow said second combined light beam to penetrate outside said second medium without reflection such that said second combined light beam exits said second medium at a brewster angle with respect to the vertical component of a cutting plane.

43. An image projection apparatus as set forth in claim 7, wherein said light beam separator comprises:

a first separating dichroic mirror allowing only the light beam with said first wavelength to penetrate through said first separating dichroic mirror and reflecting the light beams with other wavelengths;

a wide band high-reflection mirror reflecting said light beams reflected by said first separating dichroic mirror;

a second separating dichroic mirror allowing only the light beam with said second wavelength different from said first wavelength to penetrate through said second separating dichroic mirror in a direction that is parallel to said light beam with said first wavelength that is penetrated through said first separating dichroic mirror and reflecting the light beams with other wavelengths, for the light beam reflected by said wide band high-reflection mirror;

said wide band high-reflection mirror reflecting the light beam with said third wavelength which is different from said first and second wavelengths that is reflected by said second separating dichroic mirror past said second separating dichroic mirror in a direction that is parallel to said light beam with said second wavelength that is penetrated through said second separating dichroic mirror; and wherein said first medium is positioned between said first and second separating dichroic mirrors and said wide band high-reflection mirror, and said incident light beam and said reflected light beams pass through said first medium proceed, and wherein said light beam combiner comprises:

an anti-reflection coating film allowing only the light beam with said first wavelength entering at the total reflection angle that is determined by the refractive index of said second medium from among the three light beams which are modulated by said modulator to penetrate through said anti-reflection coating film without reflection in said second medium;

a total reflection plane first-reflecting said light beam with said first wavelength which is penetrated in said second medium;

a first combiner dichroic mirror forming a first combined light beam by allowing only the light beam with said second wavelength which is different from said first wavelength to penetrate through said first combiner dichroic mirror into said second medium and reflecting the light beams with other wavelengths and also by second-total-reflecting said light beam with said first wavelength, that is first-total-reflected at a point at which said light beam with said second wavelength is penetrated, in said second medium;

said total reflection plane third-reflecting said first combined light beam in said second medium;

a second combiner dichroic mirror forming a second combined light beam by allowing only the light beam with said third wavelength which is different from said first and second wavelengths to penetrate through said second combiner dichroic mirror into said second medium and reflecting the light beams with other wavelengths and also by fourth-total-reflecting the first combined light beam, that is third-total-reflected at a point at which said light beam with said third wavelength is penetrated through said second combiner dichroic mirror, in said second medium; and an outlet plane that is cut in said second medium at an angle of θt with respect to said total reflection plane in order to allow said second combined light beam to penetrate outside said second medium without reflection such that said second combined light beam exits said second medium at a brewster angle with respect to the vertical component of a cutting plane.

44. An image projection apparatus as set forth in claim 6, wherein said light beam separator comprises:

a wide band anti-reflection coating film for allowing an incident light beam entered at a first angle with respect to the vertical direction of an incidence plane to penetrate through said wide band anti-reflection film into said first medium;

a first separating dichroic mirror allowing only the light beam with said first wavelength to penetrate through said first separating dichroic mirror at said first angle with respect to the vertical direction of a penetration plane and reflecting the light beam with other wavelengths at a second angle with respect to the vertical direction of a reflection plane, for the light beam penetrated through said wide band non-reflection coating film;

a wide band high-reflection coating film reflection the light beam reflected by said first separating dichroic mirror at said second angle with respect to the vertical direction of the reflection plane;

a second separating dichroic mirror allowing only the light beam with said second wavelength different from said first wavelength to penetrate through said second separating dichroic mirror into said first medium at said first angle with respect to the vertical direction of the penetration plane and reflecting the light beam with other wavelengths at said second angle with respect to the vertical direction of the reflection plane, for the light beam reflected by said wide band high-reflection coating film;

said wide band high-reflection coating film reflecting the light beam reflected by said second separating dichroic mirror at said second angle with respect to the vertical direction of the reflection plane;

an anti-reflection coating film allowing the light beam with said third wavelength which is different from said first and second wavelengths to penetrate through said anti-reflection coating film without reflection at said first angle with respect to the vertical direction of the penetration plane, for the light beam reflected by said wide band high-reflection coating film; and wherein the light beam penetrated through said wide band anti-reflection coating film and the light beams reflected from said first separating dichroic mirror, said second separating dichroic mirror, and said wide band high-reflection coating film pass through said first medium, and wherein said light beam combiner comprises:

an anti-reflection coating film allowing only the light beam with said first wavelength entering at the total reflection angle that is determined by the refractive index of said second medium from among the three light beams which are modulated by said modulator to penetrate through said anti-reflection coating film without reflection in said second medium;

a total reflection plane first-reflecting said light beam with said first wavelength which is penetrated in said second medium;

a first combiner dichroic mirror forming a first combined light beam by allowing only the light beam with said second wavelength which is different from said first wavelength to penetrate through said first combiner dichroic mirror into said second medium and reflecting the light beams with other wavelengths and also by second-total-reflecting said light beam with said first wavelength, that is first-total-reflected at a point at which said light beam with said second wavelength is penetrated, in said second medium;

said total reflection plane third-reflecting said first combined light beam in said second medium;

a second combiner dichroic mirror forming a second combined light beam by allowing only the light beam with said third wavelength which is different from said first and second wavelengths to penetrate through said second combiner dichroic mirror into said second medium and reflecting the light beams with other wavelengths and also by fourth-total-reflecting the first combined light beam, that is third-total-reflected at a point at which said light beam with said third wavelength is penetrated through said second combiner dichroic mirror, in said second medium; and an outlet plane that is cut in said second medium at an angle of θt with respect to said total reflection plane in order to allow said second combined light beam to penetrate outside said second medium without reflection such that said second combined light beam exits said second medium at a brewster angle with respect to the vertical component of a cutting plane.

45. An image projection apparatus as set forth in claim 7, wherein said light beam separator comprises:

a wide band anti-reflection coating film for allowing an incident light beam entered at a first angle with respect to the vertical direction of an incidence plane to penetrate through said wide band anti-reflection film into said first medium;

a first separating dichroic mirror allowing only the light beam with said first wavelength to penetrate through said first separating dichroic mirror at said first angle with respect to the vertical direction of a penetration plane and reflecting the light beam with other wavelengths at a second angle with respect to the vertical direction of a reflection plane, for the light beam penetrated through said wide band non-reflection coating film;

a wide band high-reflection coating film reflecting the light beam reflected by said first separating dichroic mirror at said second angle with respect to the vertical direction of the reflection plane;

a second separating dichroic mirror allowing only the light beam with said second wavelength different from said first wavelength to penetrate through said second separating dichroic mirror into said first medium at said first angle with respect to the vertical direction of the penetration plane and reflecting the light beam with other wavelengths at said second angle with respect to the vertical direction of the reflection plane, for the light beam reflected by said wide band high-reflection coating film;

said wide band high-reflection coating film reflecting the light beam reflected by said second separating dichroic mirror at said second angle with respect to the vertical direction of the reflection plane;

an anti-reflection coating film allowing the light beam with said third wavelength which is different from said first and second wavelengths to penetrate through said anti-reflection coating film without reflection at said first angle with respect to the vertical direction of the penetration plane, for the light beam reflected by said wide band high-reflection coating film; and wherein the light beam penetrated through said wide band anti-reflection coating film and the light beams reflected from said first separating dichroic mirror, said second separating dichroic mirror, and said wide band high-reflection coating film pass through said first medium, and wherein said light beam combiner comprises:

an anti-reflection coating film allowing only the light beam with said first wavelength entering at the total reflection angle that is determined by the refractive index of said second medium from among the three light beams which are modulated by said modulator to penetrate through said anti-reflection coating film without reflection in said second medium;

a total reflection plane first-reflecting said light beam with said first wavelength which is penetrated in said second medium;

a first combiner dichroic mirror forming a first combined light beam by allowing only the light beam with said second wavelength which is different from said first wavelength to penetrate through said first combiner dichroic mirror into said second medium and reflecting the light beams with other wavelengths and also by second-total-reflecting said light beam with said first wavelength, that is first-total-reflected at a point at which said light beam with said second wavelength is penetrated, in said second medium;

said total reflection plane third-reflecting said first combined light beam in said second medium;

a second combiner dichroic mirror forming a second combined light beam by allowing only the light beam with said third wavelength which is different from said first and second wavelengths to penetrate through said second combiner dichroic mirror into said second medium and reflecting the light beams with other wavelengths and also by fourth-total-reflecting the first combined light beam, that is third-total-reflected at a point at which said light beam with said third wavelength is penetrated through said second combiner dichroic mirror, in said second medium; and an outlet plane that is cut in said second medium at an angle of θt with respect to said total reflection plane in order to allow said second combined light beam to penetrate outside said second medium without reflection such that said second combined light beam exits said second medium at a brewster angle with respect to the vertical component of a cutting plane.

46. An image projection apparatus as set forth in claim 6, wherein said light beam separator comprises:

a wide band anti-reflection coating film that is formed on a cutting plane cut into said first medium such that a total reflection angle is vertical with respect to the cutting plane in order allow to penetrate without reflection the incident light beam which is entered at said total reflection angle that is determined by the refractive index of said first medium;

a first separating dichroic mirror allowing only the light beam with said first wavelength to penetrate through said first separating dichroic mirror at said total reflection angle and reflecting the light beams with other wavelengths at said total reflection angle, for the light beam penetrated through said wide band anti-reflection coating film;

a total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said total reflection film total-reflecting the light beam reflected from said second separating dichroic mirror at said total reflection angle;

an anti-reflection coating film allowing the light beam with said third wavelength which is different from said first and second wavelengths to penetrate through said anti-reflection coating film without reflection, for the light beam reflected by said total reflection film; and wherein the light beam penetrated through said wide band anti-reflection coating film and the light beams reflected from said first separating dichroic mirror, said second separating dichroic mirror, and said total reflection film pass through said first medium, and wherein said light beam combiner comprises:

an anti-reflection coating film allowing only the light beam with said first wavelength entering at the total reflection angle that is determined by the refractive index of said second medium from among the three light beams which are modulated by said modulator to penetrate through said anti-reflection coating film without reflection in said second medium;

a total reflection plane first-reflecting said light beam with said first wavelength which is penetrated in said second medium;

a first combiner dichroic mirror forming a first combined light beam by allowing only the light beam with said second wavelength which is different from said first wavelength to penetrate through said first combiner dichroic mirror into said second medium and reflecting the light beams with other wavelengths and also by second-total-reflecting said light beam with said first wavelength, that is first-total-reflected at a point at which said light beam with said second wavelength is penetrated, in said second medium;

said total reflection plane third-reflecting said first combined light beam in said second medium;

a second combiner dichroic mirror forming a second combined light beam by allowing only the light beam with said third wavelength which is different from said first and second wavelengths to penetrate through said second combiner dichroic mirror into said second medium and reflecting the light beams with other wavelengths and also by fourth-total-reflecting the first combined light beam, that is third-total-reflected at a point at which said light beam with said third wavelength is penetrated through said second combiner dichroic mirror, in said second medium; and an outlet plane that is cut in said second medium at an angle of θt with respect to said total reflection plane in order to allow said second combined light beam to penetrate outside said second medium without reflection such that said second combined light beam exits said second medium at a brewster angle with respect to the vertical component of a cutting plane.

47. An image projection apparatus as set forth in claim 7, wherein said light beam separator comprises:

a wide band anti-reflection coating film that is formed on a cutting plane cut into said first medium such that a total reflection angle is vertical with respect to the cutting plane in order allow to penetrate without reflection the incident light beam which is entered at said total reflection angle that is determined by the refractive index of said first medium;

a first separating dichroic mirror allowing only the light beam with said first wavelength to penetrate through said first separating dichroic mirror at said total reflection angle and reflecting the light beams with other wavelengths at said total reflection angle, for the light beam penetrated through said wide band anti-reflection coating film;

a total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said total reflection film total-reflecting the light beam reflected from said second separating dichroic mirror at said total reflection angle;

an anti-reflection coating film allowing the light beam with said third wavelength which is different from said first and second wavelengths to penetrate through said anti-reflection coating film without reflection, for the light beam reflected by said total reflection film; and wherein the light beam penetrated through said wide band anti-reflection coating film and the light beams reflected from said first separating dichroic mirror, said second separating dichroic mirror, and said total reflection film pass through said first medium, and wherein said light beam combiner comprises:

an anti-reflection coating film allowing only the light beam with said first wavelength entering at the total reflection angle that is determined by the refractive index of said second medium from among the three light beams which are modulated by said modulator to penetrate through said anti-reflection coating film without reflection in said second medium;

a total reflection plane first-reflecting said light beam with said first wavelength which is penetrated in said second medium;

a first combiner dichroic mirror forming a first combined light beam by allowing only the light beam with said second wavelength which is different from said first wavelength to penetrate through said first combiner dichroic mirror into said second medium and reflecting the light beams with other wavelengths and also by second-total-reflecting said light beam with said first wavelength, that is first-total-reflected at a point at which said light beam with said second wavelength is penetrated, in said second medium;

said total reflection plane third-reflecting said first combined light beam in said second medium;

a second combiner dichroic mirror forming a second combined light beam by allowing only the light beam with said third wavelength which is different from said first and second wavelengths to penetrate through said second combiner dichroic mirror into said second medium and reflecting the light beams with other wavelengths and also by fourth-total-reflecting the first combined light beam, that is third-total-reflected at a point at which said light beam with said third wavelength is penetrated through said second combiner dichroic mirror, in said second medium; and an outlet plane that is cut in said second medium at an angle of θt with respect to said total reflection plane in order to allow said second combined light beam to penetrate outside said second medium without reflection such that said second combined light beam exits said second medium at a brewster angle with respect to the vertical component of a cutting plane.

48. An image projection apparatus as set forth in claim 6, wherein said light beam separator comprises:

a wide band anti-reflection coating film for allowing said incident light beam which is entered at a total reflection angle that is determined by the refractive index of said first medium to penetrate through said wide band anti-reflection coating film without reflection;

a first separating dichroic mirror allowing only the light beam with said first wavelength to penetrate through said first separating dichroic mirror at said total reflection angle and reflecting the light beams with other wavelengths at said total reflection angle, for the light beam penetrated by said wide band anti-reflection coating film;

a total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said total reflection film total-reflecting the light beam reflected by said second separating dichroic mirror at said total reflection angle;

a first anti-reflection coating film allowing the light beam with said third wavelength which is different from said first and second wavelengths to penetrate through said first anti-reflection coating film without reflection, for the light beam reflected by said total reflection film; and wherein the light beam penetrated through said wide band anti-reflection coating film and the light beams reflected by said first separating dichroic mirror, said second separating dichroic mirror, and said total reflection film pass through said first medium, and wherein said light beam combiner comprises:

a second anti-reflection coating film allowing only the light beam with said first wavelength entering at the total reflection angle that is determined by the refractive index of said second medium from among the three light beams which are modulated by said modulator to penetrate through said second anti-reflection coating film without reflection in said second medium;

a total reflection plane first-reflecting said light beam with said first wavelength which is penetrated in said second medium;

a first combiner dichroic mirror forming a first combined light beam by allowing only the light beam with said second wavelength which is different from said first wavelength to penetrate through said first combiner dichroic mirror into said second medium and reflecting the light beams with other wavelengths and also by second-total-reflecting said light beam with said first wavelength, that is first-total-reflected at a point at which said light beam with said second wavelength is penetrated, in said second medium;

said total reflection plane third-reflecting said first combined light beam in said second medium;

a second combiner dichroic mirror forming a second combined light beam by allowing only the light beam with said third wavelength which is different from said first and second wavelengths to penetrate through said second combiner dichroic mirror into said second medium and reflecting the light beams with other wavelengths and also by fourth-total-reflecting the first combined light beam, that is third-total-reflected at a point at which said light beam with said third wavelength is penetrated through said second combiner dichroic mirror, in said second medium; and an outlet plane that is cut in said second medium at an angle of θt with respect to said total reflection plane in order to allow said second combined light beam to penetrate outside said second medium without reflection such that said second combined light beam exits said second medium at a brewster angle with respect to the vertical component of a cutting plane.

49. An image projection apparatus as set forth in claim 7, wherein said light beam separator comprises:

a wide band anti-reflection coating film for allowing said incident light beam which is entered at a total reflection angle that is determined by the refractive index of said first medium to penetrate through said wide band anti-reflection coating film without reflection;

a first separating dichroic mirror allowing only the light beam with said first wavelength to penetrate through said first separating dichroic mirror at said total reflection angle and reflecting the light beams with other wavelengths at said total reflection angle, for the light beam penetrated by said wide band anti-reflection coating film;

a total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said total reflection film total-reflecting the light beam reflected by said second separating dichroic mirror at said total reflection angle;

a first anti-reflection coating film allowing the light beam with said third wavelength which is different from said first and second wavelengths to penetrate through said first anti-reflection coating film without reflection, for the light beam reflected by said total reflection film; and wherein the light beam penetrated through said wide band anti-reflection coating film and the light beams reflected by said first separating dichroic mirror, said second separating dichroic mirror, and said total reflection film pass through said first medium, and wherein said light beam combiner comprises:

a second anti-reflection coating film allowing only the light beam with said first wavelength entering at the total reflection angle that is determined by the refractive index of said second medium from among the three light beams which are modulated by said modulator to penetrate through said second anti-reflection coating film without reflection in said second medium;

a total reflection plane first-reflecting said light beam with said first wavelength which is penetrated in said second medium;

a first combiner dichroic mirror forming a first combined light beam by allowing only the light beam with said second wavelength which is different from said first wavelength to penetrate through said first combiner dichroic mirror into said second medium and reflecting the light beams with other wavelengths and also by second-total-reflecting said light beam with said first wavelength, that is first-total-reflected at a point at which said light beam with said second wavelength is penetrated, in said second medium;

said total reflection plane third-reflecting said first combined light beam in said second medium;

a second combiner dichroic mirror forming a second combined light beam by allowing only the light beam with said third wavelength which is different from said first and second wavelengths to penetrate through said second combiner dichroic mirror into said second medium and reflecting the light beams with other wavelengths and also by fourth-total-reflecting the first combined light beam, that is third-total-reflected at a point at which said light beam with said third wavelength is penetrated through said second combiner dichroic mirror, in said second medium; and an outlet plane that is cut in said second medium at an angle of θt with respect to said total reflection plane in order to allow said second combined light beam to penetrate outside said second medium without reflection such that said second combined light beam exits said second medium at a brewster angle with respect to the vertical component of a cutting plane.

50. An image projection apparatus as set forth in claim 6, wherein said light beam separator comprises:

an incidence plane cut in said first medium so that the incident light beam enters at a brewster angle with respect to the vertical direction of an incidence plane and the incident light beam is refracted at a total reflection angle that is determined by the refractive index of said first medium;

a first separating dichroic mirror allowing only the light beam with said first wavelength to penetrate through said first separating dichroic mirror and reflecting the light beams with other wavelengths at said total reflection angle for said incident light beam;

a first total reflection plane total-reflecting the light beam reflected by said first separating dichroic mirror at said total reflection angle;

a second separating dichroic mirror allowing only the light beam with said second wavelength different from said first wavelength to penetrate through said second separating dichroic mirror and reflecting the light beams with other wavelengths at said total reflection angle for the light beam reflected by said total reflection plane;

said first total reflection plane total-reflecting the light beam reflected by said second separating dichroic mirror at said total reflection angle;

a penetration plane made of an anti-reflection coating film allowing the light beam with said third wavelength different from said first and second wavelengths to penetrate through said penetration plane without reflection for the light beam reflected by said total reflection film; and wherein the light beam penetrated through said incidence plane and the light beam reflected by said first separating dichroic mirror, said second separating dichroic mirror and said first total reflection plane pass through said first medium, and wherein said light beam combiner comprises:

an anti-reflection coating film allowing only the light beam with said first wavelength entering at the total reflection angle that is determined by the refractive index of said second medium from among the three light beams which are modulated by said modulator to penetrate through said anti-reflection coating film without reflection in said second medium;

a second total reflection plane first-reflecting said light beam with said first wavelength which is penetrated in said second medium;

a first combiner dichroic mirror forming a first combined light beam by allowing only the light beam with said second wavelength which is different from said first wavelength to penetrate through said first combiner dichroic mirror into said second medium and reflecting the light beams with other wavelengths and also by second-total-reflecting said light beam with said first wavelength, that is first-total-reflected at a point at which said light beam with said second wavelength is penetrated, in said second medium;

said second total reflection plane third-reflecting said first combined light beam in said second medium;

a second combiner dichroic mirror forming a second combined light beam by allowing only the light beam with said third wavelength which is different from said first and second wavelengths to penetrate through said second combiner dichroic mirror into said second medium and reflecting the light beams with other wavelengths and also by fourth-total-reflecting the first combined light beam, that is third-total-reflected at a point at which said light beam with said third wavelength is penetrated through said second combiner dichroic mirror, in said second medium; and an outlet plane that is cut in said second medium at an angle of θt with respect to said second total reflection plane in order to allow said second combined light beam to penetrate outside said second medium without reflection such that said second combined light beam exits said second medium at a brewster angle with respect to the vertical component of a cutting plane.

51. An image projection apparatus as set forth in claim 7, wherein said light beam separator comprises:

an incidence plane cut in said first medium so that the incident light beam enters at a brewster angle with respect to the vertical direction of an incidence plane and the incident light beam is refracted at a total reflection angle that is determined by the refractive index of said first medium;

a first separating dichroic mirror allowing only the light beam with said first wavelength to penetrate through said first separating dichroic mirror and reflecting the light beams with other wavelengths at said total reflection angle for said incident light beam;

a first total reflection plane total-reflecting the light beam reflected by said first separating dichroic mirror at said total reflection angle;

a second separating dichroic mirror allowing only the light beam with said second wavelength different from said first wavelength to penetrate through said second separating dichroic mirror and reflecting the light beams with other wavelengths at said total reflection angle for the light beam reflected by said total reflection plane;

said first total reflection plane total-reflecting the light beam reflected by said second separating dichroic mirror at said total reflection angle;

a penetration plane made of an anti-reflection coating film allowing the light beam with said third wavelength different from said first and second wavelengths to penetrate through said penetration plane without reflection for the light beam reflected by said total reflection film; and wherein the light beam penetrated through said incidence plane and the light beam reflected by said first separating dichroic mirror, said second separating dichroic mirror and said first total reflection plane pass through said first medium, and wherein said light beam combiner comprises:

an anti-reflection coating film allowing only the light beam with said first wavelength entering at the total reflection angle that is determined by the refractive index of said second medium from among the three light beams which are modulated by said modulator to penetrate through said anti-reflection coating film without reflection in said second medium;

a second total reflection plane first-reflecting said light beam with said first wavelength which is penetrated in said second medium;

a first combiner dichroic mirror forming a first combined light beam by allowing only the light beam with said second wavelength which is different from said first wavelength to penetrate through said first combiner dichroic mirror into said second medium and reflecting the light beams with other wavelengths and also by second-total-reflecting said light beam with said first wavelength, that is first-total-reflected at a point at which said light beam with said second wavelength is penetrated, in said second medium;

said second total reflection plane third-reflecting said first combined light beam in said second medium;

a second combiner dichroic mirror forming a second combined light beam by allowing only the light beam with said third wavelength which is different from said first and second wavelengths to penetrate through said second combiner dichroic mirror into said second medium and reflecting the light beams with other wavelengths and also by fourth-total-reflecting the first combined light beam, that is third-total-reflected at a point at which said light beam with said third wavelength is penetrated through said second combiner dichroic mirror, in said second medium; and an outlet plane that is cut in said second medium at an angle of θt with respect to said second total reflection plane in order to allow said second combined light beam to penetrate outside said second medium without reflection such that said second combined light beam exits said second medium at a brewster angle with respect to the vertical component of a cutting plane.

52. An image projection apparatus as set forth in claim 6, wherein said light beam separator comprises:

an incidence plane cut in said first medium so that the incident light beam enters at a brewster angle with respect to the vertical direction of an incidence plane and the incident light beam is refracted at a total reflection angle that is determined by the refractive index of said first medium;

a first separating dichroic mirror allowing only the light beam with said first wavelength to penetrate through said first separating dichroic mirror and reflecting the light beams with other wavelengths at said total reflection angle for said incident light beam;

a total reflection plane total-reflecting the light beam reflected by said first separating dichroic mirror at said total reflection angle;

a second separating dichroic mirror allowing only the light beam with said second wavelength different from said first wavelength to penetrate through said second separating dichroic mirror and reflecting the light beams with other wavelengths at said total reflection angle for the light beam reflected by said total reflection plane;

said total reflection plane total-reflecting the light beam reflected by said second separating dichroic mirror at said total reflection angle;

a penetration plane made of an anti-reflection coating film allowing the light beam with said third wavelength different from said first and second wavelengths to penetrate through said penetration plane without reflection for the light beam reflected by said total reflection film; and wherein the light beam penetrated through said incidence plane and the light beam reflected by said first separating dichroic mirror, said second separating dichroic mirror and said total reflection film pass through said first medium, and said light beam combiner comprises:

an anti-reflection coating film allowing the light beam with said first wavelength from among the three light beams modulated by said modulator to penetrate without reflection at a first angle through said anti-reflection coating film into said second medium;

a wide band high-reflection mirror first-reflecting said penetrated light beam with said first wavelength at a second angle which is different from said first angle in said second medium;

a first combiner dichroic mirror making a first combined light beam by allowing only the light beam with said second wavelength different from said first wavelength to penetrate through said first combiner dichroic mirror into said second medium at said first angle and reflecting the light beams with other wavelengths and also by second-reflecting said first-reflected light beam with said first wavelength at said second angle at a point at which said light beam with said second wavelength is penetrated through said first combiner dichroic mirror;

said wide band high-reflection mirror third-reflecting said first combined light beam at said second angle in said second medium;

a second combiner dichroic mirror making a second combined light beam by allowing only the light beam with said third wavelength different from said first and second wavelengths to penetrate through said second combiner dichroic mirror into said second medium at said first angle and reflecting the light beams with other wavelengths and also by fourth-reflecting said third-reflected first combined light beam at said second angle at a point at which said light beam with said third wavelength is penetrated through said second combiner dichroic mirror;

a wide band anti-reflection coating film allowing said second combined light beam to penetrate without reflection outside said second medium; and wherein the light beam with said first wavelength which is penetrated through said first combiner dichroic mirror, the first-reflected light beam, the first combined light beam and the second combined light beam pass through said second medium.

53. An image projection apparatus as set forth in claim 7, wherein said light beam separator comprises:

an incidence plane cut in said first medium so that the incident light beam enters at a brewster angle with respect to the vertical direction of an incidence plane and the incident light beam is refracted at a total reflection angle that is determined by the refractive index of said first medium;

a first separating dichroic mirror allowing only the light beam with said first wavelength to penetrate through said first separating dichroic mirror and reflecting the light beams with other wavelengths at said total reflection angle for said incident light beam;

a total reflection plane total-reflecting the light beam reflected by said first separating dichroic mirror at said total reflection angle;

a second separating dichroic mirror allowing only the light beam with said second wavelength different from said first wavelength to penetrate through said second separating dichroic mirror and reflecting the light beams with other wavelengths at said total reflection angle for the light beam reflected by said total reflection plane;

said total reflection plane total-reflecting the light beam reflected by said second separating dichroic mirror at said total reflection angle;

a penetration plane made of an anti-reflection coating film allowing the light beam with said third wavelength different from said first and second wavelengths to penetrate through said penetration plane without reflection for the light beam reflected by said total reflection film; and wherein the light beam penetrated through said incidence plane and the light beam reflected by said first separating dichroic mirror, said second separating dichroic mirror and said total reflection film pass through said first medium, and said light beam combiner comprises:

an anti-reflection coating film allowing the light beam with said first wavelength from among the three light beams modulated by said modulator to penetrate without reflection at a first angle through said anti-reflection coating film into said second medium;

a wide band high-reflection mirror first-reflecting said penetrated light beam with said first wavelength at a second angle which is different from said first angle in said second medium;

a first combiner dichroic mirror making a first combined light beam by allowing only the light beam with said second wavelength different from said first wavelength to penetrate through said first combiner dichroic mirror into said second medium at said first angle and reflecting the light beams with other wavelengths and also by second-reflecting said first-reflected light beam with said first wavelength at said second angle at a point at which said light beam with said second wavelength is penetrated through said first combiner dichroic mirror;

said wide band high-reflection mirror third-reflecting said first combined light beam at said second angle in said second medium;

a second combiner dichroic mirror making a second combined light beam by allowing only the light beam with said third wavelength different from said first and second wavelengths to penetrate through said second combiner dichroic mirror into said second medium at said first angle and reflecting the light beams with other wavelengths and also by fourth-reflecting said third-reflected first combined light beam at said second angle at a point at which said light beam with said third wavelength is penetrated through said second combiner dichroic mirror;

a wide band anti-reflection coating film allowing said second combined light beam to penetrate without reflection outside said second medium; and wherein the light beam with said first wavelength which is penetrated through said first combiner dichroic mirror, the first-reflected light beam, the first combined light beam and the second combined light beam pass through said second medium.

54. An image projection apparatus as set forth in claim 6, wherein said light beam separator comprises:

an incidence plane cut in said first medium so that the incident light beam enters at a brewster angle with respect to the vertical direction of an incidence plane and the incident light beam is refracted at a total reflection angle that is determined by the refractive index of said first medium;

a first separating dichroic mirror allowing only the light beam with said first wavelength to penetrate through said first separating dichroic mirror and reflecting the light beams with other wavelengths at said total reflection angle for said incident light beam;

a total reflection plane total-reflecting the light beam reflected by said first separating dichroic mirror at said total reflection angle;

a second separating dichroic mirror allowing only the light beam with said second wavelength different from said first wavelength to penetrate through said second separating dichroic mirror and reflecting the light beams with other wavelengths at said total reflection angle for the light beam reflected by said total reflection plane;

said total reflection plane total-reflecting the light beam reflected by said second separating dichroic mirror at said total reflection angle;

a penetration plane made of an anti-reflection coating film allowing the light beam with said third wavelength different from said first and second wavelengths to penetrate through said penetration plane without reflection for the light beam reflected by said total reflection film; and wherein the light beam penetrated through said incidence plane and the light beam reflected by said first separating dichroic mirror, said second separating dichroic mirror and said total reflection film pass through said first medium, and said light beam combiner comprises:

an anti-reflection coating film allowing only the incident light beam with said first wavelength from among the three light beams modulated by said modulator to penetrate through said anti-reflection coating film into said second medium, which enters at the total reflection angle;

a total reflection film first-total-reflecting said penetrated light beam with said first wavelength in said second medium;

a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength through said first combiner dichroic mirror, said first-total-reflected light beam with said first wavelength in said second medium;

said total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength through said second combiner dichroic mirror, said third-total-reflected first combined light beam in said second medium; and
a wide band anti-reflection coating film for allowing said second combined light beam to penetrate without reflection outside said second medium.

55. An image projection apparatus as set forth in claim 7, wherein said light beam separator comprises:
an incidence plane cut in said first medium so that the incident light beam enters at a brewster angle with respect to the vertical direction of an incidence plane and the incident light beam is refracted at a total reflection angle that is determined by the refractive index of said first medium;
a first separating dichroic mirror allowing only the light beam with said first wavelength to penetrate through said first separating dichroic mirror and reflecting the light beams with other wavelengths at said total reflection angle for said incident light beam;
a total reflection plane total-reflecting the light beam reflected by said first separating dichroic mirror at said total reflection angle;
a second separating dichroic mirror allowing only the light beam with said second wavelength different from said first wavelength to penetrate through said second separating dichroic mirror and reflecting the light beams with other wavelengths at said total reflection angle for the light beam reflected by said total reflection plane;
said total reflection plane total-reflecting the light beam reflected by said second separating dichroic mirror at said total reflection angle;
a penetration plane made of an anti-reflection coating film allowing the light beam with said third wavelength different from said first and second wavelengths to penetrate through said penetration plane without reflection for the light beam reflected by said total reflection film; and
wherein the light beam penetrated through said incidence plane and the light beam reflected by said first separating dichroic mirror, said second separating dichroic mirror and said total reflection film pass through said first medium, and
said light beam combiner comprises:
an anti-reflection coating film allowing only the incident light beam with said first wavelength from among the three light beams modulated by said modulator to penetrate through said anti-reflection coating film into said second medium, which enters at the total reflection angle;
a total reflection film first-total-reflecting said penetrated light beam with said first wavelength in said second medium;
a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength through said first combiner dichroic mirror, said first-total-reflected light beam with said first wavelength in said second medium;
said total reflection film third-total-reflecting said first combined light beam in said second medium;
a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength through said second combiner dichroic mirror, said third-total-reflected first combined light beam in said second medium; and
a wide band anti-reflection coating film for allowing said second combined light beam to penetrate without reflection outside said second medium.

56. An image projection apparatus as set forth in claim 6, wherein said light beam separator comprises:
an incidence plane cut in said first medium so that the incident light beam enters at a brewster angle with respect to the vertical direction of an incidence plane and the incident light beam is refracted at a total reflection angle that is determined by the refractive index of said first medium;
a first separating dichroic mirror allowing only the light beam with said first wavelength to penetrate through said first separating dichroic mirror and reflecting the light beams with other wavelengths at said total reflection angle for said incident light beam;
a total reflection plane total-reflecting the light beam reflected by said first separating dichroic mirror at said total reflection angle;
a second separating dichroic mirror allowing only the light beam with said second wavelength different from said first wavelength to penetrate through said second separating dichroic mirror and reflecting the light beams with other wavelengths at said total reflection angle for the light beam reflected by said total reflection plane;
said total reflection plane total-reflecting the light beam reflected by said second separating dichroic mirror at said total reflection angle;
a penetration plane made of an anti-reflection coating film allowing the light beam with said third wavelength different from said first and second wavelengths to penetrate through said penetration plane without reflection for the light beam reflected by said total reflection film; and
wherein the light beam penetrated through said incidence plane and the light beam reflected by said first separating dichroic mirror, said second separating dichroic mirror and said total reflection film pass through said first medium, and
said light beam combiner comprises:
an anti-reflection coating film, which is cut into said second medium such that it is vertical with respect to a total reflection angle in order to allow only the light beam with said first wavelength from among the three light beams modulated by said modulator, which enters at the total reflection angle that is determined by the refractive index of said second medium, to penetrate through said anti-reflection coating film;
a total reflection film first-total-reflecting said penetrated light beam with said first wavelength in said second medium;
a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength, said first-total-reflected light beam with said first wavelength in said second medium;

said total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength, said third-total-reflected first combined light beam in said second medium; and a wide band anti-reflection coating film, which is cut in said second medium such that it is vertical to said total reflection angle in order to allow said second combined light beam to penetrate without reflection outside said second medium.

57. An image projection apparatus as set forth in claim 7, wherein said light beam separator comprises:

an incidence plane cut in said first medium so that the incident light beam enters at a brewster angle with respect to the vertical direction of an incidence plane and the incident light beam is refracted at a total reflection angle that is determined by the refractive index of said first medium;

a first separating dichroic mirror allowing only the light beam with said first wavelength to penetrate through said first separating dichroic mirror and reflecting the light beams with other wavelengths at said total reflection angle for said incident light beam;

a total reflection plane total-reflecting the light beam reflected by said first separating dichroic mirror at said total reflection angle;

a second separating dichroic mirror allowing only the light beam with said second wavelength different from said first wavelength to penetrate through said second separating dichroic mirror and reflecting the light beams with other wavelengths at said total reflection angle for the light beam reflected by said total reflection plane;

said total reflection plane total-reflecting the light beam reflected by said second separating dichroic mirror at said total reflection angle;

a penetration plane made of an anti-reflection coating film allowing the light beam with said third wavelength different from said first and second wavelengths to penetrate through said penetration plane without reflection for the light beam reflected by said total reflection film; and wherein the light beam penetrated through said incidence plane and the light beam reflected by said first separating dichroic mirror, said second separating dichroic mirror and said total reflection film pass through said first medium, and said light beam combiner comprises:

an anti-reflection coating film, which is cut into said second medium such that it is vertical with respect to a total reflection angle in order to allow only the light beam with said first wavelength from among the three light beams modulated by said modulator, which enters at the total reflection angle that is determined by the refractive index of said second medium, to penetrate through said anti-reflection coating film;

a total reflection film first-total-reflecting said penetrated light beam with said first wavelength in said second medium;

a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength, said first-total-reflected light beam with said first wavelength in said second medium;

said total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength, said third-total-reflected first combined light beam in said second medium; and a wide band anti-reflection coating film, which is cut in said second medium such that it is vertical to said total reflection angle in order to allow said second combined light beam to penetrate without reflection outside said second medium.

58. An image projection apparatus for protecting an image on a screen comprising:

three laser diodes used for individual light sources for generating three light beams, each light beam having a different wavelength;

a 3-channel modulator for modulating the light beams that are generated by the light sources according to an image signal that is inputted from an external source;

three focusing lenses, each of which is positioned after one of said light sources in a light path of the light beam generated by the respective light source, so as to focus the light beam, which is generated by each light source, on said modulator;

three beam path expanders, each of which is positioned after one of said focusing lenses in the light path of each light beam in order to reduce space and adjust the light path for coincidence of focusing points on said modulator;

total internal reflection mirror for adjusting the light path of at least one of said light beams, which is positioned in front of said modulator along the light path so that each light beam exactly enters each respective channel of said modulator considering gap between each 1 of said light sources and said modulator;

light beam combiner for forming one combined light beam by combiner said three light beams with each wavelength that are modulated by said 3-channel modulator comprising at least two mirrors which are parallel to each other, and a medium which is positioned between said mirrors; and scanner for projecting the combined light beam, that has exited said light beam combiner, to the screen.

59. An image projection apparatus as set forth in claim 58, wherein said light beam combiner comprises:

a reflection film that makes the light beam with said first wavelength from among the three light beams modulated by said modulator which enters said second medium, first-reflect in said second medium;

a first combiner dichroic mirror allowing only the light beam with said second wavelength which is different from said first wavelength to penetrate through said first combiner dichroic mirror and reflecting the light beams with other wavelengths;

a second combiner dichroic mirror allowing only the light beam with said third wavelength which is different from said first and second wavelengths to penetrate through said second combiner dichroic mirror and reflecting the light beams with other wavelengths;

said first combiner dichroic mirror second-reflecting said light beam with said first wavelength that is first-reflected in said second medium;

said reflection film third-reflecting a first combined light beam in said second medium, said first combined light beam being formed by combining said light beam with said first wavelength that is second-reflected by said first combiner dichroic mirror and said light beam with said second wavelength that is penetrated through said second combiner dichroic mirror, at a point at which said light beam with said first wavelength is reflected into said second medium by said first combiner dichroic mirror;

said second combiner dichroic mirror fourth-reflecting said first combined light beam that is third-reflected in said second medium; and wherein a second combined light beam, which is formed by combining said first combined light beam that is fourth-reflected and said light beam with said third wavelength that is penetrated through said second combiner dichroic mirror at a point at which said first combined light beam is reflected into said second medium by said second combiner dichroic mirror, exits said second medium.

60. An image projection apparatus as set forth in claim 58, wherein said light beam combiner comprises:

an anti-reflection coating film allowing the light beam with said first wavelength from among the three light beams modulated by said modulator to penetrate without reflection at a first angle through said anti-reflection coating film into said second medium;

a wide band high-reflection mirror first-reflecting said penetrated light beam with said first wavelength at a second angle which is different from said first angle in said second medium;

a first combiner dichroic mirror making a first combined light beam by allowing only the light beam with said second wavelength different from said first wavelength to penetrate through said first combiner dichroic mirror into said second medium at said first angle and reflecting the light beams with other wavelengths and also by second-reflecting said first-reflected light beam with said first wavelength at said second angle at a point at which said light beam with said second wavelength is penetrated through said first combiner dichroic mirror;

said wide band high-reflection mirror third-reflecting said first combined light beam at said second angle in said second medium;

a second combiner dichroic mirror making a second combined light beam by allowing only the light beam with said third wavelength different from said first and second wavelengths to penetrate through said second combiner dichroic mirror into said second medium at said first angle and reflecting the light beams with other wavelengths and also by fourth-reflecting said third-reflected first combined light beam at said second angle at a point at which said light beam with said third wavelength is penetrated through said second combiner dichroic mirror;

a wide band anti-reflection coating film allowing said second combined light beam to penetrate without reflection outside said second medium; and wherein the light beam with said first wavelength which is penetrated through said first combiner dichroic mirror, the first-reflected light beam, the first combined light beam and the second combined light beam pass through said second medium.

61. An image projection apparatus as set forth in claim 58, wherein said light beam combiner comprises:

an anti-reflection coating film allowing only the light beam with said first wavelength from among the three light beams modulated by said modulator to penetrate through said anti-reflection coating into said second medium, which enters at a total reflection angle;

a total reflection film first-total-reflecting said penetrated light beam with said first wavelength in said second medium;

a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength through said first combiner dichroic mirror, said first-total-reflected light beam with said first wavelength in said second medium;

said total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength through said second combiner dichroic mirror, said third-total-reflected first combined light beam in said second medium; and a wide band anti-reflection coating film for allowing said second combined light beam to penetrate without reflection outside said second medium.

62. An image projection apparatus as set forth in claim 58, wherein said light beam combiner comprises:

an anti-reflection coating film, which is cut into said second medium such that it is vertical with respect to a total reflection angle in order to allow only the light beam with said first wavelength from among the three light beams modulated by said modulator, which enters at the total reflection angle that is determined by the refractive index of said second medium, to penetrate through said anti-reflection coating film;

a total reflection film first-total-reflecting said penetrated light beam with said first wavelength in said second medium;

a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength, said first-total-reflected light beam with said first wavelength in said second medium;

said total reflection film third-total-reflecting said first combined light beam in said second medium;

a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength, said third-total-reflected first combined light beam in said second medium; and a wide band anti-reflection coating film, which is cut in said second medium such that it is vertical to said total reflection angle in order to allow said second combined light beam to penetrate without reflection outside said second medium.

63. An image projection apparatus as set forth in claim 58, wherein said light beam combiner comprises:

an anti-reflection coating film allowing only the light beam with said first wavelength entering at the total reflection angle that is determined by the refractive index of said second medium from among the three light beams which are modulated by said modulator to penetrate through said anti-reflection coating film without reflection in said second medium;

a total reflection plane first-reflecting said light beam with said first wavelength which is penetrated in said second medium;

a first combiner dichroic mirror forming a first combined light beam by allowing only the light beam with said second wavelength which is different from said first wavelength to penetrate through said first combiner dichroic mirror into said second medium and reflecting the light beams with other wavelengths and also by second-total-reflecting said light beam with said first wavelength, that is first-total-reflected at a point at which said light beam with said second wavelength is penetrated, in said second medium;

said total reflection plane third-reflecting said first combined light beam in said second medium;

a second combiner dichroic mirror forming a second combined light beam by allowing only the light beam with said third wavelength which is different from said first and second wavelengths to penetrate through said second combiner dichroic mirror into said second medium and reflecting the light beams with other wavelengths and also by fourth-total-reflecting the first combined light beam, that is third-total-reflected at a point at which said light beam with said third wavelength is penetrated through said second combiner dichroic mirror, in said second medium; and an outlet plane that is cut in said second medium at an angle of θt with respect to said total reflection plane in order to allow said second combined light beam to penetrate outside said second medium without reflection such that said second combined light beam exits said second medium at a brewster angle with respect to the vertical component of a cutting plane.

64. An image projection apparatus as set forth in claim 1, wherein said 3-channel modulator comprises a 3-channel acousto-optic modulator.

65. An image projection apparatus as set forth in claim 1, wherein said first medium is air.

66. An image projection apparatus as set forth in claim 1, wherein at least one of said first and second beam path expanders comprise:

a beam path expander medium;

an incidence plane on which an anti-reflection film is formed so as to make an input light beam enter said beam path expander medium, said medium having a specific refractive index without reflection, said incidence plane being vertical to said input light beam;

a first total reflection plane, which is cut into said beam path expander medium at a total reflection angle that is determined by the refractive index of said beam path expander medium so as to make the light beam which is entered from said incidence plane total-reflect in said beam path expander medium;

a second total reflection plane, which is cut into said beam path expander medium at said total reflection angle so as to make the light beam which is reflected from said first total reflection plane total-reflect in said beam path expander medium at said total reflection angle; and an outlet plane on which an anti-reflection film is formed so as to make the light beam which is reflected from a last one of said third total reflection planes exit the beam path expander medium, said outlet plane being vertical to the exiting light beam.

67. An image projection apparatus as set forth in claim 1, wherein said light beam combiner comprises:

a reflection film that makes the light beam with said first wavelength from among the three light beams modulated by said modulator which enters said second medium, first-reflect in said second medium;

a first combiner dichroic mirror allowing only the light beam with said second wavelength which is different from said first wavelength to penetrate through said first combiner dichroic mirror and reflecting the light beams with other wavelengths;

a second combiner dichroic mirror allowing only the light beam with said third wavelength which is different from said first and second wavelengths to penetrate through said second combiner dichroic mirror and reflecting the light beams with other wavelengths;

said first combiner dichroic mirror second-reflecting said light beam with said first wavelength that is first-reflected in said second medium;

said reflection film third-reflecting a first combined light beam in said second medium, said first combined light beam being formed by combining said light beam with said first wavelength that is second-reflected by said first, combiner dichroic mirror and said light beam with said second wavelength that is penetrated through said second combiner dichroic mirror, at a point at which said light beam with said first wavelength is reflected into said second medium by said first combiner dichroic mirror;

said second combiner dichroic mirror fourth-reflecting said first combined light beam that is third-reflected in said second medium; and wherein a second combined light beam, which is formed by combining said first combined light beam that is fourth-reflected and said light beam with said third wavelength that is penetrated through said second combiner dichroic mirror at a point at which said first combined light beam is reflected into said second medium by said second combiner dichroic mirror, exits said second medium.

68. An image projection apparatus as set forth in claim 1, wherein said light beam combiner comprises:
   an anti-reflection coating film allowing the light beam with said first wavelength from among the three light beams modulated by said modulator to penetrate without reflection at a first angle through said anti-reflection coating film into said second medium;
   a wide band high-reflection mirror first-reflecting said penetrated light beam with said first wavelength at a second angle which is different from said first angle in said second medium;
   a first combiner dichroic mirror making a first combined light beam by allowing only the light beam with said second wavelength different from said first wavelength to penetrate into through said first combiner dichroic mirror said second medium at said first angle and reflecting the light beams with other wavelengths and also by second-reflecting said first-reflected light beam with said first wavelength at said second angle at a point at which said light beam with said second wavelength is penetrated through said first combiner dichroic mirror;
   said wide band high-reflection mirror third-reflecting said first combined light beam at said second angle in said second medium;
   a second combiner dichroic mirror making a second combined light beam by allowing only the light beam with said third wavelength different from said first and second wavelengths to penetrate through said second combiner dichroic mirror into said second medium at said first angle and reflecting the light beams with other wavelengths and also by fourth-reflecting said third-reflected first combined light beam at said second angle at a point at which said light beam with said third wavelength is penetrated through said second combiner dichroic mirror;
   a wide band anti-reflection coating film allowing said second combined light beam to penetrate without reflection outside said second medium; and
   wherein the light beam with said first wavelength which is penetrated through said first combiner dichroic mirror, the first-reflected light beam, the first combined light beam and the second combined light beam pass through said second medium.

69. An image projection apparatus as set forth in claim 1, wherein said light beam combiner comprises:
   an anti-reflection coating film allowing only the light beam with said first wavelength from among the three light beams modulated by said modulator to penetrate through said anti-reflection coating into said second medium, which enters at a total reflection angle;
   a total reflection film first-total-reflecting said penetrated light beam with said first wavelength in said second medium;
   a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength through said first combiner dichroic mirror, said first-total-reflected light beam with said first wavelength in said second medium;
   a total reflection film third-total-reflecting said first combined light beam in said second medium;
   a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength through said second combiner dichroic mirror, said third-total-reflected first combined light beam in said second medium; and
   a wide band anti-reflection coating film for allowing said second combined light beam to penetrate without reflection outside said second medium.

70. An image projection apparatus as set forth in claim 1, wherein said light beam combiner comprises:
   an anti-reflection coating film, which is cut into said second medium such that it is vertical with respect to a total reflection angle in order to allow only the light beam with said first wavelength from among the three light beams modulated by said modulator, which enters at the total reflection angle that is determined by the refractive index of said second medium, to penetrate through said anti-reflection coating film;
   a total reflection film first-total-reflecting said penetrated light beam with said first wavelength in said second medium;
   a first combiner dichroic mirror generating a first combined light beam by allowing only the light beam with said second wavelength different from said first wavelength to penetrate through said first combiner dichroic mirror and reflecting the light beams with other wavelengths and also by second-total-reflecting, at a penetration point of said light beam with said second wavelength, said first-total-reflected light beam with said first wavelength in said second medium;
   said total reflection film third-total-reflecting said first combined light beam in said second medium;
   a second combiner dichroic mirror generating a second combined light beam by allowing only the light beam with said third wavelength different from said first and second wavelengths to penetrate through said second combiner dichroic mirror into said second medium and reflecting the light beams with other wavelengths and also by fourth-total-reflecting, at a penetration point of said light beam with said third wavelength, said third-total-reflected first combined light beam in said second medium; and
   a wide band anti-reflection coating film, which is cut in said second medium such that it is vertical to said total reflection angle in order to allow said second combined light beam to penetrate without reflection outside said second medium.

71. An image projection apparatus as set forth in claim 1, wherein said light beam combiner comprises:
   an anti-reflection coating film allowing only the light beam with said first wavelength entering at the total reflection angle that is determined by the refractive index of said second medium from among the three light beams which are modulated by said modulator to penetrate through said anti-reflection coating film without reflection in said second medium;

a total reflection plane first-reflecting said light beam with said first wavelength which is penetrated in said second medium;

a first combiner dichroic mirror forming a first combined light beam by allowing only the light beam with said second wavelength which is different from said first wavelength to penetrate through said first combiner dichroic mirror into said second medium and reflecting the light beams with other wavelengths and also by second-total-reflecting said light beam with said first wavelength, that is first-total-reflected at a point at which said light beam with said second wavelength is penetrated, in said second medium;

said total reflection plane third-reflecting said first combined light beam in said second medium;

a second combiner dichroic mirror forming a second combined light beam by allowing only the light beam with said third wavelength which is different from said first and second wavelengths to penetrate through said second combiner dichroic mirror into said second medium and reflecting the light beams with other wavelengths and also by fourth-total-reflecting the first combined light beam, that is third-total-reflected at a point at which said light beam with said third wavelength is penetrated through said second combiner dichroic mirror, in said second medium; and an outlet plane that is cut in said second medium at an angle of at with respect to said total reflection plane in order to allow said second combined light beam to penetrate outside said second medium without reflection such that said second combined light beam exits said second medium at a brewster angle with respect to the vertical component of a cutting plane.

72. An image projection apparatus as set forth in claim 1, wherein said light beam separator comprises:

a first separating dichroic mirror allowing only the light beam with said first wavelength to penetrate through said first separating dichroic mirror and reflecting the light beams with other wavelengths;

wide band high-reflection mirror reflecting the light beams reflected by said first a separating dichroic mirror;

a second separating dichroic mirror allowing only the light beam with said second wavelength different from said first wavelength to penetrate through said second separating dichroic mirror in a direction that is parallel to said light beam with said first wavelength that is penetrated through said first separating dichroic mirror and reflecting the light beams with other wavelengths, for the light beam reflected by said wide band high-reflection mirror;

said wide band high-reflection mirror reflecting the light beam with said third wavelength which is different from said first and second wavelengths that is reflected by said second separating dichroic mirror past said second separating dichroic mirror in a direction that is parallel to said light beam with said second wavelength that is penetrated through said second separating dichroic mirror; and wherein said first medium is positioned between said first and second separating dichroic mirrors and said wide band high-reflection mirror, and said incident light beam and said reflected light beams pass through said first medium.

73. An image projection apparatus as set forth in claim 1, wherein said light beam separator comprises:

a wide band anti-reflection coating film for allowing an incident light beam entered at a first angle with respect to the vertical direction of an incidence plane to penetrate through said wide band anti-reflection coating film into said first medium;

a first separating dichroic mirror allowing only the light beam with said first wavelength to penetrate through said first separating dichroic mirror at said first angle with respect to the vertical direction of a penetration plane and reflecting the light beams with other wavelengths at a second angle with respect to the vertical direction of a reflection plane, for the light beam penetrated through said wide band anti-reflection coating film;

a wide band high-reflection coating film reflecting the light beam reflected by said first separating dichroic mirror at said second angle with respect to the vertical direction of the reflection plane;

a second separating dichroic mirror allowing only the light beam with said second wavelength different from said first wavelength to penetrate through said second separating dichroic mirror into said first medium at said first angle with respect to the vertical direction of the penetration plane and reflecting the light beams with other wavelengths at said second angle with respect to the vertical direction of the reflection plane, for the light beam reflected by said wide band high-reflection coating film;

said wide band high-reflection coating film reflecting the light beam reflected by said second separating dichroic mirror at said second angle with respect to the vertical direction of the reflection plane;

an anti-reflection coating film allowing the light beam with said third wavelength which is different from said first and second wavelengths to penetrate through said anti-reflection coating film without reflection at said first angle with respect to the vertical direction of the penetration plane, for the light beam reflected by said wide band high-reflection coating film; and wherein the light beam penetrated through said wide band anti-reflection coating film and the light beams reflected by said first separating dichroic mirror, said second separating dichroic mirror, and said wide band high-reflection coating film pass through said first medium.

74. An image projection apparatus as set forth in claim 1, wherein said light beam separator comprises:

a wide band anti-reflection coating film for allowing said incident light beam which is entered at a total reflection angle that is determined by the refractive index of said first medium to penetrate through said wide band anti-reflection coating film without reflection;

a first separating dichroic mirror allowing only the light beam with said first wavelength to penetrate through said first separating dichroic mirror at said total reflection angle and reflecting the light beams with other wavelengths at said total reflection angle, for the light beam penetrated by said wide band anti-reflection coating film;

a total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said total reflection film total-reflecting the light beam reflected by said second separating dichroic mirror at said total reflection angle;

an anti-reflection coating film allowing the light beam with said third wavelength which is different from said first and second wavelengths to penetrate through said anti-reflection coating film without reflection, for the light beam reflected by said total reflection film; and wherein the light beam penetrated through said wide band anti-reflection coating film and the light beams reflected by said first separating dichroic mirror, said second separating dichroic mirror, and said total reflection film pass through said first medium.

75. An image projection apparatus as set forth in claim 1, wherein said light beam separator comprises:

a wide band anti-reflection coating film that is formed on a cutting plane cut into said first medium such that a total reflection angle is vertical with respect to the cutting plane in order allow to penetrate without reflection the incident light beam which is entered at said total reflection angle that is determined by the refractive index of said first medium;

a first separating dichroic mirror allowing only the light beam with said first wavelength to penetrate through said first separating dichroic mirror at said total reflection angle and reflecting the light beams with other wavelengths at said total reflection angle, for the light beam penetrated through said wide band anti-reflection coating film;

a total reflection film total-reflecting the light beam reflected by said first separating dichroic mirror at said total reflection angle;

a second separating dichroic mirror allowing only the light beam with said second wavelength different from said first wavelength to penetrate through said second separating dichroic mirror at said total reflection angle and reflecting the light beams with other wavelengths at said total reflection angle, for the light beam reflected by said total reflection film;

said total reflection film total-reflecting the light beam reflected from said second separating dichroic mirror at said total reflection angle;

an anti-reflection coating film allowing the light beam with said third wavelength which is different from said first and second wavelengths to penetrate through said anti-reflection coating film without reflection, for the light beam reflected by said total reflection film; and wherein the light beam penetrated through said wide band anti-reflection coating film and the light beams reflected from said first separating dichroic mirror, said second separating dichroic mirror, and said total reflection film pass through said first medium.

76. An image projection apparatus as set forth in claim 1, wherein said light beam separator comprises:

an incidence plane cut in said first medium so that the incident light beam enters at a brewster angle with respect to the vertical direction of said incidence plane and the incident light beam is refracted at a total reflection angle that is determined by the refractive index of said first medium;

a first separating dichroic mirror allowing only the light beam with said first wavelength to penetrate through said first separating dichroic mirror and reflecting the light beams with other wavelengths at said total reflection angle for said incident light beam;

a total reflection plane total-reflecting the light beam reflected by said first separating dichroic mirror at said total reflection angle;

a second separating dichroic mirror allowing only the light beam with said second wavelength different from said first wavelength to penetrate through said second separating dichroic mirror and reflecting the light beams with other wavelengths at said total reflection angle for the light beam reflected by said total reflection plane;

said total reflection plane total-reflecting the light beam reflected by said second separating dichroic mirror at said total reflection angle;

a penetration plane made of an anti-reflection coating film allowing the light beam with said third wavelength different from said first and second wavelengths to penetrate through said penetration plane without reflection for the light beam reflected by said total reflection film; and wherein the light beam penetrated through said incidence plane and the light beam reflected by said first separating dichroic, mirror, said second separating dichroic mirror and said total reflection film pass through said first medium.

77. An image projection apparatus as set forth in claim 6, wherein said at least one of said first and second beam path expanders further comprise:

a plurality of third total reflection planes, which cut into said beam path expander medium at said total reflection angle so as to total-reflect the light beam which is reflected from said second total reflection plane in said beam path expander medium and then make the light beam proceed to along a specific light path length determined by the number of said plurality of third total reflection planes; and wherein said outlet plane makes the light beam reflected by a last one of said third total reflection planes exit the beam path expander medium.

78. An image projection apparatus as set forth in claim 7, wherein said at least one of said first and second beam path expanders further comprise:

a plurality of third total reflection planes, which cut into said beam path expander medium at said total reflection angle so as to total-reflect the light beam which is reflected from said second total reflection plane in said beam path expander medium and then make the light beam proceed to along a specific light path length determined by the number of said plurality of third total reflection planes; and wherein said outlet plane makes the light beam reflected by a last one of said third total reflection planes exit the beam path expander medium.

79. An image projection apparatus as set forth in claim 66, wherein said at least one of said first and second beam path expanders further comprise:

a plurality of third total reflection planes, which cut into said beam path expander medium at said total reflection angle so as to total-reflect the light beam which is reflected from said second total reflection plane in said beam path expander medium and then make the light beam proceed to along a specific light path length determined by the number of said plurality of third total reflection planes; and wherein said outlet plane makes the light beam reflected by a last one of said third total reflection planes exit the beam path expander medium.

* * * * *